(12) United States Patent
Linsky et al.

(10) Patent No.: US 12,375,905 B2
(45) Date of Patent: Jul. 29, 2025

(54) MULTI DEVICE BROADCAST NETWORK FOR CONTEXT AND AWARENESS

(71) Applicant: QUALCOMM Incorporated, San Diego, CA (US)

(72) Inventors: Joel Linsky, San Diego, CA (US); Carlos Soledade, Nederland, CO (US); Igor Malamant, San Diego, CA (US); Pavan Rudravaram, Fremont, CA (US); Rayadurgam Balaji, San Diego, CA (US); Amarnath Hullur Subramanyam, San Jose, CA (US); Jacopo Corbetta, Gessate (IT)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 17/820,150

(22) Filed: Aug. 16, 2022

(65) Prior Publication Data

US 2023/0056166 A1 Feb. 23, 2023

Related U.S. Application Data

(60) Provisional application No. 63/235,694, filed on Aug. 21, 2021.

(51) Int. Cl.
*H04W 12/037* (2021.01)
*H04W 4/06* (2009.01)
(Continued)

(52) U.S. Cl.
CPC .......... *H04W 12/037* (2021.01); *H04W 4/06* (2013.01); *H04W 12/40* (2021.01); *H04W 52/0225* (2013.01)

(58) Field of Classification Search
CPC ..... H04W 12/037; H04W 12/40; H04W 4/06; H04W 52/0225; H04W 12/50;
(Continued)

(56) References Cited

U.S. PATENT DOCUMENTS 6,157,815 A * 12/2000 Collins ............. H04W 52/0216
340/7.29
7,035,627 B1 * 4/2006 Collins ............... H04W 88/026
455/414.3
(Continued)

FOREIGN PATENT DOCUMENTS

WO 2014035603 A1 3/2014
WO WO-2016061404 A1 * 4/2016 ........ H04W 52/0216

OTHER PUBLICATIONS

Partial International Search Report—PCT/US2022/040546—ISA/EPO—Nov. 28, 2022.
(Continued)

*Primary Examiner* — Hai V Nguyen
(74) *Attorney, Agent, or Firm* — Muncy, Geissler, Olds & Lowe, P.C.

(57) ABSTRACT

Various aspects include methods for supporting context broadcast networking by a device. Aspects provide a cross ecosystem platform that enable seamless user experiences from device centric and fragmented user experiences. Some aspects may include decrypting a broadcast message received from a radio controller if the received broadcast message indicates an account identity value matching a pre-calculated account identity value and is not a duplicate, generating data elements from the decrypted broadcast message, storing the data elements in a data cache; and signaling an interrupt indicating that the data elements are available. Further aspects include a radio controller receiving a first scan interval from a primary host and a second scan interval from a secondary host of the device; scheduling primary
(Continued)

host scan windows based on the first scan interval, and cancelling any secondary host second scan windows overlapping any of the scheduled primary host first scan windows.

18 Claims, 37 Drawing Sheets

(51) Int. Cl.
*H04W 12/40* (2021.01)
*H04W 52/02* (2009.01)

(58) Field of Classification Search
CPC ..... H04L 63/0428; H04L 63/166; H04L 9/40; Y02D 30/70; G06F 21/81; G06F 21/44
See application file for complete search history.

(56) References Cited

U.S. PATENT DOCUMENTS

| | | | |
|---|---|---|---|
| 9,763,221 B2* | 9/2017 | Patil | H04W 52/0216 |
| 10,366,378 B1* | 7/2019 | Han | G06Q 20/204 |
| 10,470,063 B2* | 11/2019 | Britt | H04W 24/08 |
| 10,547,995 B2* | 1/2020 | Lim | H04L 61/5069 |
| 10,620,266 B2* | 4/2020 | Shanbhogue | G01R 31/31721 |
| 10,873,854 B2* | 12/2020 | Lee | H04W 12/55 |
| 10,962,596 B2* | 3/2021 | Shanbhogue | G06F 11/008 |
| 10,979,894 B2* | 4/2021 | Kwon | H04L 61/5069 |
| 11,054,890 B2* | 7/2021 | Hum | G06F 1/3228 |
| 11,126,433 B2* | 9/2021 | Burger | G06F 9/35 |
| 11,178,716 B2* | 11/2021 | Baik | H04W 76/19 |
| 11,243,596 B2* | 2/2022 | Laurent | G11C 11/408 |
| 11,388,595 B2* | 7/2022 | Everson | G07C 9/00857 |
| 11,553,336 B2* | 1/2023 | Bamidi | H04W 12/037 |
| 11,803,472 B2* | 10/2023 | Bhat | G06F 12/0842 |
| 11,882,533 B2* | 1/2024 | Lee | H04L 65/80 |
| 11,941,967 B2* | 3/2024 | Lim | G08B 21/18 |
| 12,112,321 B2* | 10/2024 | Tiwari | G06F 21/57 |
| 12,141,824 B2* | 11/2024 | Shah | H04N 21/25883 |
| 2005/0289264 A1 | 12/2005 | Illowsky et al. | |
| 2006/0099979 A1* | 5/2006 | Collins | H04W 4/06 455/466 |
| 2013/0109371 A1 | 5/2013 | Brogan et al. | |
| 2014/0136148 A1 | 5/2014 | Pai et al. | |
| 2014/0269465 A1* | 9/2014 | Ballantyne | H04L 67/62 370/312 |
| 2016/0252943 A1* | 9/2016 | Varma | G06F 9/45558 713/310 |
| 2016/0283428 A1* | 9/2016 | Guddeti | G06F 13/4022 |
| 2017/0083315 A1* | 3/2017 | Burger | G06F 9/30098 |
| 2017/0083316 A1* | 3/2017 | Burger | G06F 9/3848 |
| 2017/0127304 A1* | 5/2017 | Britt | H04W 4/80 |
| 2017/0371660 A1* | 12/2017 | Smith | G06F 9/30043 |
| 2018/0007099 A1 | 1/2018 | Ein-Gil et al. | |
| 2018/0060995 A1* | 3/2018 | Doyle | G06T 17/20 |
| 2018/0160284 A1* | 6/2018 | Lim | H04W 4/06 |
| 2018/0160301 A1* | 6/2018 | Kwon | H04W 4/06 |
| 2018/0336111 A1* | 11/2018 | Gendler | G06F 1/3287 |
| 2019/0026149 A1* | 1/2019 | Jiang | G06F 9/3009 |
| 2019/0042338 A1 | 2/2019 | Ahn et al. | |
| 2019/0121422 A1* | 4/2019 | Ananthakrishnan | G06F 12/0864 |
| 2019/0121423 A1* | 4/2019 | Ananthakrishnan | G06F 1/3287 |
| 2019/0162782 A1* | 5/2019 | Shanbhogue | G01R 31/31721 |
| 2019/0166490 A1* | 5/2019 | Lee | H04W 84/18 |
| 2019/0235611 A1* | 8/2019 | Ananthakrishnan | G06F 1/3275 |
| 2020/0100108 A1* | 3/2020 | Everson | H04W 12/041 |
| 2020/0178339 A1* | 6/2020 | Baik | H04W 4/06 |
| 2020/0184977 A1* | 6/2020 | Song | H04W 4/80 |
| 2020/0300911 A1* | 9/2020 | Shanbhogue | G06F 11/3466 |
| 2020/0374692 A1* | 11/2020 | Bamidi | H04L 9/3242 |
| 2021/0064113 A1* | 3/2021 | Laurent | G06F 9/4401 |
| 2021/0166227 A1* | 6/2021 | Tiwari | G06Q 20/326 |
| 2021/0173724 A1* | 6/2021 | Liu | G06F 9/546 |
| 2021/0176070 A1* | 6/2021 | Liu | G06F 9/542 |
| 2021/0176217 A1* | 6/2021 | Liu | H04L 12/18 |
| 2021/0176632 A1* | 6/2021 | Liu | H04W 12/0471 |
| 2022/0067525 A1* | 3/2022 | Sequeira | B60W 10/04 |
| 2022/0346040 A1* | 10/2022 | Lee | H04L 12/189 |
| 2023/0029696 A1* | 2/2023 | Bhat | G06F 1/3275 |
| 2023/0052274 A1* | 2/2023 | Shah | H04N 21/252 |
| 2023/0059601 A1* | 2/2023 | Lim | H02J 50/40 |

OTHER PUBLICATIONS

Gal A., et al., "Interoperability Framework for Communication between Processes Running on Different Mobile Operating Systems", IOP Conference Series Materials Science and Engineering 106(1):012007, Feb. 2016, 8 Pages, URL: http://iopscience.iop.org/1757-899X/106/1/012007.
International Search Report and Written Opinion—PCT/US2022/040546—ISA/EPO—Mar. 21, 2023 20 pages.

* cited by examiner

MULTI DEVICE BROADCAST NETWORK FOR CONTEXT AND AWARENESS

RELATED APPLICATIONS

This application claims the benefit of priority to U.S. Provisional Patent Application No. 63/235,694 entitled "Multi Device Broadcast Network For Context And Awareness" filed Aug. 21, 2021, the entire contents of which are hereby incorporated by reference for all purposes.

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.).

SUMMARY

Various aspects may include methods for supporting context broadcast networking by a device. Such methods may include determining, on a low power island of the device interfacing with a radio controller of the device, whether a broadcast message received from the radio controller indicates an account identity value matching a pre-calculated account identity value, determining, on the low power island of the device, whether the broadcast message received from the radio controller is a duplicate message in response to determining that the broadcast message received from the radio controller indicates an account identity value matching a pre-calculated account identity value, decrypting, on the low power island of the device, at least a portion of the broadcast message received from the radio controller in response to determining that the broadcast message received from the radio controller is not a duplicate message, generating, on the low power island of the device, one or more data elements from the broadcast message received from the radio controller in response to decrypting the at least a portion of the broadcast message received the radio controller, sending the one or more data elements from the lower power island of the device to a shared data cache of the device, and signaling or sending, from the low power island of the device to another processor of the device, an interrupt indicating the one or more data elements are available in the shared data cache. In some aspects, the one or more data elements may indicate a context state, setting, event, or capability of another device.

In some aspects, the low power island may be configured such that: determining that the broadcast message received from the radio controller indicates an account identity value matching a pre-calculated account identity value and determining that the broadcast message received from the radio controller is not a duplicate message occur while the low power island is in a first mode of operation, decrypting at least a portion of the broadcast message received from the radio controller, generating one or more data elements from the broadcast message received from the radio controller, sending the one or more data elements from the lower power island of the device to the shared data cache of the device, and signaling or sending the interrupt indicating the one or more data elements are available in the shared data cache occur while the low power island is in a second mode of operation; and the first mode of operation is a lower power mode of operation than the second mode of operation.

In some aspects, the account identity value indicated in the broadcast message received from the radio controller and the pre-calculated account identity value matching may indicate that the device and a device sending the broadcast message received from the radio controller share a same account credential.

In some aspects, determining whether the broadcast message received from the radio controller is a duplicate message may include comparing a salt value of the broadcast message received from the radio controller to a log of salt values, and determining that the broadcast message received from the radio controller is a duplicate message in response to a match between the salt value of the broadcast message received from the radio controller and a salt value in the log of salt values.

Some aspects may further include ignoring the broadcast message received from the radio controller in response to either determining that the broadcast message received from the radio controller does not indicate an account identity value matching the pre-calculated account identity value, or determining that the broadcast message received from the radio controller is a duplicate message.

Some aspects may further include monitoring for broadcast messages received by the radio controller on a transport layer at a selected periodicity by the low power island of the device, in which the selected periodicity is a different periodicity than a monitoring periodicity of the other processor of the device for broadcast messages received by the radio controller on a transport layer. Such aspects may further include increasing the selected periodicity in response to a user being in close proximity, and decreasing the selected periodicity in response to a user not being in close proximity. In some aspects, the transport layer may be a Bluetooth transport layer.

Further aspects include methods for radio controller periodic scan scheduling for a device. Such methods may include receiving at a radio controller of the device a first scan interval from a primary host of the device and a second scan interval from a secondary host of the device, scheduling, by the radio controller, primary host scan windows based on the first scan interval from the primary host, determining, by the radio controller, any secondary host scan windows overlapping any of the scheduled primary host first scan windows based at least in part on the second scan interval from the secondary host, and cancelling any secondary host second scan windows determined to overlap any of the scheduled primary host first scan windows.

In some aspects, the primary host may be associated with a high level operating system interfacing with the radio controller and the secondary host may be associated with a low power island interfacing with the radio controller. In some aspects, the radio controller may be a Bluetooth radio controller.

In some aspects, the scan interval from the primary host of the device may define a first scan window length and the scan interval from the secondary host of the device may define a second scan window length that is different than the first scan window length. In such aspects, the scan interval from the primary host of the device may define a first scan period and the scan interval from the secondary host of the device may define a second scan period that is different than the first scan period.

Further aspects include a device having a processor configured with processor-executable instructions to perform operations of any of the methods summarized above. Further aspects include a device having means for performing functions of any of the methods summarized above. Further aspects include a non-transitory processor-readable medium having stored thereon processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
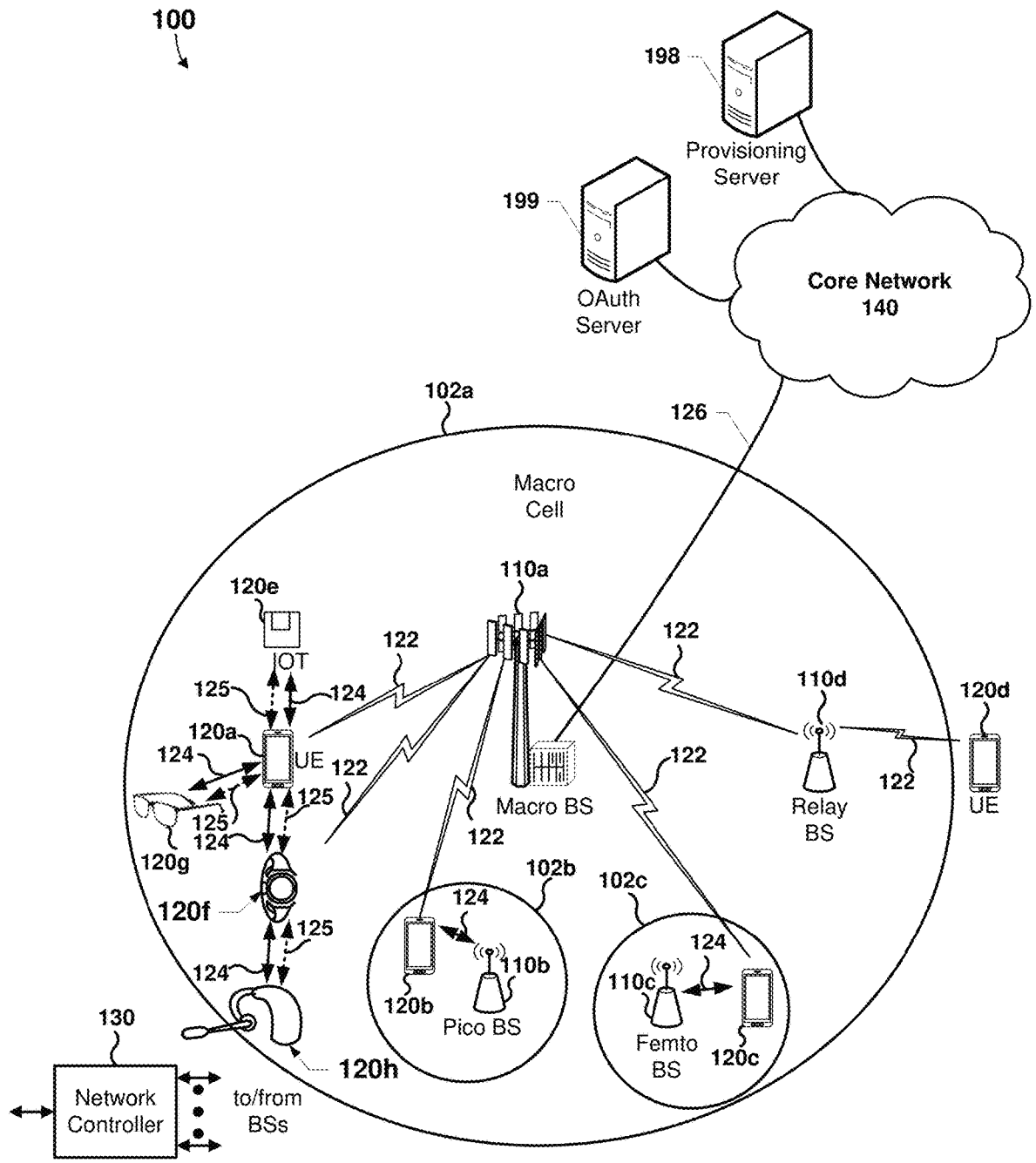
FIG. 1A is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and systems for supporting context broadcast networking by a device. Some embodiments include a cross ecosystem platform that enables a transition from device centric and fragmented user experiences to seamless user experiences. Some embodiments include a platform supporting inter-device communication of state information via broadcast transmissions that may not be an original device manufacturer (ODM) and/or original equipment manufacturer (OEM) walled garden. Some embodiments include a platform that may be extensible by ecosystem participants. Some embodiments include a platform that delivers platform services without user noticeable latency and/or battery life impact. Some embodiments include a platform that supports devices with and/or without Internet connectivity. Some embodiments include a platform that prevents fragmentation by exposing the various embodiment APIs in a manner that is independent of operating system approval. Some embodiments include a context broadcast network that may be established between devices without the need for network establishment or network availability (or advertising) operations being performed by devices in the network.

The terms "device," "wireless device," "user equipment" (UE), and "UE computing device" are used herein to refer to any one or all of cellular telephones, smartphones, portable computing devices, personal or mobile multimedia players, laptop computers, desktop computers, tablet computers, smartbooks, ultrabooks, palmtop computers, wireless electronic mail receivers, wireless earpieces (e.g., wireless headphones, wireless headsets, wireless earbuds, etc.), wireless wearable devices (e.g., smartwatches, smart sensors, wireless fitness monitors, etc.), multimedia Internet-enabled cellular telephones, wireless router devices, wireless appliances, smart televisions, smart speakers, medical devices and equipment, entertainment devices (e.g., wireless gaming controllers, music and video players, satellite radios, etc.), wireless communication elements within autonomous and semiautonomous vehicles (e.g., automobiles, drones, robotic vacuums, etc.), wireless devices affixed to or incorporated into various mobile platforms, and similar devices that include a memory, wired and/or wireless communication components, and a programmable processor.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices. In various aspects, an IoT device may be an example of a device.

The phrase "head-mounted device" and the acronym (HMD) is used herein to refer to any electronic display system that is wearable and presents the user with at least some computer-generated imagery. HMDs may present just computer-generated imagery or a combination of computer-generated imagery and real-world images from a user's physical environment (i.e., what the user would see without the glasses). HMDs may enable the user to view the generated image in the context of the real-world scene. Non-limiting examples of head-mounted devices include, or may be included in, helmets, eyeglasses, virtual reality (VR) glasses, augmented reality (AR) glasses, mixed reality (MR) glasses, extended reality (XR) headsets (e.g., headsets providing VR, AR, MR, and/or other type immersive or semi-immersive visual experiences), electronic goggles, and other similar technologies/devices. A head-mounted device may include various hardware elements, such as a processor, a memory, a display, one or more cameras (e.g., world-view camera, gaze-view camera, etc.), and a wireless interface for connecting with the Internet, a network, or another computing device. In some embodiments, the head-mounted device processor may be configured to perform or execute an XR software application. In various aspects, an HMD device may be an example of a device.

In some embodiments a head-mounted device may be an accessory for and/or receive information from a device (e.g., desktop, laptop, Smartphone, tablet computer, etc.), with all or portions of the processing being performed on the processor of that wireless device. As such, in various embodiments, the head-mounted device may be configured to perform all processing locally on the processor in the head-mounted device, offload all of the main processing to a processor in another computing device (e.g., a laptop present in the same room as the head-mounted device, etc.), or split the main processing operations between the processor in the head-mounted device and the processor in the other computing device. In some embodiments, the processor in the other computing device may be a server in "the cloud" with which the processor in the head-mounted device or in an associated wireless device communicates via a network connection (e.g., a cellular network connection to the Internet).

Various embodiments may be implemented in any device, system or network that is capable of transmitting and receiving RF signals according to any of the Institute of Electrical and Electronics Engineers (IEEE)16.11 standards, or any of the IEEE 802.11 standards, the Bluetooth® standard, code division multiple access (CDMA), CDMA-2000, frequency division multiple access (FDMA), time division multiple access (TDMA), time division synchronous code division multiple access (TD-SCDMA), Global System for Mobile communications (GSM), GSM/General Packet Radio Service (GPRS), Enhanced Data GSM Environment (EDGE)(also known as Enhanced GPRS (EGPRS)), Terrestrial Trunked Radio (TETRA), Wideband-CDMA (WCDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, Worldwide Interoperability for Microwave Access (WiMAX), or multicast Domain Name Service (DNS)(mDNS), or Connected Home Over IP (CHIP), or a system utilizing 3G, 4G or 5G, or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC), embedded UICC (eUICC), integrated SIM (iSIM), and integrated UICC (iUICC) are other terms for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

Various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As the number of devices (e.g., phones, laptops, watches, headphones, automotive infotainment systems, speakers, TVs, IoT devices, etc.) users interact with on a daily basis increases, users often find multi-device user experiences to be frustratingly complex and non-intuitive. While such devices may be so called "smart" from the Internet connected perspective, such devices are often not "smart" together from the locally connected perspective. Complex usability drives consumers away from technology or towards single manufacturer ecosystems that provide intuitively seamless experiences.

Working well together may require wireless devices to have awareness of their surroundings including what other nearby devices are doing and how the user is engaged with the other wireless devices. That awareness may then be used to guide the user through intuitive user experiences and interactions with the wireless devices.

Various embodiments provide a cross ecosystem platform that enables a transition from device centric and fragmented user experiences to seamless user experiences. Various embodiments provide a platform enabling developers to create consistent and seamless user experiences across devices regardless of the device's operating system or ecosystem.

Devices according various embodiments may utilize one or more radio technologies to create a new logical broadcast network where applications and/or operating system components may share and consume connect information. In various embodiments, devices may include platform level software components that may expose services through consistent application programming interfaces (APIs) that may transcend ecosystems and that may be equally accessible to different applications and/or different operating system.

Various embodiments may make limited use of cloud components. In various embodiments, a cloud architecture may facilitate the exchange of information among wireless devices and/or may provide persistent provisioning storage. In some embodiments, the components that enable seamless user experiences may not require internet connectivity.

Some embodiments may provide a platform that curates a core library of context information. Some embodiments may provide a platform that allows extensibility of the context library by applications and operating systems. Some embodiments may provide a platform that provides simple and consistent APIs that enable sharing and consumption of targeted context information. Some embodiments may provide a platform that isolates network complexities, including transport mechanisms, from applications and operating systems. As used herein, the term "transport" may include communication technologies, such as Bluetooth, etc., messaging standards, such as multicast Domain Name Service (DNS)(mDNS), etc., and communication systems, such as Open Connectivity Foundation (OCF) systems, Connected Home over IP (CHIP) systems (sometimes also referred to as Matter systems), etc. Some embodiments may provide a platform that manages the dynamic nature of context information exchange, ensuring freshness as it is impacted by user mobility, device activity, and/or other factors. Some embodiments may provide a platform that delivers context information privately (e.g., in a privacy preserving manner that may reduce (or prevent) tracking of a user) including by providing integrity, authenticity, and confidentiality for user information. Some embodiments may provide a platform that delivers platform services without user noticeable latency and/or battery life impact. Some embodiments may provide a platform that supports user privacy by preventing tracking of users and providing transparency of data ownership and assigned rights of use. Some embodiments may provide a platform that provides a server application programming interface (API) for management and analytics. Some embodiments may provide a platform that supports wireless devices with application processors enabled by High Level Operating Systems (HLOS). Some embodiments may provide a platform that support embedded devices with Real Time Operating Systems (RTOS). Some embodiments may provide a platform that supports devices with and/or without Internet connectivity. Some embodiments may provide a platform that prevents fragmentation by exposing the Some embodiment APIs in a manner that is independent of operating system approval.

The various embodiments differ compared with traditional Internet of Things (IoT) systems with respect to the relationship between events occurring, events being communicated, and actions produced. In traditional IoT systems there is a causal mapping between events and actions. For example, in traditional IoT systems, a switch moving to "ON" causes a light bulb to turn on. Additionally, in traditional IoT systems events are directed towards either a specific single device or a specified group of devices.

In contrast, in the various embodiments, the relationship between events occurring and actions being taken may be inferred. In various embodiments, events may be broadcast, devices nearby registered to the same account receive the broadcast events, and the actions (if any) taken by those devices depends on factors tracked by the wireless device receiving the broadcast, such as the history of events received, the history of the wireless device itself, whether the user is actively using the device, etc. In various embodiments, proximity awareness of a device plus the wireless device's ability to determine inferred context may result in personalized actions by the device.

Various embodiments may support proximity awareness, may support identifying a user's devices, may support identifying proximate wireless devices, and may support identifying devices actively involved in use cases. In various embodiments, may support a device communicating context information, in addition to, or in place of, events, thereby supporting inferences and actions that reflect the user's complete setting.

Some embodiments may provide a platform that may not be an original device manufacturer (ODM) and/or original equipment manufacturer (OEM) walled garden. Some embodiments may provide a platform that may be extensibility by ecosystem participants. Some embodiments may provide a platform that may achieve rapid deployment across a large volume of wireless devices. Some embodiments may provide a platform that may achieve deployment across a large variety of wireless devices. For example, phones, voice & music devices, automotive infotainment systems, etc. Some embodiments may provide a platform that may deliver information securely including by providing integrity, authenticity, and confidentiality of user information. Some embodiments may provide a platform that may deliver platform services without user noticeable latency and/or battery life impact. Some embodiments may provide a platform that may provide user privacy by preventing tracking of users and providing transparency of data ownership and assigned rights of use. Some embodiments may provide a platform that may support devices across multiple RTOSs, HLOSs, and ecosystems. Some embodiments may provide a platform that may support devices with and/or without Internet connectivity. Some embodiments may provide a platform that may prevent fragmentation by exposing the APIs independently of operating system approvals. Some embodiments may provide a platform that may provide cross layer synchronizations within operating system ecosystems to leverage underlying hardware capabilities.

Some embodiments may support hardware offloading of communication protocol management, message filtering, and/or event triggering. Such hardware offloading may enable a seamless user experience and/or reduce power consumption in comparison to HLOS operations. Some embodiments may support moving communication protocol management, message filtering, and/or event triggering from a higher power processor to a lower power processor.

Some embodiments may provide a platform that may provide basic services to applications and/or operating systems developers. Some embodiments may enable authentication of a user account. Some embodiments may enable provisioning of one or more platform identities. Various embodiments may not require provisioning of information at device manufacture time. Rather, in various embodiments, provisioning of information may occur after device purchase and/or operation. Some embodiments may enable secure access to a user's data. Some embodiments may enable publishing of context information on a logical network. Some embodiments may enable consumption of latest proximate context information published to the network by other devices. Some embodiments may enable latest inferred context information to be determined. Some embodiments may enable device capability hints to be provided on a logical network. Some embodiments may enable extensions to support creation of application and/or operating system specific contexts.

Some embodiments may provide a platform that may enable networking between a large variety of devices with a wide range of capabilities. Some embodiments may be deployed on single processor RTOSs, SoCs with multiple subsystems, and/or diverse application execution environments (EEs).

In some embodiments, each device implementation may include one primary instance hosted on a lowest power subsystem and/or low power island. In some embodiments, the primary instance may provide services to applications, operating system components, and/or operating system services. In some embodiments, devices with multiple execution environments may optionally include secondary instances configured to extend the platform to the applications and operating systems running on those additional execution environments. In some embodiments, the primary instances, and/or the optional secondary instances, may be complimented by servers.

Various embodiments may include APIs, such as operating system APIs (OS APIs), configured to translate lower level layer output to higher level definitions. For example, an OS API layer may be defined in Java or C #, while a lower level API layer may be defined in C. In some embodiments, an OS Adaptation Layer (OSAL) may be responsible for implementing the API translation, thereby maximizing the portability across wireless devices and ecosystems.

In various embodiments, a manager functional layer may be responsible for securely managing user account credentials, provisioning, and communication with Open Authorization (OAuth) servers and/or platform servers. In some embodiments, the manager functional layer may also be responsible for accessing the wireless device APIs to configure and bridge all of the wireless device specific functionality on which the platform may rely. For example, this may include configuring the transport mechanisms to receive and transmit communications. In some embodiments, the implementation of the manager functional layer may be operating system specific. In some embodiments, the manager functional layer may communicate with the platform engine and/or platform core via an internal interface. In some embodiments, this interface may be used to configure the platform engine and platform core with data including API definitions, name space changes, inference updates, policy changes, etc.

In some embodiments, the platform engine may be responsible for translating high level platform APIs into one or more platform data elements that are shared across a logical broadcast network. In some embodiments, the platform engine may provide registration and callback mechanisms for platform clients to be notified when data elements carrying context updates are received. In some embodiments, the platform engine may be the only functional component that understands the platform name space and data elements meaning. In some embodiments, the platform engine may use that understanding of data element meaning to perform inferences and offer higher level value add APIs.

In some embodiments, the platform core functional layer may be responsible for processing all of the data element communications. To do this, the platform core functional layer may only need to be aware of the data element formats. On the transmit path, the platform core functional layer may sift through all the platform engine requests, apply the necessary quality of service, and schedule the transmissions across the appropriate transport mechanisms. Additionally, on the transmit path, the platform core functional layer may receive an input stream of one or more data elements and/or QoS indications, organize data elements based on the QoS indications, apply account-based security and privacy, select and configure transport offloads, and/or fragment data element sets into protocol data units (PDUs) using a maximum transport unit (MTU) size. Encrypted data element formats may support receiver side account and duplicate filtering. On the receive path, the platform core functional layer may process the incoming data in a power efficient manner, update the shared data element cache, and interrupt the appropriate platform engine instances such that the appropriate instances may consume the latest context information conveyed in the data elements. Additionally, on the receive path, platform core functional layer may perform account and/or duplicate filter processing, assembly, decryption, data element storage in a shared data element cache, may generate triggers for engine instances, and/or may provide data element cache aging and maintenance. Engine instances may be free to query a shared data element cache for a latest context.

In some embodiments, a transport offloads layer may be responsible for bridging the platform core data output to the various radio or protocol transports, such as Bluetooth, multicast Domain Name Service (DNS)(mDNS), Connected Home Over IP (CHIP), etc.

In some embodiments, the platform secondary instances may extend the benefits of the platform to other execution environments. In some embodiments, each secondary instance may include a dedicated platform manager, a platform client, and operating system (OS) software development kit (SDK) that enables the applications, OS components, and/or OS services native to that execution environment.

In some embodiments, devices with an application processor and a separate low power island may instantiate at least one platform secondary instance. In some embodiments, some devices with multiple public execution environments, and/or dedicated virtual machines, may instantiate several platform secondary instances.

Various embodiments may use one or more of a number of transport layers to form a logical broadcast network and exchange context and device capability information, such as Bluetooth Low Energy (LE) (e.g., using LE advertising), Bluetooth Asynchronous Connection-Less (ACL) (e.g., using Bluetooth Generic Attribute Profile (GATT) and a platform service), mDNS (e.g., using Internet protocol (IP) transport over Wi-Fi, Ethernet, and/or Zigbee connections), CHIP (e.g., using IP transport over Wi-Fi, Ethernet, and/or Zigbee connections), etc.

In some embodiments, a set of devices with the same account credentials may represent a platform network. Many platform devices (also referred to herein as platform nodes) may be inherently mobile, and in some embodiments a platform network may dynamically change as devices come in and out of range of each other over time. In some embodiments, platform nodes may not have roles within the logical broadcast network. Instead, platform nodes may be coequal and each platform node may alternate between sharing its own context and listening or monitoring for context from devices within range. In some embodiments, a device may support multiple account credentials associated with multiple user profiles, switching the identity of the context broadcast function as the user profile or account that is active on the device. In some devices that support multiple simultaneous user profiles or accounts, the context broadcast function may support independently secured broadcast context streams corresponding to each active profiles or users.

In some embodiments, provisioning may be the process for onboarding devices onto a user's platform account. In some embodiments, provisioning platform devices may include at least one device to be Internet connected. In some embodiments, platform devices that are Internet connected may be referred to as a hub wireless device. A hub wireless device may then act as a proxy to provision devices that are not Internet connected. In some embodiments, platform wireless devices that are not Internet connected may be referred to as accessory devices.

In some embodiments, a hub device may only have a single active platform account per user profile on the hub device. In some embodiments, a hub device may be required to provision an accessory device. In some embodiments, accessory devices may allow one platform account association per pairing instance allowed by the accessory device to enable pairings to devices provisioned with platform account A, platform account B, or no platform account or capability. In some embodiments, platform cloud accounts may be associated an OAuth identity. In some embodiments, cloud accounts may store various types of data, such as user specific persistent storage of key material for subsequent provisioning, a list of registered devices, a subset of device data element caches, etc. In some embodiments, user account access may be granted through an application, APIs configured to enable any app to create a user experience, and/or a web interface. In some embodiments, platform cloud accounts may be associated with one or more OAuth identities.

In some embodiments, a platform cloud may utilize established OAuth servers to determine unique identities. In some embodiments, a platform cloud may utilize cloud servers to store account and provisioning information securely. various embodiments, a platform cloud may provide caching services.

In some embodiments, clients may not interact with the platform cloud directly. In some embodiments, clients may make use of platform APIs. In some embodiments, the only distributed component of the platform architecture that interfaces with cloud servers may be the platform manager. In some embodiments, only provisioning of new hub device may require cloud connectivity.

In some embodiments, the platform may not provide connection-oriented data sessions. For example, in some embodiments, the platform may not be configured to be used to transfer audio or video between two applications. In some embodiments the platform may be used to share context information that enables the clients to discover and initiate a connection-oriented data session. For example, in some embodiments, broadcast context could be used to advertise how a client could initiate a connection-oriented data session to retrieve a copy buffer stored on another device. In some embodiments, cloud servers may not provide traditional cloud services.

Various embodiments are discussed herein and/or illustrated in the various figures using the term "FabriQ". As used herein, the term "FabriQ" is used as a shorthand to identify aspects of the various embodiments related to context broadcast networking. The term "FabriQ" is used in the following descriptions and the figures merely for illustrative purposes and is not intended to be limiting.

FIG. 1A is a system block diagram illustrating an example communication system suitable for implementing any of various embodiments. The communications system 100 may be a 5G New Radio (NR) network, or any other suitable network such as an LTE network, 5G (or later generation) network, etc. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of devices (for example illustrated as user equipment (UE) 120a-120d, IoT device 120e, watch 120f, HMD 120g, and earpiece 120h in FIG. 1). The communications system 100 may also include a number of base stations (illustrated as the BS 110a, the BS 110b, the BS 110c, and the BS 110d) and other network entities. A base station is an entity that communicates with devices, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an Evolved Packet Core (EPC) network), 5G core network, etc. While the communications system 100 is discussed with reference to various examples of types of devices 120a-120h, such as UEs, IoT devices, HMDs, watches, earpieces, etc., these are merely examples and the devices 120a-120h may be any type device, such as a robot, vehicle, infrastructure device, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS.

In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The device (e.g., user equipment (UE)) 120a-120h may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a device (e.g., UE) or a base station). A relay station also may be a mobile device that can relay transmissions for other devices. In the example illustrated in FIG. 1, a relay station 110d may communicate with macro base station 110a and the device 120d in order to facilitate communication between the base station 110a and the device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The devices (e.g., UEs, vehicles, HMDs, etc.) 120a, 120b, 120b, 120c, 120e, 120d, 120f, 120g, 120h may be dispersed throughout communications system 100, and each device may be stationary or mobile. A device also may be referred to as an access terminal, a terminal, a mobile station, a subscriber unit, a station, user equipment (UE), broadcast device (BWD), Internet of Things (IoT) device, watch, earpiece, head mounted display (HMD), etc.

A macro base station 110a may communicate with the core network 140 over a wired or wireless communication link 126. The devices 120a, 120b, 120c, 120f may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communications system 100 include medium range protocols such as Wi-Fi, LTE-U, LTE-Direct, LAA, MuLTEfire, and relatively short range RATs such as ZigBee, Bluetooth, Bluetooth Low Energy (LE), multicast Domain Name Service (DNS) (mDNS), Connected Home Over IP (CHIP), etc. Additionally, wired communication links 125 may be established between devices in the communications system 100 via physical wired connections between devices, such as such as universal serial bus (USB) connections, peripheral component interconnect express (PCIe) connections, universal serial bus (USB) connections, high speed inter-chip (HSIC) connections, Ethernet connections, etc.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM.

The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a subcarrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per device. Multi-layer transmissions with up to 2 streams per device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A device (e.g., a UE) 120a-h may be included inside a housing that houses components of the device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE radio access network (RAN) side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network. The RAN may be comprised of the base stations 110a-110d and the RAN may connect to the core network 140. The RAN may also be referred to as a wireless wide area network (WWAN).

In some embodiments, two or more devices 120a-h (for example, illustrated as the device 120a and the IoT device 120e or device 120a and watch 120f or device 120a and HMD 120g or watch 120f and earpiece 120h) may communicate directly using one or more sidelink channels 124 (for example, without using a base station 110a-110d as an intermediary to communicate with one another). For example, device 120a-h may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a C-V2X protocol, Bluetooth communications, Wi-Fi communications, ZigBee communications, Bluetooth Low Energy (LE) communications, multicast Domain Name Service (DNS)(mDNS) communications, Connected Home Over IP (CHIP) communications, a mesh network, or similar networks, or combinations thereof. In this case, the device 120a-h may perform scheduling operations, resource selection operations, as well as other operations described elsewhere herein as being performed by the base station 110a. The communications between the two or more devices 120a-h (for example, illustrated as the device 120a and the IoT device 120e or device 120a and watch 120f or device 120a and HMD 120g or watch 120f and earpiece 120h) may establish a local area network (WLAN) between the two or more devices 120a-h. In some embodiments, two or more devices 120a-h (for example, illustrated as the device 120a and the IoT device 120e or device 120a and watch 120f or device 120a and HMD 120g or watch 120f and earpiece 120h) may be connected together by one or more wired connections (e.g., via USB connections, PCIe connections, etc.) and may communicate directly using wired communication links 125 when physically connected.

In some embodiments, one or more servers 198 and/or 199 may provide data to, and/or receive data from, one or more of the devices 120a-h via the core network 140. As one example, the server 199 may be an Open Authorization (OAuth) server providing authorization services to one or more of the 120a-h via the core network 140. As another example, the server 198 may be a provisioning server according to various embodiments providing provisioning information to one or more of the devices 120a-h via the core network 140.

Figure 1B:
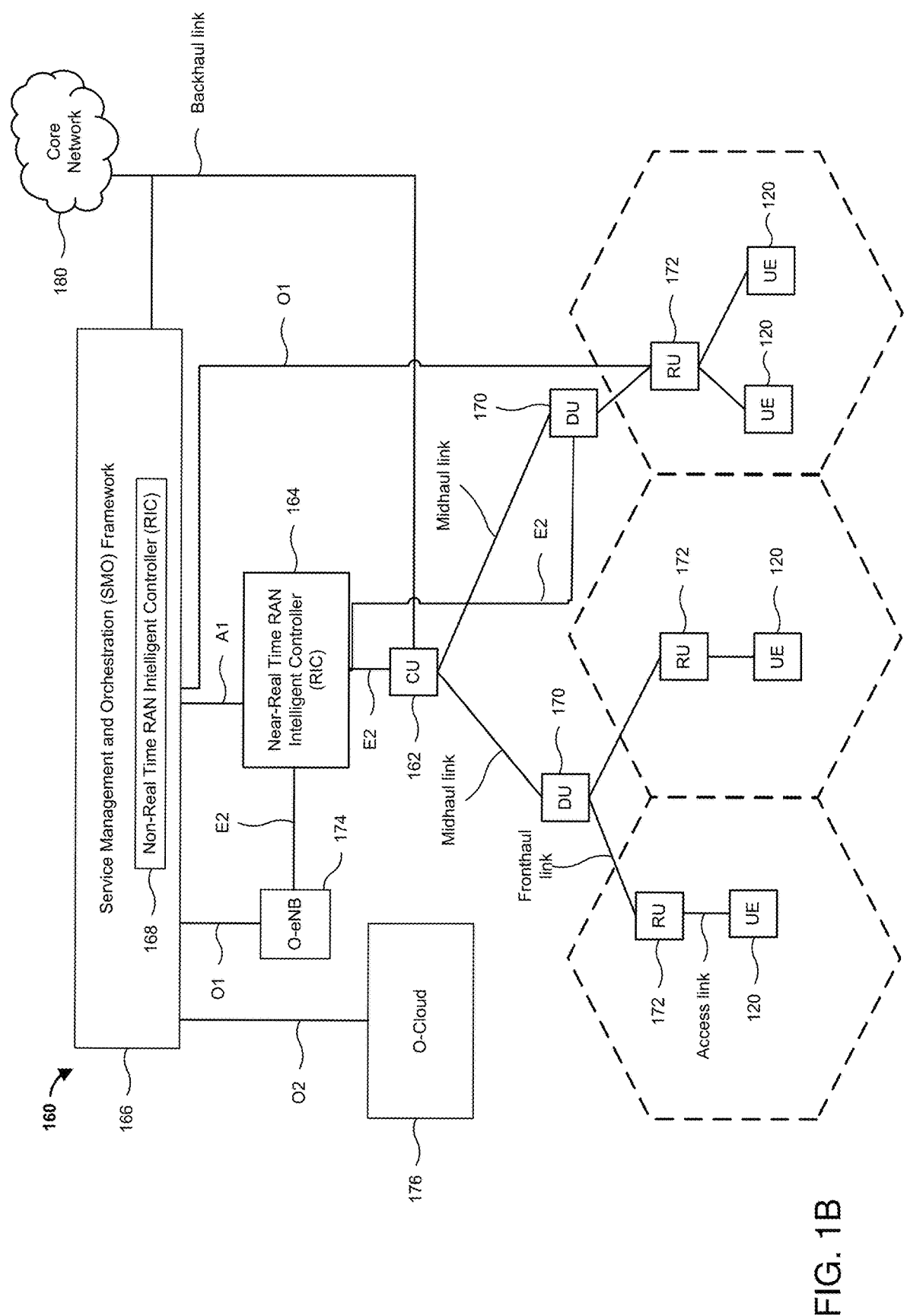
FIG. 1B is a system block diagram illustrating an example disaggregated base station architecture for wireless communication systems suitable for implementing any of the various embodiments.

FIG. 1B is a system block diagram illustrating an example disaggregated base station 160 architecture that may be part of communications system (e.g., communications system 100), such as a 5G (or later generation) network, suitable for implementing any of various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, UEs may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration.

The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2:
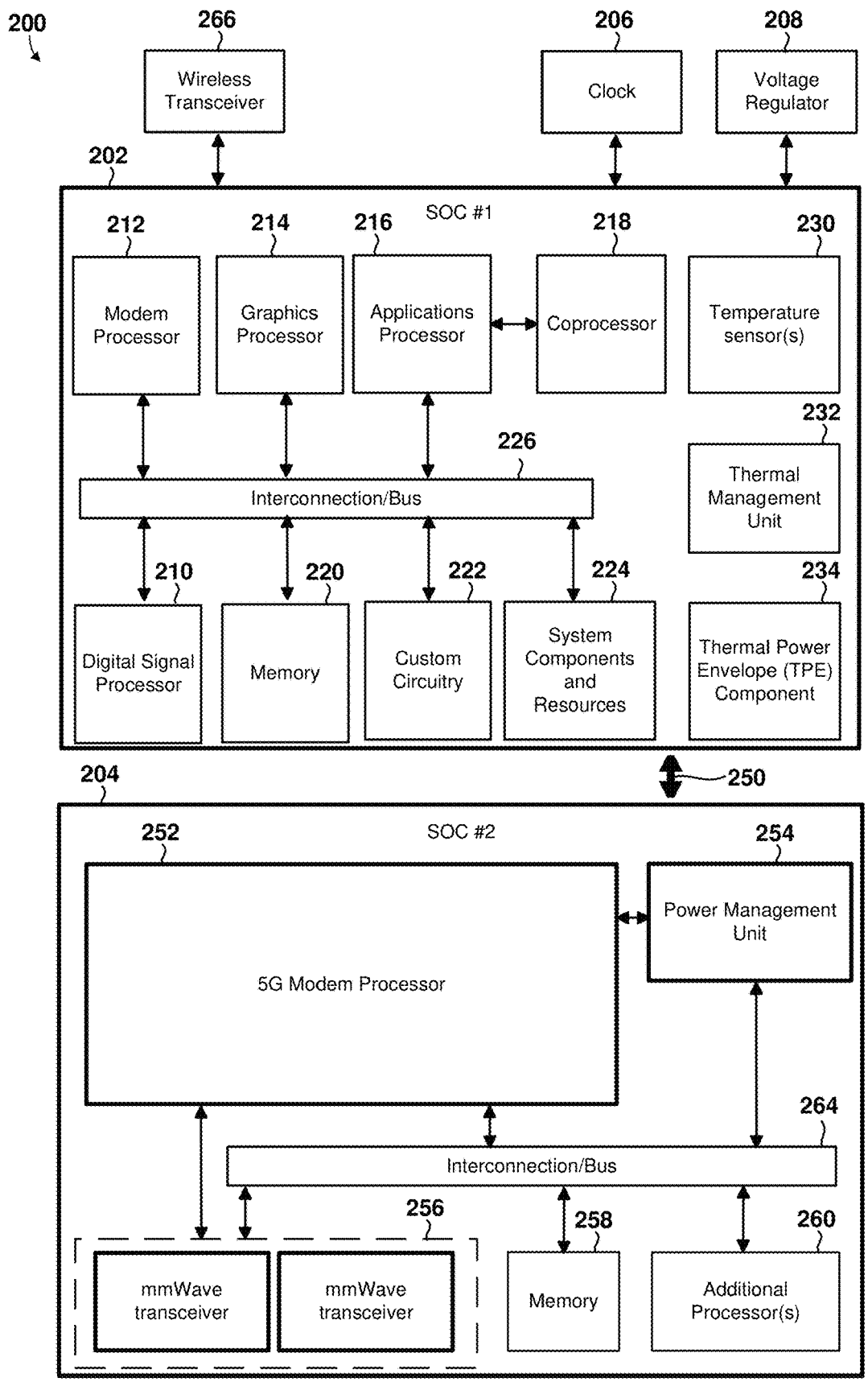
FIG. 2 is a component block diagram illustrating components of an example wireless modem system that may be used in devices implementing the various embodiments.

FIG. 2 illustrates an example wireless modem system 200 that may be used in devices (e.g., devices 120a-h) implementing the various embodiments. Various embodiments may be implemented on a number of single processor and multiprocessor computer systems, including a system-on-chip (SOC) or system in a package (SIP).

With reference to FIGS. 1A-2, the illustrated example device 200 (which may be a SIP in some embodiments) includes a two SOCs 202, 204 coupled to a clock 206, a voltage regulator 208, and one or more transceivers 266 configured to send and receive communications via an antenna (not shown) to/from network devices, such as a base station 110a, and/or other wireless device (e.g., devices 120a-h). In some embodiments, the first SOC 202 operate as central processing unit (CPU) of the device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G (or later generation) processing unit responsible for managing high volume, high speed (e.g., 5 Gbps, etc.), and/or very high frequency short wave length (e.g., 28 GHz mmWave spectrum, etc.) communications. In some embodiments, the wireless transceivers 266 may be wireless transceivers configured to support peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), Bluetooth communications, Wi-Fi communications, ZigBee communications, Bluetooth Low Energy (LE) communications, multicast Domain Name Service (DNS) (mDNS) communications, Connected Home Over IP (CHIP) communications, etc. In some embodiments, the wireless transceivers 266 may each be connected to the first SOC 202 and/or the second SOC 204 may be connected to each of one or more wireless transceivers 266 by various physical connections 267 (also referred to as interconnects, buses, etc.), such as peripheral component interconnect express (PCIe) connections, universal serial bus (USB) connections, high speed inter-chip (HSIC) connections, Ethernet connections, etc. In some embodiments, the first SOC 202 and/or the second SOC 204 may be configured to selectively send data, such as IP packets, to the wireless transceivers 266 using different ones of the connections 267.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.)

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a device. The system components and resources 224 and/or custom circuitry 222 may also include circuitry to interface with peripheral devices, such as cameras, electronic displays, wireless communication devices, external memory chips, other devices (e.g., devices connected via one or more wired connections, such as USB connections, PCIe connections, etc.), etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). The interconnection/bus module 226, 250, 264 may be physical connections between the various processors, 210, 212, 214, 216, 218, 252, 260, such as PCIe connections, USB connections, HSIC connections, Ethernet connections, etc. Communications may be provided by advanced interconnects, such as high-performance networks-on chip (NoCs). The various processors, 210, 212, 214, 216, 218, 252, 260 may be configured to selectively send data, such as IP packets, to one another, as well as the transceivers 256, 266, using different ones of the connections 267 and/or interconnection/bus module 226, 250, 264.

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3A:
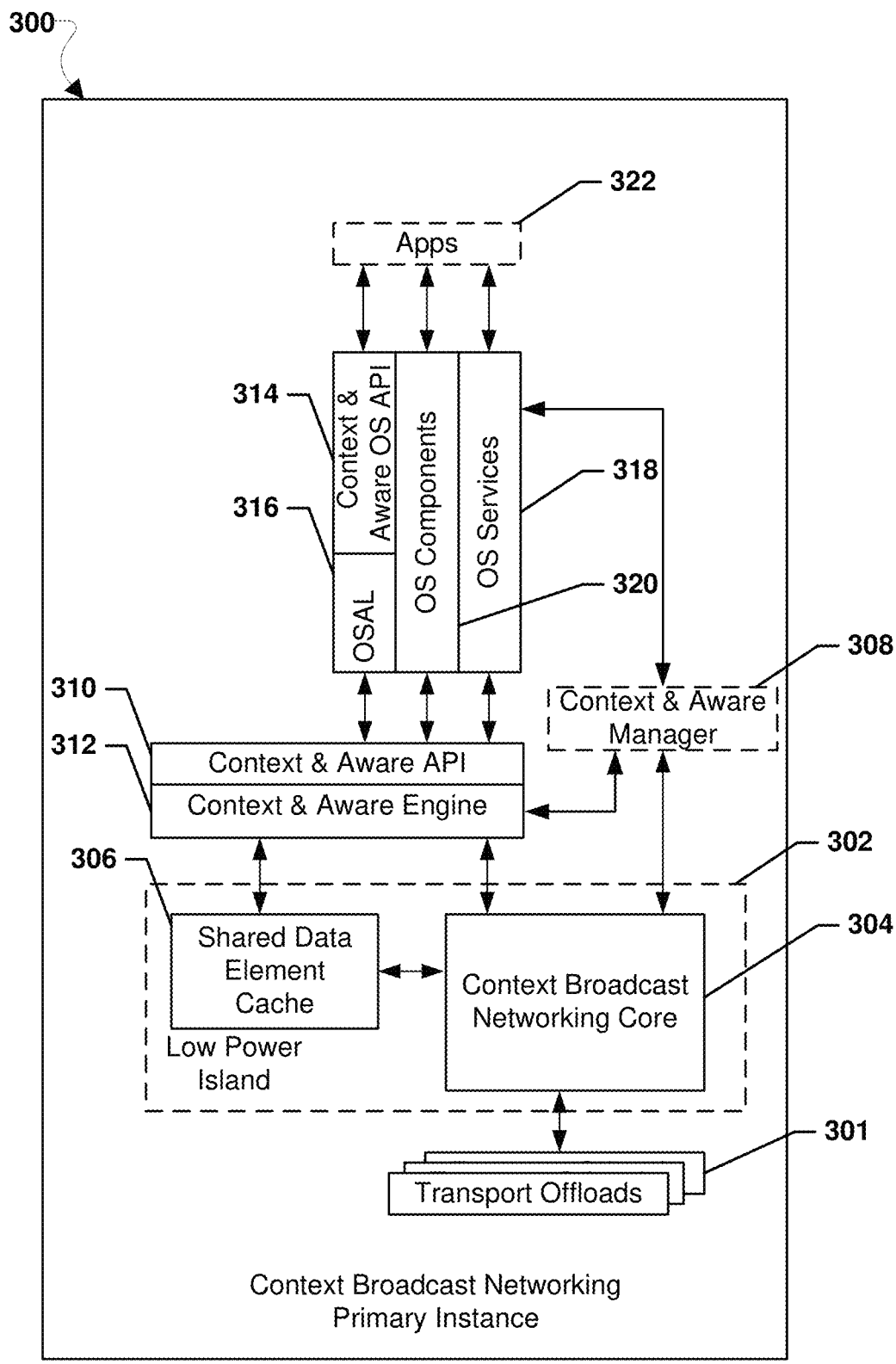
FIG. 3A is a component block diagram illustrating a software and hardware architecture of a context broadcast networking primary instance according to various embodiments.

FIG. 3A illustrates an example software and hardware architecture of a context broadcast networking primary instance 300 according to various embodiments. With reference to FIGS. 1A-3A, the context broadcast networking primary instance 300 may be a portion of a SOC, such as a SOCs 202, 204. As one example, the context broadcast networking primary instance 300 may be at least a portion of the modem processor 212, modem processor 252, and/or DSP 210. As another specific example, the context broadcast networking primary instance 300 may be additional components of one or both of the SOCs 202 and/or 204.

The context broadcast networking primary instance 300 may include a context broadcast networking core 304 configured to execute on a low power island (or low power core) 302. The low power island 302 may be an optional configuration. In some embodiments, the context broadcast networking core 304 and shared data element cache 306 may run on a low power island 302. In some embodiments, the low power island 302 may be a processor and/or processing core configured to support multiple wake-ups per second. In some embodiments, the low power island 302 may be a processor and/or processing core separate from a processor and/or processing core running a high level operating system.

In some embodiments, the low power island 302 may be configured to operate in different modes, such as two different modes. In a first mode, such as a low power mode, the low power island 302 may be configured to perform a first set of processing operations that may not exceed a first set power utilization threshold. In a second mode, such as a high power mode, the low power island 304 may be configured to perform a second set of processing operations that may not exceed a second set power utilization threshold. The second set power utilization threshold may be a higher power measurement than the first set power utilization threshold such that when operating in the first mode, such as the low power mode, the low power island 302 uses less power than when operating in the second mode, such as the high power mode. In some embodiments, both the first mode (e.g., a low power mode) and the second mode (e.g., a high power mode) of the low power island 302 may be modes of operation in which the low power island 302 draws less power than an application processor. In some embodiments, the low power island 302 may be a processor and/or processing core supporting reduced logical operations than would be required to run a high level operating system. In other embodiments, the context broadcast networking core 304 and shared data element cache 306 may not run on a low power island.

The context broadcast networking core 304 may provide context broadcast networking services to applications 322, operating system (OS) components 320, OS services 318, firmware, programmable hardware state machines, and/or any programmable entity that may produce and/or consume context information. The context broadcast networking core 304 may provide context broadcast networking services to the applications 322, the OS components 320, and/or the OS services 318 through context and aware API 310 and/or context and aware OS API 314.

The context and aware OS API 314 may maximize compatibility with devices and ecosystems. The context and aware OS API 314 may translate lower level context and aware API 310 calls into API calls appropriate to the specific device (e.g., any of devices 120a-h, 200) on which the context broadcast networking primary instance 300 is running. For example, the context and aware OS API 314 may be defined in Java or C #while the context and aware API 310 may be defined in C. The OS adaption layer (OSAL) 316 may be configured to implement the API translation and/or OS permission models. The OSAL 316 may manage API access according to the permissions model and capabilities of different OSs. The OSAL 316 may ensure that the OS API layer is accessible to clients in accordance with the frameworks set forth by the specific device permissions model.

The context and aware manager functional layer 308 may be configured for securely managing user account credentials, provisioning, and communication with OAuth Server(s) (e.g., 199) and context broadcast networking servers (e.g., 198). The context and aware manager functional layer 308 may also be configured for accessing the device APIs to configure and bridge all of the device specific functionality that support context broadcast networking. For example, this may include configuring the transport offloads 301 and RF chains of the device (e.g., any of devices 120a-h, 200) to receive and transmit broadcast communications. The implementation of the context and aware manager functional layer 308 may be operating system specific. The context and aware manager functional layer 308 may communication with the context and aware engine 312 via an internal interface.

The context and aware engine 312 may be configured to translate high level context and aware API information into one or more context and aware data elements (sometimes referred to herein as FarbiQ data elements for ease of reference) that are shared across the logical broadcast network. The context and aware engine 312 may provide registration and callback mechanisms for the applications 322, the OS components 320, and/or the OS services 318 to be notified when data elements carrying context updates are received. The context and aware engine 312 may be the only functional component that understands the name space (e.g., the FabriQ Name Space) and data elements meaning. The context and aware engine 312 may use that understanding of data element meaning to perform inferences and offer higher level APIs.

The context broadcast networking core functional layer 304 may be configured to process all of the data element communications. To do this, the context broadcast networking core functional layer 304 only needs to be aware of the data element formats. On the transmit path, the context broadcast networking core functional layer 304 may sift through all the context and aware engine 312 requests, apply the necessary quality of service (QoS), and schedule the transmissions across the appropriate transport offloads 301 and RF chains of the device (e.g., any of devices 120a-h, 200). On the receive path, the context broadcast networking core functional layer 304 may process the incoming data (for example, in a power efficient manner), update the shared data element cache 306, and interrupt the appropriate context and aware engine 312 instances such that the context and aware engine 312 instances may consume the latest context information conveyed in the data elements. The context broadcast networking core functional layer 304 may be configured to process context into broadcast ready information. On the transmit path, the context broadcast networking core functional layer 304 may receive an input stream of one or more data elements and/or QoS indications, organize data elements based on the QoS indications, apply account-based security and privacy, select and configure transport offloads, and/or fragment data element sets into PDUs using a maximum transport unit (MTU) size. On the receive path, the context broadcast networking core functional layer 304 may perform account and/or duplicate filter processing, assembly, decryption, data element storage in a shared data element cache, may generate triggers for engine instances, and/or may provide data element cache aging and maintenance. The context broadcast networking core functional layer 304 may query the shared data element cache 306 for a latest context.

The transport offloads 301 may be configured for bridging the data output to the various radio or protocol transports and RF chains of the device (e.g., any of devices 120a-h, 200), such as Bluetooth, mDNS, CHIP, etc.

Figure 3B:
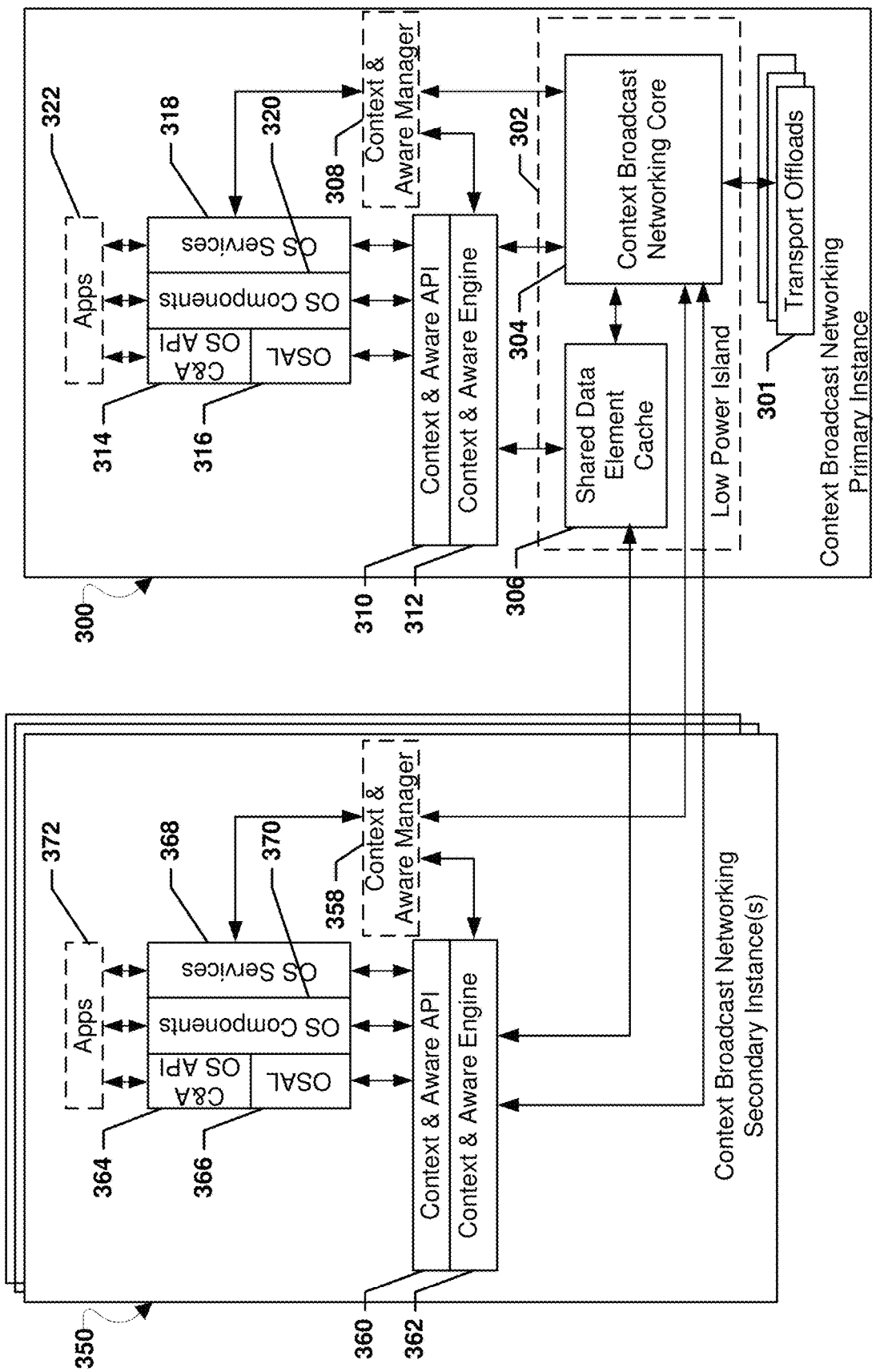
FIG. 3B is a component block diagram illustrating a software and hardware architecture of a context broadcast networking primary instance and one or more secondary context broadcast networking secondary instances according to various embodiments.

In some embodiments, a device (e.g., device 120a-h, 200) may include at least one implementation of a context broadcast networking primary instance 300. In some embodiments, a device (e.g., device 120a-h, 200) may include at least one implementation of a context broadcast networking primary instance 300 and one or more additional context broadcast networking secondary instances 350 as illustrated in FIG. 3B.

With reference to FIGS. 1A-3B, FIG. 3B is a component block diagram illustrating a software and hardware architecture of a context broadcast networking primary instance 300 and one or more secondary context broadcast networking secondary instances 350 according to various embodiments. With reference to FIGS. 1A-3B, the context broadcast networking primary instance 300 and/or one or more secondary context broadcast networking secondary instances 350 may be a portion of a SOC, such as a SOCs 202, 204. As one example, the context broadcast networking primary instance 300 and/or one or more secondary context broadcast networking secondary instances 350 may be at least a portion of the modem processor 212, modem processor 252, and/or DSP 210. As another specific example, the context broadcast networking primary instance 300 and/or one or more secondary context broadcast networking secondary instances 350 may be additional components of one or both of the SOCs 202 and/or 204.

A context broadcast networking secondary instance 350 may extend the context broadcast networking operations to other execution environments. Each context broadcast networking secondary instance 350 may include its own respective dedicated context and aware manager functional layer 358, context and aware API 360, context and aware OS API 364, OSAL 366, and context and aware engine 362 (similar to context and aware manager functional layer 308, context and aware API 310, context and aware OS API 314, OSAL 316, and context and aware engine 312 described with reference to FIG. 3A) to support the applications 372, OS components 370, and/or OS services 368 of that context broadcast networking secondary instance 350 native to its respective execution environment. In some embodiments, devices (e.g., device 120a-h, 200) with an application processor and a separate low power island may instantiate at least one context broadcast networking secondary instance 350. In some embodiments, devices (e.g., device 120a-h, 200) with multiple execution environments and/or dedicated virtual machines may instantiate several context broadcast networking secondary instances 350.

Figure 3C:
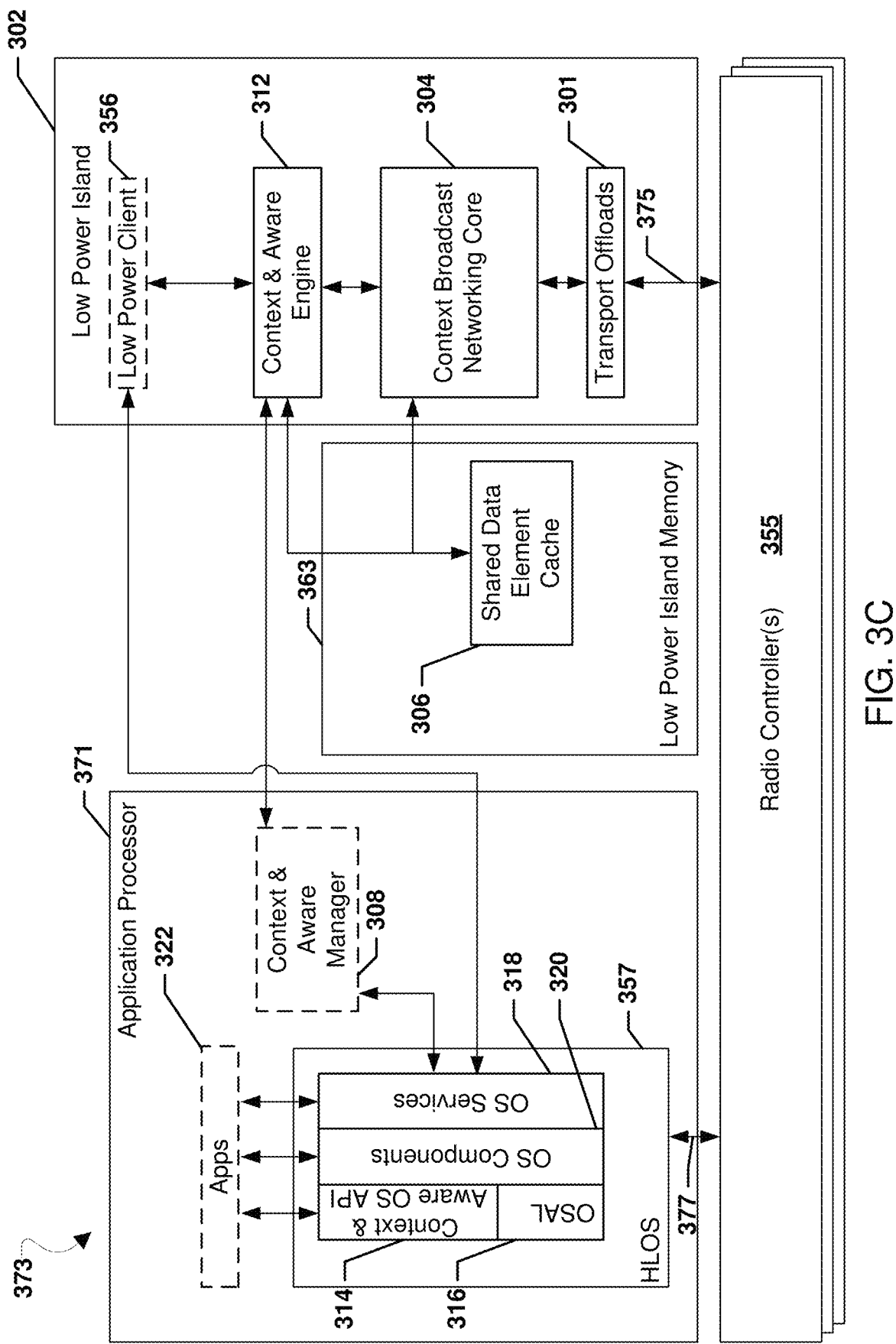
FIG. 3C is a component block diagram illustrating a software and hardware architecture of a context broadcast networking instance according to various embodiments.

FIG. 3C is a component block diagram illustrating a software and hardware architecture of a context broadcast networking instance 373 according to various embodiments. With reference to FIGS. 1A-3C, the context networking instance 373 may be a portion of a SOC, such as an SOCs 202, 204. As an example, the context broadcast networking primary instance 300 may be at least a portion of the modem processor 212, modem processor 252, and/or DSP 210. As another example, the context broadcast networking primary instance 300 may be additional components of one or both of the SOC 202 and/or SOC 204. The context network instance 373 may be an alternative example configuration similar to context broadcast networking primary instance 300 described with reference to FIG. 3A.

The context broadcast networking instance 373 may include the low power island 302, an application processor 371 (e.g., 216, etc.), and a low power island memory 363 (e.g., 220, 258, etc.). The low power island 302 may include the context broadcast networking core 304, the transport offloads 301, and the context and aware engine 312. The low power island memory 363 may include the shared data element cache 306.

In some embodiments, the application processor 371 may be a processor with a higher power consumption than that of the low power island 302. In some embodiments, the application processor 371 may be a processor and/or processing core configured to support fewer wake-ups per second than the low power island 302. In some embodiments, the application processor 371 may be a processor and/or processing core running a high level operating system (HLOS) 357. In some embodiments, the low power island 302 may be a processor and/or processing core supporting reduced logical operations compared to the application processor 371.

In some embodiments, the application processor 371 may enter a sleep and/or inactive mode at a different periodicity than the low power island 302. As an example, the application processor 371 may be in a sleep and/or inactive mode while the low power island 302 is in a wake and/or active mode. As another example, the application processor 371 may be in a wake and/or active mode less often over a given period of time than the low power island 302.

In the context networking instance 373, one or more radio controllers 355 of the device (e.g., any of devices 120a-120h, 200) may transmit and/or receive over-the-air (OTA) broadcasts. The one or more radio controllers 355 may be configured to control various radio or protocol transports and RF chains of the device (e.g., any of devices 120a-120h, 200), such as Bluetooth, mDNS, CHIP, etc. The radio controllers 355 may output data to both the application processor 371 and the low power island 302. The radio controllers 355 may receive data from both the application processor 371 and the low power island 302.

In some embodiments, each radio controller 355 may have at least one interface to the low power island 302, such as one or more interfaces 375, and at least one interface to the application processor 371, such as one or more interfaces 377. For example, the interfaces 371, 375 may be host controller interfaces (HCIs) or any other type interfaces. The presence of separate interfaces 371, 375 to the low power island 302 and the application processor 371 may enable radio controllers 355 to pass received packets to one or both of the low power island 302 and the application processor 371.

In some embodiments, the low power island 302 may wake-up or otherwise be active more frequently during a given period of time (e.g., more times per second) than the application processor 371, and the low power island 302 may enter a mode to monitor for and/or receive data from the radio controllers 355 for frequently than the application processor 371. In some embodiments, the low power island 302 may be configured to send and/or receive data from the radio controllers 355 without the application processor 371 being in an active and/or awake mode.

In some embodiments, the radio controllers 355 may be configured to scan, monitor, listen, or otherwise be configured to receive OTA broadcast packets at periodicities (also referred to as duty cycles) scheduled by components of one or both of the low power island 302 and the application processor 371. For example, the HLOS 357 may schedule one or more of the radio controllers 355 to scan, monitor, listen, or otherwise be configured to receive OTA broadcast packets at a first periodicity (or duty cycle) and the context broadcast networking core 304 may schedule one or more of the radio controllers 355 to scan, monitor, listen, or otherwise be configured to receive OTA broadcast packets at a second periodicity (or duty cycle) different from the first periodicity.

In the context networking instance 373, the application processor 371 may run the HLOS 357, which may include the context and aware OS API 314, the OSAL 316, the OS services 318, the OS components 320, etc. Additionally, the applications 322 may run on the application processor 371.

In some embodiments, the context networking instance 373 may include an optional low power client 356 that may run on the low power client 302 and interface with the context and aware engine 312 and/or the OS services 371 of the application processor 371. The low power client 356 may be optional because some implementations the functionality provided by the low power client may not be needed and/or may be provided by the context and aware engine 312. In some embodiments, the low power client 356 and/or the context and aware engine 312 may be configured to wake-up and/or activate the application processor 371 when data elements carrying context updates are received. In some embodiments, the low power client 356 and/or the context and aware engine 312 may provide data elements carrying context updates to the OS services 371. In some embodiments, the context and aware engine 312 may provide data elements carrying context updates to the low power client 356.

While FIGS. 3A, 3B, and 3C illustrate example configurations of the context broadcast networking primary instance 300 and/or the context broadcast networking secondary instances 350 and/or the context broadcast networking instance 373, the configurations of FIGS. 3A, 3B, and 3C are merely examples for illustrative purposes and are not intended to be limiting. Other example configurations of context broadcast networking instances in accordance with the various embodiments may include a primary instance running on a low power island, a primary instance running on a lowest power core of a SoC or SIP, a primary instance running on any programmable core of a SoC or SIP, a secondary instance running on any other SoC or SIP programmable core that may generate or consumer context data, multiple secondary instances running simultaneously on any other SoC or SIP programmable core that may generate or consumer context data, a shared data element cache stored on a memory included within a low power island, a shared data element cache stored on any shared memory implemented within a SoC or SIP, and/or a shared data element cache stored on any external shared memory accessible to a SoC or SIP.

A set of devices (e.g., any one or more of the device 120a-h, 200) having the same account credentials and each having at least a context broadcast networking primary instance (e.g., 300) may be referred to as a context broadcast network (also referred to as a "FabriQ network" herein for ease of reference). The devices (e.g., any one or more of the device 120a-h, 200) in such a context broadcast network may be referred to as "FabriQ node" herein for ease of reference. In some embodiments, the devices (e.g., any one or more of the device 120a-h, 200) in such a context broadcast network may be inherently mobile and the make-up of the network may change as devices come in and out of range with one another over time. In some embodiments, the devices (e.g., any one or more of the devices 120a-h, 200) in such a context broadcast network may not have assigned roles in the network. Rather, in some embodiments, the devices (e.g., any one or more of the devices 120a-h, 200) in such a context broadcast network may be co-equal and each device may alternate between sharing its own context and monitoring or listening for context broadcast from other devices in range.

Figure 4A:
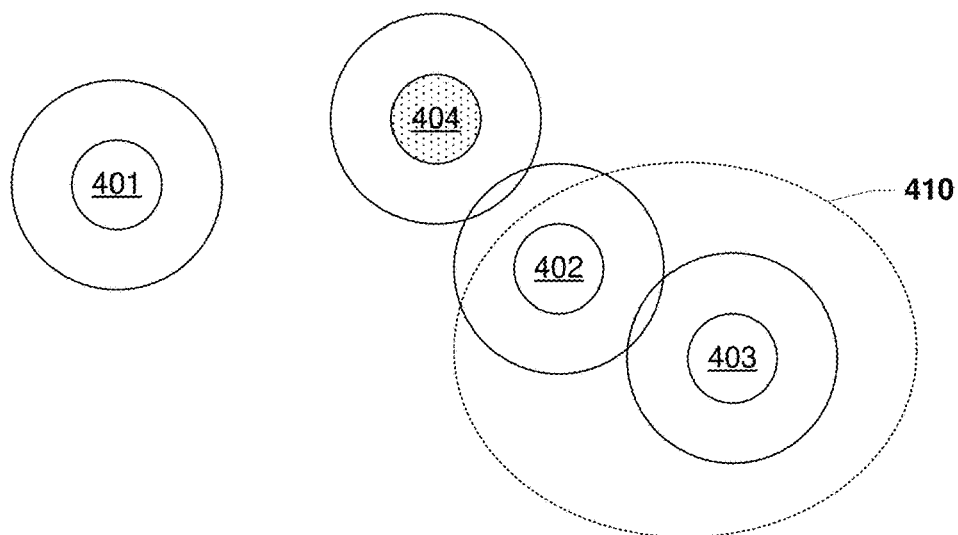
FIGS. 4A, 4B, and 4C illustrate aspects of changes in a context broadcast network over time according to various embodiments.
Figure 4B:
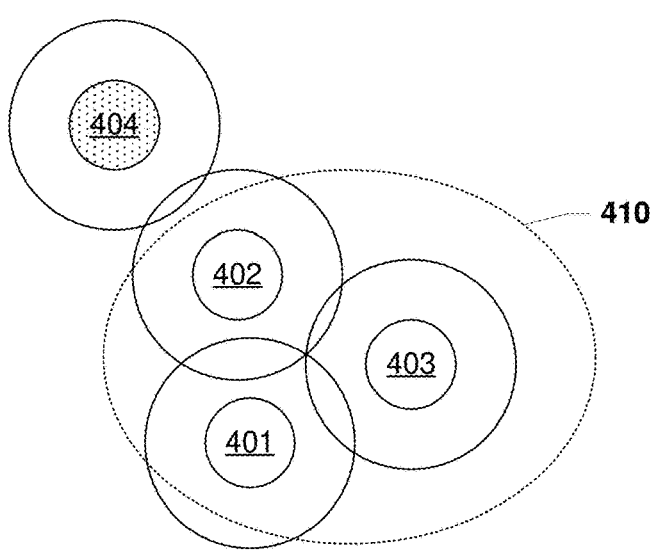
Figure 4C:
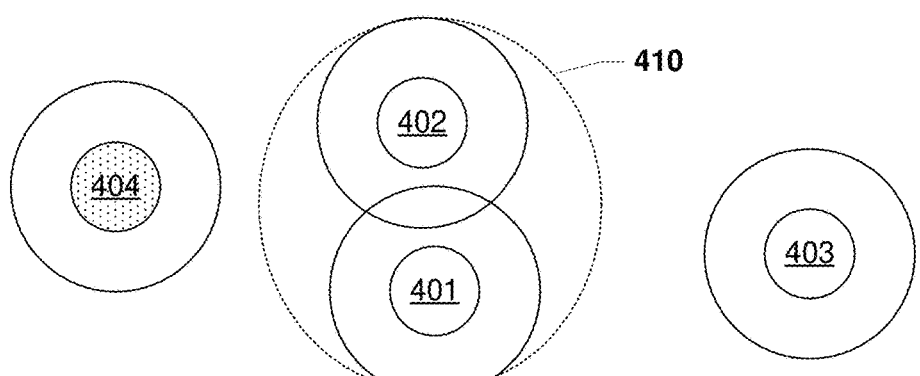

FIGS. 4A, 4B, and 4C illustrate aspects of changes in a context broadcast network 410 over time according to various embodiments. With reference to FIGS. 1A-4C, FIGS. 4A-4C illustrate changes in a context broadcast network 410 from a first time as illustrated in FIG. 4A, to a second time as illustrated in FIG. 4B, and to a third time as illustrated in FIG. 4C. FIGS. 4A-4C illustrated four devices 401, 402, 403, and 404. For example, devices 401, 402, 403, and 404 may be any of devices 120a-h, 200 including at least a context broadcast networking instance (e.g., 300, 350, etc.). FIGS. 4A, 4B, and 4C illustrate the ad hoc and central controllerless nature of a context broadcast network 410 (also referred to as a FabriQ network for ease of reference) according to various embodiments.

At the first time as illustrated in FIG. 4A, the wireless devices 402 and 403 may have formed a context broadcast network 410 (also referred to as a FabriQ network for ease of reference) as the wireless devices 402 and 403 may be within communication range of one another and may share the same account credentials. Wireless devices 402 and 403 may not have assigned roles in the context broadcast network 410. Wireless device 404 may be in range with at least wireless device 402, but as the wireless device 404 may not share account credentials with wireless devices 402 and 403, the wireless device 404 may not be part of the context broadcast network 410. Wireless device 401 may share account credentials with wireless devices 402 and 403, but wireless device 401 may be outside the range of communications with wireless devices 402 and 403 and thus wireless device 401 may not be part of the context broadcast network 410 at the first time.

The context broadcast network 410 may be established between with wireless devices 402 and 403 without the need for network establishment or network availability (or advertising) operations being performed by either of the wireless devices 402 and/or 403. Rather, each wireless device 402 and 403 may merely send broadcast messages encrypted using the shared account credentials. Those broadcast messages may be received and decrypted by the receiving wireless device 402 or 403 using the shared account credentials. The broadcast messages may include data elements therein without any need to first exchange network establishment or network availability (or advertising) type messages. The ability to broadcast and receive such broadcast messages by the wireless devices 402 and 403 may establish the context broadcast network 410 without any prior network establishment or network availability (or advertising) operations such that the first messages broadcast and received between the wireless device 402 and/or 403 may both carry one or more data elements and also establish the context broadcast network 410.

At the second time as illustrated in FIG. 4B, the wireless device 401 may have moved to within range of the wireless devices 402 and 403 and the wireless device 401 may have become part of the context broadcast network 410 with the wireless devices 402 and 403. The wireless device 401 may become part of the context broadcast network 410 by broadcast or receiving a message including a data element and encrypted using the shared account credentials. Thus, the number of nodes in the context broadcast network 410 may have increased as the number of wireless devices 401, 402, and 403 sharing account credentials within range of one another may have increased. Wireless device 404 may be excluded from the context broadcast network 410 as wireless device 404 may not share account credentials with wireless devices 401, 402, and 403. The ability to broadcast and receive such broadcast messages by the wireless devices 401, 402, and 403 may establish the context broadcast network 410 without any prior network establishment or network availability (or advertising) operations such that the first messages broadcast and received between any of the wireless devices 401, 402, and/or 403 may both carry one or more data elements and add the wireless device 401 to the context broadcast network 410.

At the third time as illustrated in FIG. 4C, the wireless device 403 may have moved out of range of the wireless devices 402 and 401 and the wireless device 403 may have therefore been removed from the context broadcast network 410. Thus, the number of nodes in the context broadcast network 410 may have decreased from the second time as the number of wireless devices 401 and 402 sharing account credentials within range of one another may have decreased as wireless device 403 moved out of range. The wireless device 403 may be dropped (or removed) from the context broadcast network 410 merely by its broadcast messages being out of range of the other wireless device 401 and 402 without any specific network drop or disestablishment communications being exchanged between the wireless devices 401, 402, and/or 403. Wireless device 404 may be excluded from the context broadcast network 410 as wireless device 404 may not share account credentials with wireless devices 401 and 402.

Figure 4D:
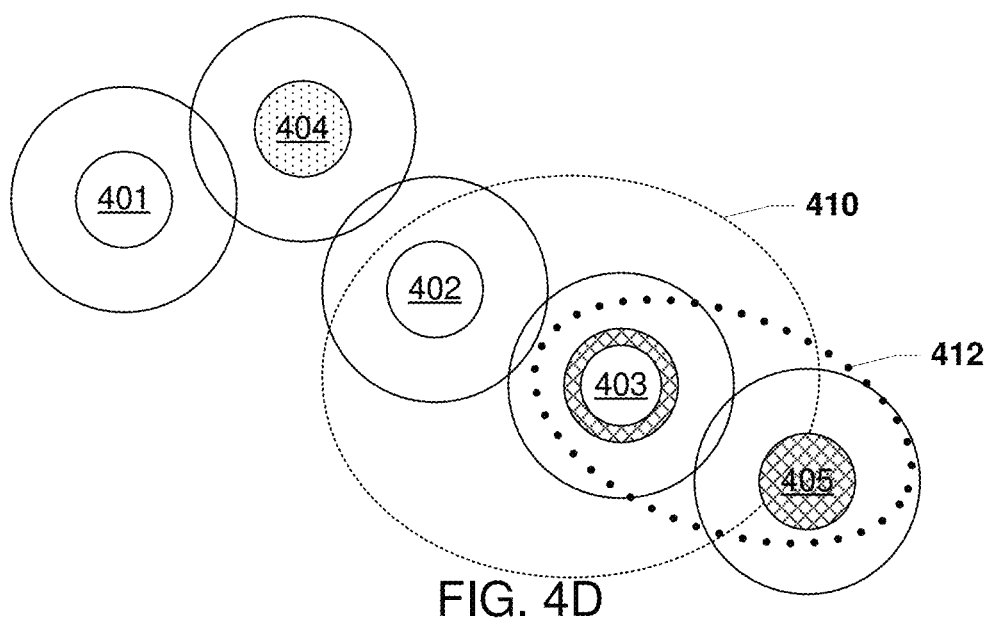
FIG. 4D illustrates aspects of simultaneous context broadcast networks according to various embodiments.

FIG. 4D illustrates aspects of simultaneous context broadcast networks 410 and 412 according to various embodiments. With reference to FIGS. 1A-4D, the network state illustrated in FIG. 4D may be similar to that illustrated in FIG. 4A described above except that an additional wireless device 405 may be present. For example, the additional wireless devices 405 may be any of wireless devices 120a-120h, or 200 including at least a context broadcast networking instance (e.g., 300, 350, 373, etc.). FIG. 4D illustrates that a wireless device, such as wireless device 403, may be part of two context broadcast networks 410 and 412 (also referred to as FabriQ networks for ease of reference) according to some embodiments.

As an example, the wireless device 403 in context broadcast network 410 may be a multi-user/account wireless device. The wireless device 403 may participate in multiple (e.g., two or more) context broadcast networks simultaneously, such as context broadcast network 410 established with wireless device 402 and context broadcast network 412 established with wireless device 405. For example, the wireless device 403 may divide its time between broadcasting and receiving messages associated and protected by a first account that is shared with wireless devices 402 thereby forming context broadcast network 410 while broadcasting and receiving messages associated and protected by a second account that is shared with the wireless device 405, thereby forming the network 412.

Figure 5:
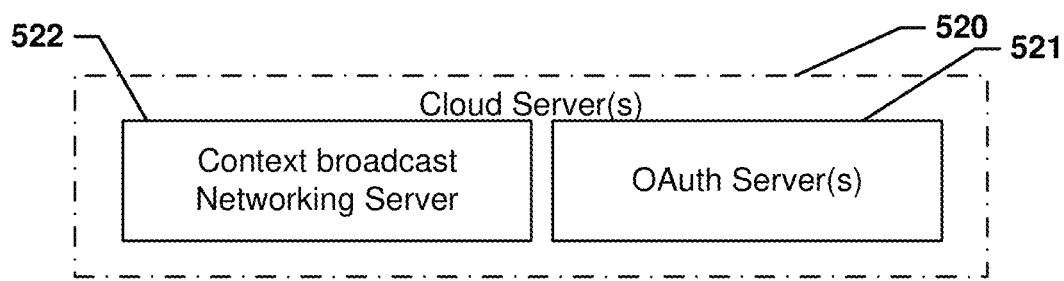
FIG. 5 illustrates a cloud server architecture in accordance with various embodiments.

FIG. 5 illustrates a cloud server 520 architecture in accordance with various embodiments. With reference to FIGS. 1A-5, the cloud servers 520 may include context broadcast networking server 522 (for example, server 198) and one or more OAuth server 521 (for example, server 199). The could servers 520 may perform distinction functions. An OAuth server 521 (for example, server 199), may determine unique identities of devices (e.g., devices 120a-h, 200, 401-405, etc.). A context broadcast networking server 522 (for example, server 198) may be referred to herein as a FabriQ server for ease of reference. A context broadcast networking server 522 (for example, server 198) may store account and provisioning information securely. Clients, such as applications 322, 372, OS components 320, 370, and/or OS services 318, 368, etc., may not interact with the cloud servers 520 directly. Rather, through APIs 310, 314, 360, and/or 362, clients, such as applications 322, 372, OS components 320, 370, and/or OS services 318, 368, etc., may interact with the context and aware manager 308, 358 which may interface with the cloud servers 520. Connectivity to the context broadcast networking server 522 (for example, server 198) may not always be required. For example, connectivity to the context broadcast networking server 522 (for example, server 198) may only be required during provisioning of a new hub wireless device.

Figure 6:
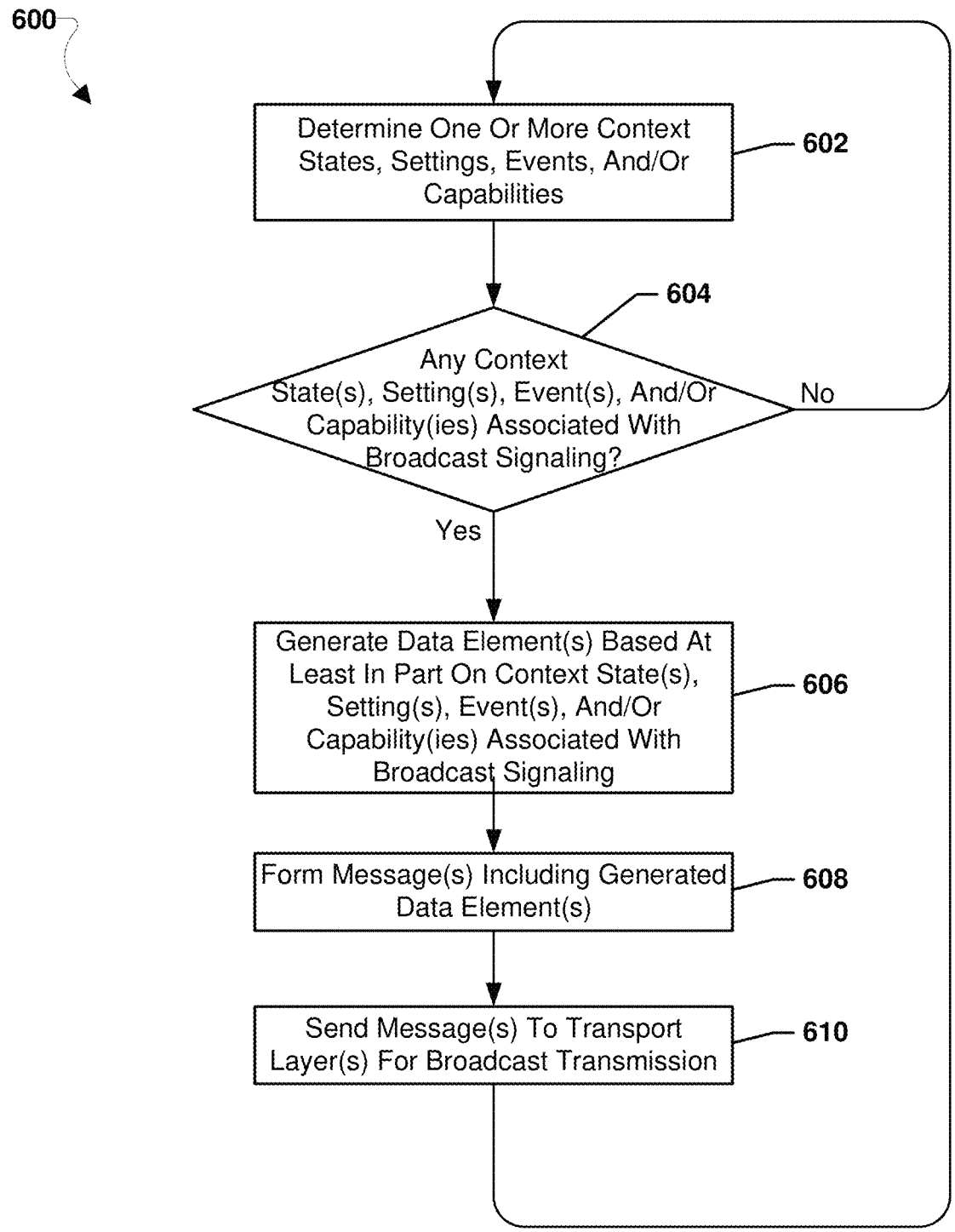
FIG. 6 is a process flow diagram illustrating a method for supporting context broadcast networking by a device in accordance with various embodiments.

FIG. 6 illustrates a method 600 for supporting context broadcast networking in accordance with various embodiments. With reference to FIGS. 1A-6, the method 600 may be performed by a processor (e.g., 210, 212, 214, 216, 218, 252, 260) of a device (e.g., the device 120a-120h, 200, 401, 402, 403, 404, 405). As examples, the operations of method 600 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-6, means for performing each of the operations of method 600 may be one or more processors of a device (e.g., the device 120a-120h, 200, 401, 402, 403, 404, 405), such as one or more of the processors 210, 212, 214, 216, 218, 252, 260 executing a context broadcast networking instance (e.g., 300, 350, 373, etc.) and/or portions of a context broadcast networking instance (e.g., a context and aware manager (e.g., 308, 358), a context and aware engine (e.g., 312, 362), and/or a context broadcast networking core (e.g., 304)).

In block 602, the processor may perform operations to determine one or more one or more context states, one or more settings, one or more events, and/or one or more capabilities. As examples, the one or more context states, one or more settings, one or more events, and/or one or more capabilities may be associated with the device, a user of the device, and/or an application running on the device. As examples, the one or more context states, one or more settings, one or more events, and/or one or more capabilities may be direct context states, settings, events, and/or capabilities and/or inferred context states, settings, events, and/or capabilities. Context states may be representations of a state or setting associated with the device, such as a user setting, a device setting, an application setting, etc. Events may be observable operations or state changes of the device, such as an application starting or stopping, a device being powered on or powered down, a user input indication (e.g., button press, touch screen interaction, etc.), removal of a device from a charging case, placement of a device into a charging case, insertion or removal of a cord, receipt of sensor data, etc. Context data may include device states (e.g., multimedia state, in ear state, screen active state, active application state, etc.), user activities (e.g., focusing, gaming, biking, in a meeting, etc.), user location (e.g., at home, at work, at a store, at an event, etc.), user biomarkers (e.g., temperature, glucose, alertness, heart rate, etc.), etc. The one or more context states, one or more settings, one or more events, and/or one or more capabilities may be monitored periodically and/or may be indicated to the processor by interrupts or other reporting. Means for performing the operations of block 602 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In determination block 604, the processor may perform operations to determine whether any of the one or more context states, one or more settings, one or more events, and/or one or more capabilities are associated with broadcast signaling. A series or rules and/or thresholds may govern whether any of the one or more context states, one or more settings, one or more events, and/or one or more capabilities are associated with broadcast signaling. For example, certain changes in context state may be associated with broadcast signaling. As another example, certain settings may be associated with broadcast signaling. As another example, certain events may be associated with broadcast signaling. As another example, certain capabilities may be associated with broadcast signaling. Context states, settings, events, and/or capabilities associated with broadcast signaling may be those context states, settings, events, and/or capabilities that may be useful to other devices. Means for performing the operations of block 604 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In response to determining that none of the context states, settings, events, or capabilities are associated with broadcast signaling are associated with broadcast signaling (e.g., determination block 604="No"), the processor may perform operations to determine one or more context states, one or more settings, one or more events, and/or one or more capabilities in block 602. In this manner, the processor may continue to monitor context states, settings, events, and/or capabilities until a context state, setting, event, and/or capability associated with broadcast signaling occurs.

In response to determining that at least one context state, setting, event, and/or capability is associated with broadcast signaling (e.g., determination block 604="Yes"), the processor may perform operations to generate one or more data elements based at least in part on the one or more context states, one or more settings, one or more events, and/or one or more capabilities in block 606. As an example, the processor may perform operations to generate one or more data elements based at least in part on the one or more context states, one or more settings, one or more events, and/or one or more capabilities associated with broadcast signaling in block 606. As examples, the one or more context states, one or more settings, one or more events, and/or one or more capabilities may be associated with the device, a user of the device, and/or an application running on the device. As examples, the one or more context states, one or more settings, one or more events, and/or one or more capabilities may be direct context states, settings, events, and/or capabilities and/or inferred context states, settings, events, and/or capabilities. In some embodiments, context (and/or event) information may be communicated in a data element (DE) using a length/tag/data (LTD) format. The LTD format may enable a context broadcast networking instance (e.g., 300, 350, 373, etc.) to be data agnostic. Being data agnostic may enable both forward and backwards device compatibility. In some embodiments, three data element tag name spaces may be defined: Core; Fully Qualified; and Short. Core tag name spaces may include publicly defined data elements used for context and event reporting common to many devices. Fully qualified tag name spaces may include publicly or privately defined data elements. Fully qualified tag name spaces may use reverse domain name space (DNS) name notation. Short tag name spaces may be compact identities for fully qualified names spaces that may facilitate efficient transmission. Means for performing the operations of block 606 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In block 608, the processor may perform operations to form one or more messages including the generated data elements. In some embodiments, data elements may be aggregated together, such as based on common Quality of Service (QoS) requirements or other common attributes of data elements. A data element set (DE set) may be a group of data elements (DEs) aggregated together. Data elements sets may include one or more data elements concatenated together in any order. Data element sets may be segmented based on characteristics of the transport layer (or layers) to be used for broadcast transmission, such as the maximum transport unit (MTU) size of the transport layer (MTU$_T$) or other attributes of the transport layer. Segmented data element sets may be encrypted, and the encrypted segmented data element sets may be packetized for sending over one or more radio transport layers. In some embodiments, the operations of block 608 may be performed on a low power island (or low power core) (e.g., low power island 302). Means for performing the operations of block 608 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In some embodiments, the messages may be private or public messages. Public messages may be acted upon by all devices within range and/or on the same network. Private messages may only be understood by devices with the same user account credentials. Private messages may not include any cleartext identifiable or trackable information (e.g., device addresses, values derived from account names, etc.). A public message or a private message may include a generator value and a data element set. In a private message, the generator value may be obfuscated and the data element set may be encrypted. The generator value may be a time based value or a counter based value. The generator value may be encrypted using the shared account credentials.

In block 610, the processor may perform operations to send the one or more messages to one or more transport layers for broadcast transmission. For example, the one or more messages may be packetized encrypted segmented data element sets sent to one or more radio transport layers, such as a BLE transport layer, Zigbee transport layer, CHIP transport layer, Wi-Fi transport layer, Bluetooth ACL transport layer, etc. Messages may be sent via more than one transport layer. For example, the same data elements and/or data element sets may be sent as duplicate messages over two or more different transport layers. In some embodiments, sending the one or more messages to the one or more transport layers for broadcast transmission may include setting backoff conditions for the broadcast of the one or more messages. For example, sending the one or more messages may include setting a broadcast interval and/or a repetition value for the one or more messages. In some embodiments, the broadcast interval and the repetition value may be adjusted based at least in part on a power state of the device. For example, a device power state (e.g., on battery, low battery, etc.) entry or exit event may result in the adjustment of the broadcast interval and/or the repetition value. In some embodiments, the operations of block 610 may be performed on a low power island (or low power core) (e.g., low power island 302). Means for performing the operations of block 610 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

As one example, Bluetooth LE advertising may be used to send the one or more messages for broadcast transmission. Each encrypted segment may be transported in a Service universally unique identifier (UUID) data tag using the FabriQ service UUID. This may be a custom 16-bit service UUID or 128-bit service UUID. The encrypted segments may be advertised in sequence. The interval and/or repetition for advertising segments may be according to a back off scheme. As one example of a back off, the interval for advertising may be set to one of three values. Whenever the state data changes, the interval may be set to 125 ms and the segments transmitted a minimum of 6 times. After this is complete, the interval may be increased to 1 second and the segments transmitted a minimum of 6 times. After this is complete, the interval may be set to 5 seconds. For example, if the state data is segmented into 8 segments, the complete state data would be transmitted over 1 second, and then repeated another 5 times over the next 5 seconds. It would then be completely transmitted once every 8 seconds over the next 48 seconds. It would then be transmitted once every 5 seconds, taking 40 seconds to completely transmit the state data. This may be a compromise between quickly transmitting the state data to nearby devices and power efficiency.

As another example, Bluetooth ACL may be used to send the one or more messages for broadcast transmission. For example, a FabriQ service may be exposed. This FabriQ service may have a single characteristic that can be read and written. When read, it may return the next encrypted segment available. When written, it may receive the next encrypted segment available from this device. This may enable a device to read the state information from a peer device at any time, and inform a peer device of a local state change at any time.

Figure 7:
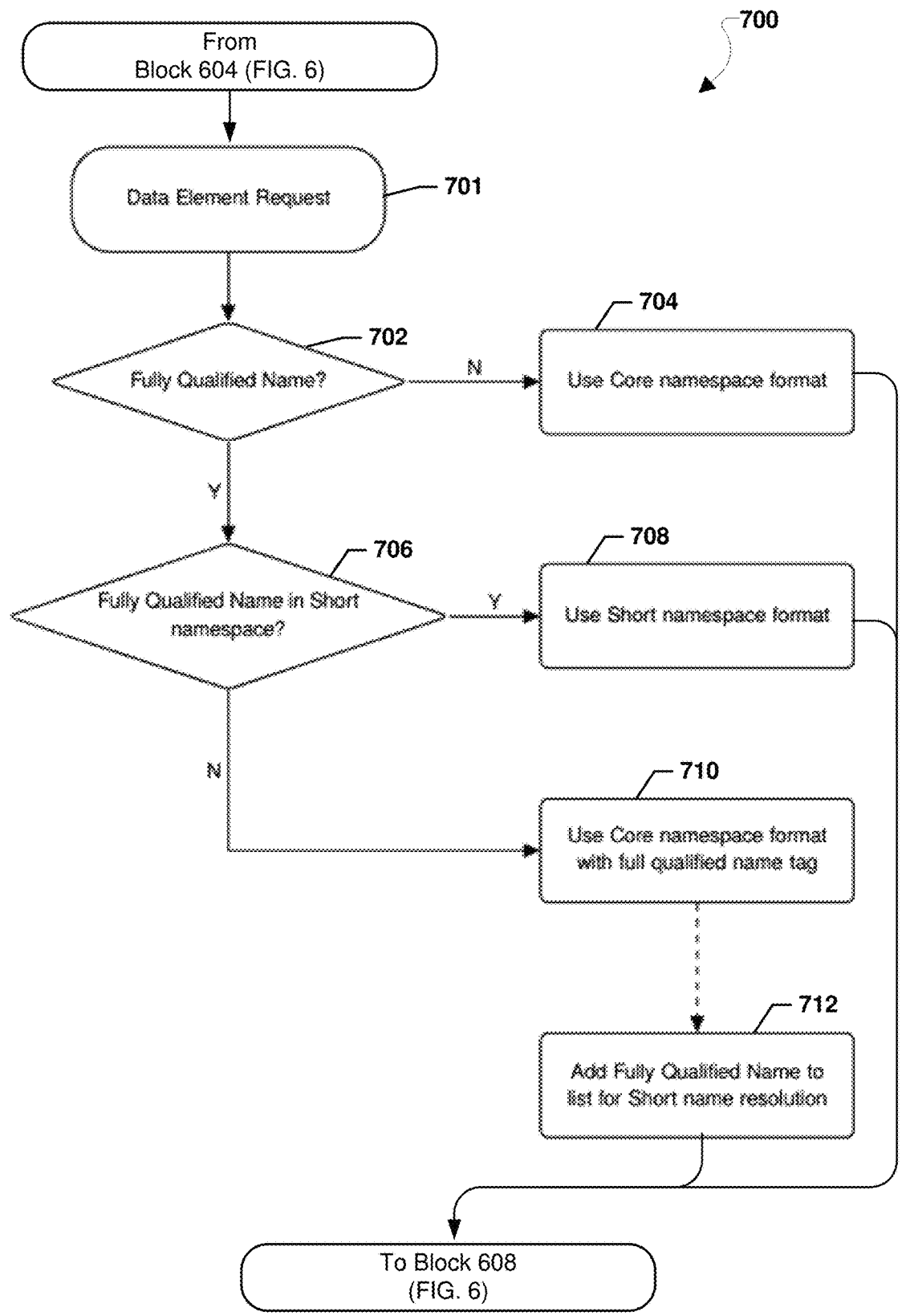
FIG. 7 is a process flow diagram illustrating a method for selecting a data element format in accordance with various embodiments.

FIG. 7 illustrates a method 700 for selecting a data element format in accordance with various embodiments. With reference to FIGS. 1A-7, the method 700 may be performed by a processor (e.g., 210, 212, 214, 216, 218, 252, 260) of a device (e.g., the device 120a-120h, 200, 401, 402, 403, 404, 405). As examples, the operations of method 700 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-7, means for performing each of the operations of method 700 may be one or more processors of a device (e.g., the device 120a-120h, 200, 401, 402, 403, 404, 405), such as one or more of the processors 210, 212, 214, 216, 218, 252, 260 executing a context broadcast networking instance (e.g., 300, 350, 373, etc.) and/or portions of a context broadcast networking instance (e.g., a context and aware manager (e.g., 308, 358), a context and aware engine (e.g., 312, 362), and/or a context broadcast networking core (e.g., 304)). In some embodiments, the operations of method 700 may be performed in conjunction with the operations of method 600 (FIG. 6). As an example, the operations of method 700 may be performed as part of the operations to generate one or more data elements based at least in part on the one or more context states, one or more settings, one or more events, and/or one or more capabilities in block 606.

In response to determining that at least one context state, setting, event, or capability is associated with broadcast signaling (e.g., determination block 604="Yes"), the processor may perform operations to generate a data element request in block 701. A data element request may be a request for a data element associated with the context states, settings, events, and/or capabilities associated with broadcast signaling. A data element request may be a request for a data element associated with the context states, settings, events, and/or capabilities of the device, a user of the device, and/or an application running on the device. Means for performing the operations of block 701 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In determination block 702, the processor may perform operations to determine whether a data element with a fully qualified name is associated with the data element request. In some embodiments, only a subset of data element requests may be associated with fully qualified names. Fully qualified names may be predefined assigned names to an application or service that may enable the application or service to define its own data elements. For example, a fully qualified name may be associated with an OEM, an ODM, a software company, etc. Means for performing the operations of block 702 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In response to determining a fully qualified name is not associated with the data element request (i.e., determination block 702="N"), the processor may use a core namespace format for the data element in block 704. The core namespace format may be publicly available to all applications and services and may not require full qualification ahead of time. In this manner, any application or service may cause data elements to be generated and used using core name space formats. Means for performing the operations of block 704 may include one or more processors of a device (e.g., the device 120a-120h, 200, 401, 402, 403, 404, 405), such as one or more of the processors 2 (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In response to determining a fully qualified name is associated with the data element request (i.e., determination block 702="Y"), the processor may determine whether the fully qualified name is in a short name space listing in determination block 706. The short name space listing may be a listing of short name space tags previously used for fully qualified name spaces. The short name space tags may be reduced data tags enabling less data to be used than would otherwise be required for sending the fully qualified name itself. Means for performing the operations of block 706 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In response to determining that a fully qualified name is already in the short namespace (i.e., determination block 706="Y"), the processor may use the short namespace format in block 708. In this manner, once a fully qualified name has been associated with a short name space tag, the same short name space tag may be used repeatedly for that data element of a fully qualified name space. In this manner, application to application communication may occur using the fully qualified name space and short name space formats without having to have the tags for fully qualified names pre-provisioned to the device. Means for performing the operations of block 708 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In response to determining that a fully qualified name is not in the short namespace (i.e., determination block 706="N"), the processor may use the core namespace format with a qualified name tag in block 710. The qualified name tag may be an assigned short name tag. This device triggered short name tag generation may support application to application communication using the fully qualified name space and short name space formats without having to have the tags for fully qualified names pre-provisioned to the device. Means for performing the operations of block 710 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304).

In block 712, the processor may add the fully qualified name to the list for short name resolution. In this manner, the next time a data element request for the same fully qualified name occurs, the short name tag may be available for use. Means for performing the operations of block 712 may include one or more processors of a device (e.g., the device 120a-120h, 200, 401, 402, 403, 404, 405), such as one or more of the processors (e.g., 210, 212, 214, 216, 218, 252, 260) executing a context broadcast networking instance (e.g., 300, 350, 373, etc.) and/or portions of a context broadcast networking instance such as a context and aware manager (e.g., 308, 358), a context and aware engine (e.g., 312, 362), and/or a context broadcast networking core (e.g., 304)).

In response to using the core namespace format in block 704, the short name space format in block 708, or adding the fully qualified name to the list for short name resolution in block 712, the processor may proceed to block 608 of method 600 (FIG. 6).

Figure 8A:
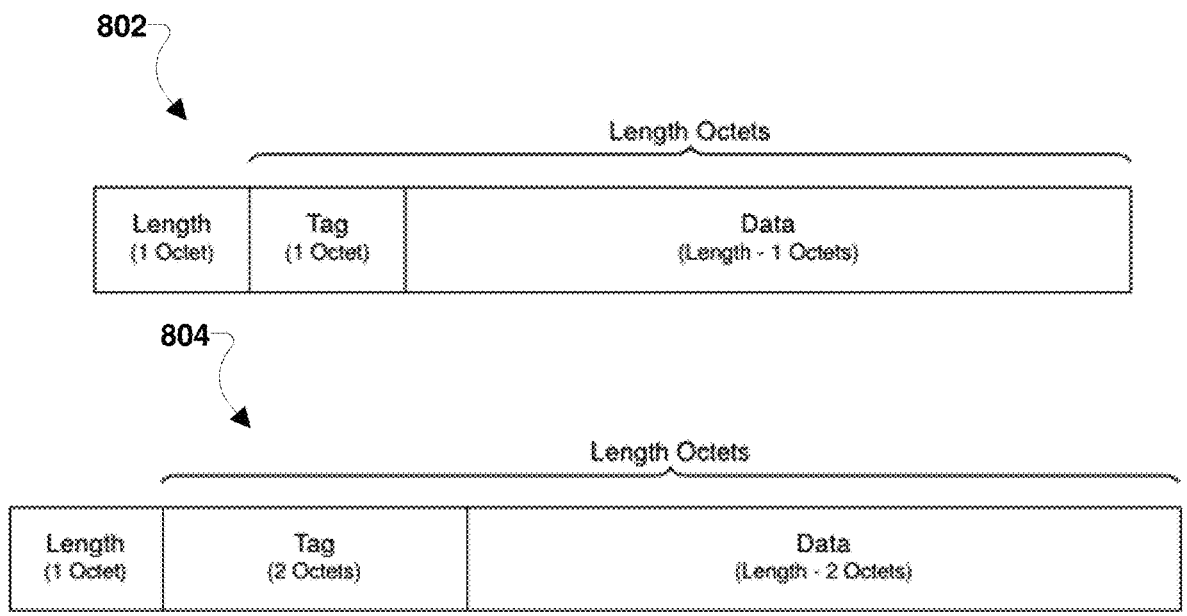
FIG. 8A is a block diagram illustrating an example of a data element format for a core namespace data element and a data element format for a short name space data element in accordance with various embodiments.

FIG. 8A is a block diagram illustrating an example of a data element format for a core namespace data element 802 and a data element format for a short name space data element 804 in accordance with various embodiments. With reference to FIGS. 1A-8A, the core namespace data element 802 and/or the short name space data element 804 may be data elements generated according to one or more operations of methods 600 (FIG. 6) and/or 700 (FIG. 7). In the core namespace data element 802 and/or the short name space data element 804, the length field may be combined length of the tag and data fields. The length field may be an 8-bit unsigned integer and support any length from 1 to 255 octets.

Each tag value may have a fixed meaning. In some embodiments, tags in the core name space may have a one octet length. In some embodiments, tags in the short name space may have a two octet length. In some embodiments, fully qualified names that cannot be resolved to a short name space may be tunneled via a core name space tag. The format for the data fields may be determined by the tag. As the tag may have variable length, the data may have a variable length. The total length of the tag plus the data in the core namespace data element 802 and/or the short name space data element 804 may be less than 255 octets. The data field of the core namespace data element 802 and/or the short name space data element 804 may be data associated with a context state and/or event. The data may be provided by an application or service (e.g., applications 322, 372) and need not be understandable by the context broadcast networking core 304 or other aspects of the context broadcast networking instances (e.g., 300, 350, 373, etc.).

Figure 8B:
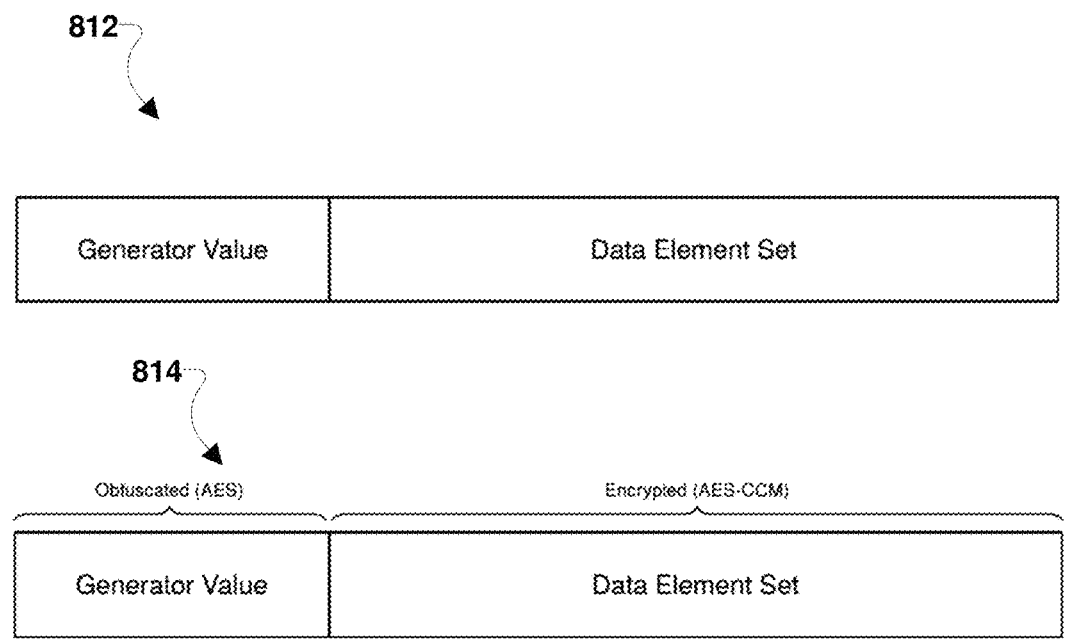
FIGS. 8B-8D are block diagrams illustrating message formats for broadcast transmissions in accordance with various embodiments.

FIG. 8B is a block diagram illustrating an example of message formats for broadcast transmissions in accordance with various embodiments. With reference to FIGS. 1A-8B, a public message format 812 and a private message format 814 are illustrated. A public message 812 may be acted upon by all devices within range and/or on the same network. A private message 814 may only be understood by devices with the same user account credentials. A private message 814 may not include any cleartext identifiable or trackable information (e.g., device addresses, values derived from account names, etc.). A public message 812 or a private message 814 may include a generator value and a data element set. In a private message 814, the generator value may be obfuscated and the data element set may be encrypted. For example, the generator value may be obfuscated according to the Advanced Encryption Standard (AES) and the data element may be encrypted according to the AES in counter with cipher block chaining message authentication code (CBC-MAC) (CCM). The generator value may be a time based value or a counter based value. The generator value may be encrypted using the shared account credentials.

Figure 8C:
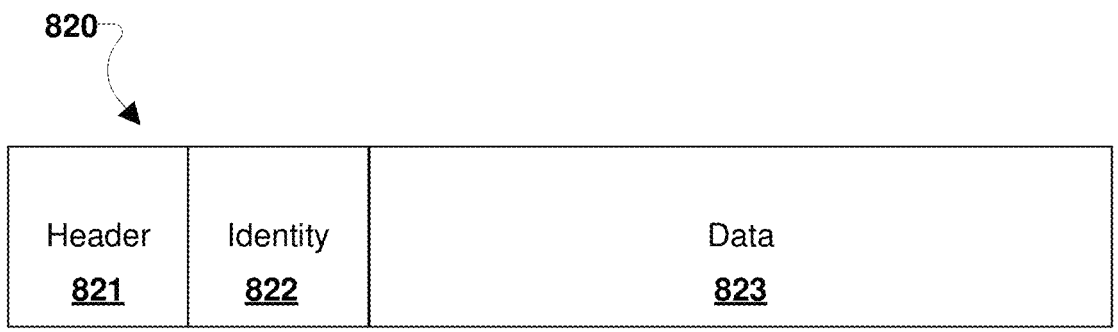

FIG. 8C is a block diagram illustrating an example of a message format for broadcast transmissions in accordance with various embodiments. With reference to FIGS. 1A-8C, the message 820 may be a public message, such as public message 812, or a private message, such as private message 814.

The message 820 may include a header element 821, such as a one-octet header element, a two-octet header element, a greater than two-octet header element, etc. The header element 821 may indicate a format of the message 820. The message 820 may include an identity element 822. In some embodiments, the identity element 822 may indicate an intended recipient device (e.g., the device 120a-120h, 200, 401, 402, 403, 404, 405) of the message 820. The identity element 822 may include encrypted metadata. In some embodiments, the identity element 822 may support duplicate message filtering by receiving devices (e.g., the device 120a-120h, 200, 401, 402, 403, 404, 405).

In some embodiments, the identity element 822 may have different structures depending on a type of the message 820. For example, a public message may have a different identity element 822 structure than the structure of the identity element 822 of a private message. The identity element 822 may vary in size. For example, the identity element 822 may be a one-octet element, a two-octet element, a three-octet element, a four-octet element, a greater than two-octet header element, etc.

Figure 8D:
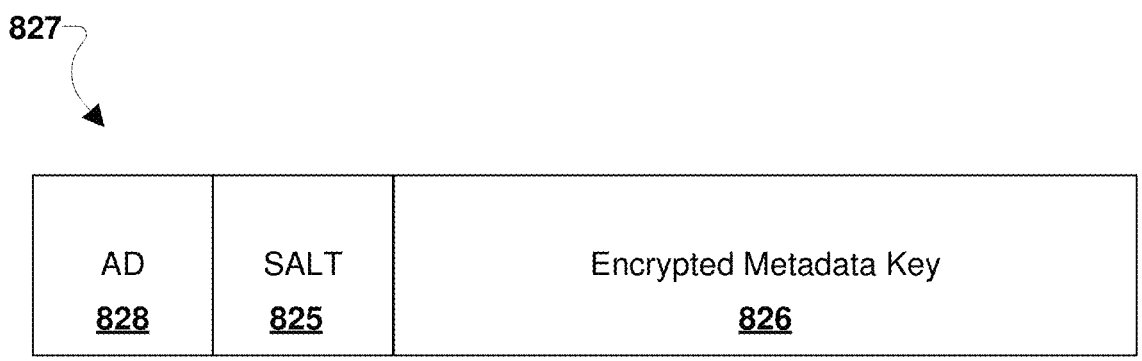

FIG. 8D is a block diagram illustrating an example of a message format for broadcast transmissions in accordance with various embodiments. With reference to FIGS. 1A-8D, FIG. 8D illustrates an example of an identity element 827 (e.g., an example of identity element 822) including an associated data (AD) element 828, a salt element 825, and an encrypted metadata key 826.

The AD element 828 may be an account identity value that identifies an intended recipient of a private message. As private messages (e.g., private message 814, etc.) may only be understood by devices with the same user account credentials, the AD element 828 may enable a receiving device (e.g., the device 120a-120h, 200, 401, 402, 403, 404, 405) to determine whether the message is intended for the receiving device or not intended for the receiving device. The AD element 828 may be obfuscated according to the AES. In some embodiments, the AD element 828 may be an account identity value calculated from a hash of the end user private certificate field and a truncated time value.

The account identity value of the AD element 828 may be pre-calculated by a device (e.g., the device 120a-120h, 200, 401, 402, 403, 404, 405) using the user account credentials. The pre-calculated account identity value may be referred to as a private AD value. A transmitting device may write the private AD value into the AD element 828 of a private message. A receiving device may compare the pre-calculated account identity value (the private AD value) stored at the receiving device with the AD element 828 to determine whether the private AD value indicated in the AD element 828 matches the stored pre-calculated account identity value (the private AD value) that the receiving device calculated using the user account credentials. A match between the stored private AD value and the private AD value indicated in the AD element 828 may indicate that the private message is from a device with the same user account credentials and is intended for the receiving device. A mis-match between the stored private AD value and the private AD value indicated in the AD element 828 may indicate that the private message is not from a wireless device with the same user account credentials (e.g., from a device with different user account credentials) and is not intended for the receiving device.

Non-matching private AD values may indicate that the message may be ignored and/or dropped. Messages with a private AD value in the AD element 828 that do not match the stored pre-calculated account identity value (e.g., the private AD value) that the receiving device calculated using the user account credentials may not be further handled and/or decrypted. For example, no processing may be expended on such non-matching private AD value messages, thereby avoiding the processing of the salt element 825 and/or the encrypted metadata key 826. By not expended processing resources on such non-matching private AD value messages, the processing resources required to process the salt element 825 and/or the encrypted metadata key 826 and associated power consumption may be conserved. In some embodiments, the operation(s) required to compare the pre-calculated account identity value (the private AD value) stored at the receiving device to the AD element 828 may be a simple value comparison operation that requires fewer processing resources and consumes less power than operations required to decrypt a portion of a message.

The salt element 825 may a random value that is unique to each message. The salt element may be not be reused for the duration of a certificate. The salt element 825 may be of various sizes, such as a one-octet element, a two-octet element, a greater than two-octet element, etc. The salt element 825 may be randomly generated by a sending or transmitting device (e.g., the device 120a-120h, 200, 401, 402, 403, 404, 405) sending a message (e.g., message 814, 820, etc.). The salt element 825 may be unique to the data (e.g., 823, etc.) and/or data element sets of a message (e.g., message 814, 820, etc.). In some embodiments, the same salt element 825 may be used across radio transport layers when the data (e.g., 823, etc.) and/or data element sets of a message (e.g., message 814, 820 etc.) are sent. In some embodiments, the same salt element 825 may be reused when the data (e.g., 823, etc.) and/or data element sets of a message (e.g., message 814, 820, etc.) are retransmitted. As an example, data 823 may be sent via a Bluetooth radio transport layer and a Wi-Fi radio transport layer, in which case the salt element 825 may be the same in both the message received via the Bluetooth radio transport layer and the Wi-Fi radio transport layer. As another example, when a message with the same data 823 is retransmitted, the salt element 825 used in the original transmission may be used in the retransmission of the data 823.

In some embodiments, the unique association of the salt element 825 with the data (e.g., 823, etc.) and/or data element sets by a transmitting and/or sending device may enable the salt element 825 to be used by receiving devices for duplicate detection and/or filtering. For example, a receiving device may log the value of the salt element 825 obtained from a received message (e.g., message 814, 820, etc.). As subsequent messages are received, the salt element 825 in those subsequent messages may be compared to the log of salt values of received messages. Identifying a match of the salt element 825 to a salt value in the log of salt values of received messages may indicate that the subsequent message is a duplicate message carrying already received data (e.g., 823, etc.) and/or data element sets. If no match is identified by comparison of the salt element 825 to the log of salt values of received messages, this may indicate that the subsequent message is a new message. New messages may be further processed and/or decrypted. Duplicate messages carrying already received data (e.g., 823, etc.) and/or data element sets (i.e., messages with salt elements 825 matching a salt value in the log of salt values of received messages) may be ignored and/or dropped. Duplicate messages may not be further handled and/or decrypted. For example, no processing resources may be expended to process the encrypted metadata key 826 of duplicate messages. By not processing duplicate messages in this manner, the encrypted metadata key 826 processing resources and associated power may be conserved.

The encrypted metadata key 826 may be a data element that is encrypted by the device sending a message (e.g., message 814, 820, etc.) using the user account credentials. The encrypted metadata key 826 may be decrypted by a device receiving the message (e.g., message 814, 820, etc.) with a key associated with the user account credentials, such as a private key associated with the user account credentials. The encrypted metadata key 826 may be decrypted and the data within the encrypted metadata key 826 may be used with a private certificate to decrypt data (e.g., 823, etc.) and/or data element sets of the message (e.g., message 814, 820, etc.). Successfully decrypting the encrypted metadata key 826 may indicate that that message (e.g., message 814, 820, etc.) originated, and was received, from another device having the same account credentials. Failure to decrypt the encrypted metadata key 826 may indicate that the message (e.g., message 814, 820, etc.) did not originate, and was not received, from another device having the same account credentials (e.g., the message was originated and/or received from a device from another account).

Figure 9:
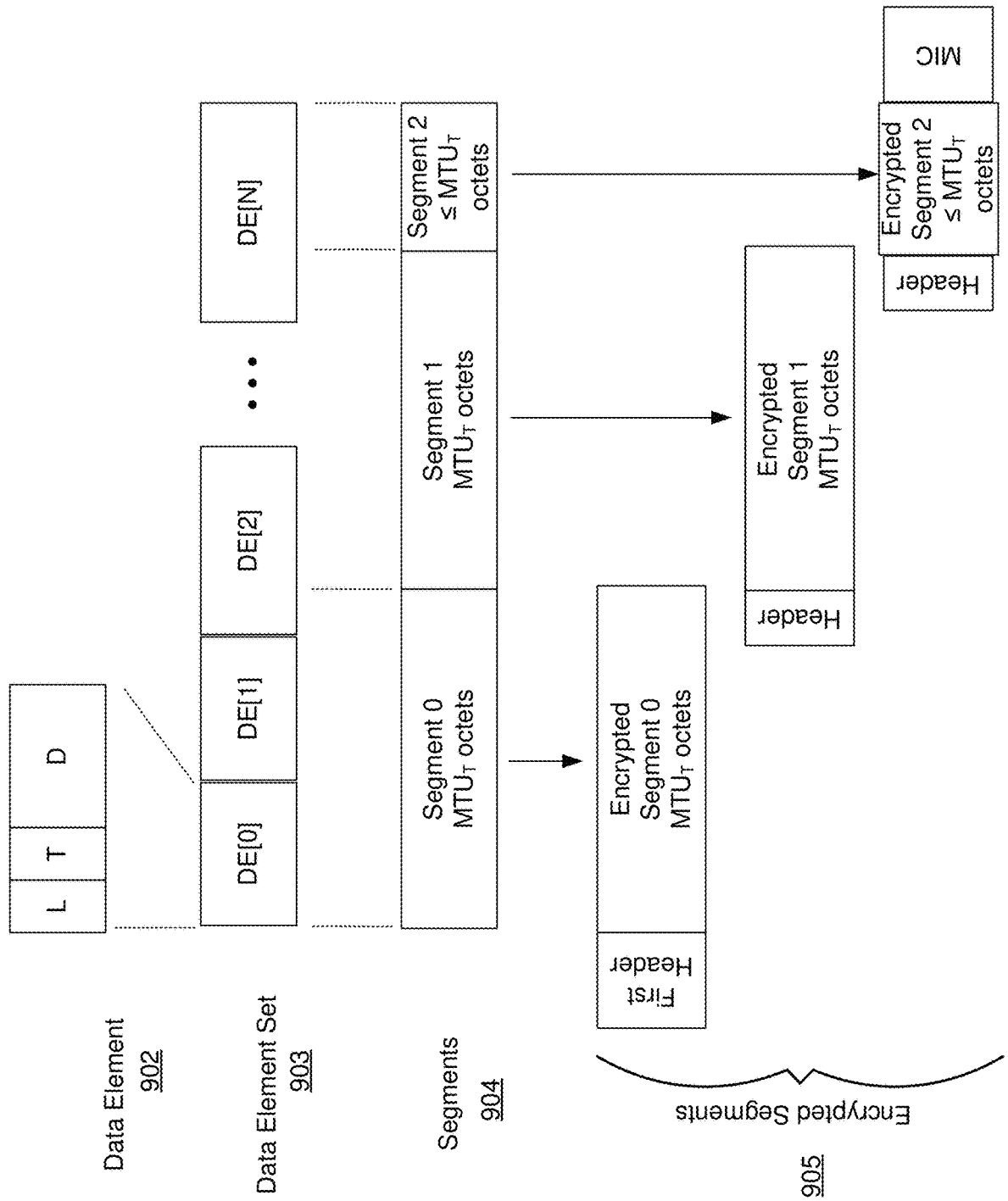
FIG. 9 is a block diagram illustrating an example message formation for a data element set in accordance with various embodiments.

FIG. 9 is a block diagram illustrating an example message formation for a data element set in accordance with various embodiments. With reference to FIGS. 1A-9, the message formation may be performed according to one or more operations of methods 600 (FIG. 6) and/or 700 (FIG. 7). As an example, the message formation illustrated in FIG. 9 may be a portion of the operations to form one or more messages including one or more generated data elements in block 608 of method 600 (FIG. 6). The message formation illustrated in FIG. 9 may result in the formation of a private message, such as private message 814, 820, etc.

A data element 902 may be generated in an LTD format, for example as discussed with reference to core namespace data element 802 and/or the short name space data element 804 of FIG. 8A. Data elements may be aggregated together, such as based on common QoS requirements or other common attributes of data elements, into a data element set 903 of a number, n, date elements. While any number, n, of data elements may be combined into a data set, the number, n, may be limited by the constraints of the transport layer. Data elements set 903 may include one or more data elements concatenated together in any order. Multiple DE Sets may be active at any given time. DE sets can be used to organize data based on required QoS requirements such as latency. For example, one group may be used for DE sets that need to be sent out immediately (e.g., time sensitive state information like an earbud entering the ear). Other DE sets may be scheduled to be sent at different rates. A DE may be part of more than one DE set.

The data element set 903 may be segmented into a series of segments 904 based on characteristics of the transport layer (or layers) to be used for broadcast transmission, such as the maximum transport unit (MTU) size of the transport layer ($MTU_T$) or other attributes of the transport layer. For example, FIG. 9 illustrates the data element set 903 split into three segments, Segment 0, Segment 1, and Segment 2. Segment 0 and Segment 1 may be the same number of octets, such as $MTU_T$ number of octets, while Segment 2 may be less than or equal to the $MTU_T$ number of octets. In preparing a data element set to be sent over a transport layer, the data element set may be split into one or more segments based on the $MTU_T$. If the length of the data element set is greater than the $MTU_T$, then each segment until the last segment may have $MTU_T$ octets. The size of the last segment may be less than or equal to $MTU_T$ octets. In some embodiments, the length of the segments may differ for various reasons, including the header lengths being different, the message integrity check (MIC) value being applied to a last segment, etc.

A first segment may have a group length field, such as a 14 bit filed, that describes the total length of the DE set in octets, such as 1-16,383 octets. A first segment may include a segment data field of 1-n octets that may be data contents of the segment.

Each non-first segment may have a segment offset field, such as a 14 bit filed, that describes the offset into the DE set in octets, such as 1-16,383 octets, of that segment. Each non-first segment may include a segment data field of 1-n octets that may be data contents of the segment.

Segmented data element sets may be encrypted into encrypted segments 905. The encrypted segmented data element sets may be packetized for sending over one or more radio transport layers. Each encrypted segment must fit within the maximum length packet of the underlying transport layer. Each encrypted segment may include a first segment flag (FSF) that may be a 1 bit value. For example, 0 may indicate the segment is not the first segment and 1 may indicate the segment is the first segment. The FSF may be set to 1 when the segment contains the very first part of the state data. Each encrypted segment may include a last segment flag (LSF) that may be a 1 bit value. For example, 0 may indicate the segment is not the last segment and 1 may indicate the segment is the last segment. The LSF may be set to 1 when the segment contains the very last part of the state data. Each encrypted segment may include a group length/segment offset field that may be a 14 bit value. For example, when the FSF is equal to 1, the length of the DE set may be indicated in the group length/segment offset field and when the FSF is equal to 0, the offset from the beginning of the start of the state data may be indicated in the group length/segment offset field. The segment offset may be the offset into the state data for the first octet of the segment data. Each encrypted segment may include a generator value field that may be 8 or 48 bits. The generator value field may be 48 bits when the FSF equals 1 and 8 bits otherwise. In this manner, if the encrypted segment has the first segment flag set, then it is the first segment and will include the full generation value. Otherwise (e.g., it is not a first segment), it shall include the least significant octet of the generation value. The generation value may change each time the state data changes in any way (length, contents, etc.) or after a fixed period of time in order to prevent tracking. For encryption, a nonce may be created form the generator value and an initialization vector that changes periodically, such as every fifteen minutes. An encrypted segment may include a MIC field of 32 bits. The MIC field may only be present when the LSF equals 1. Encryption algorithms, such as Advanced Encryption Standard (AES) 128, may be used to encrypt the data, generating an encrypted segmented data and encrypted 32-bit MIC. Additional flag bits may be present in the encrypted segments and the segment offset may be less than 14 bits, such as 13 bits.

Figure 10A:
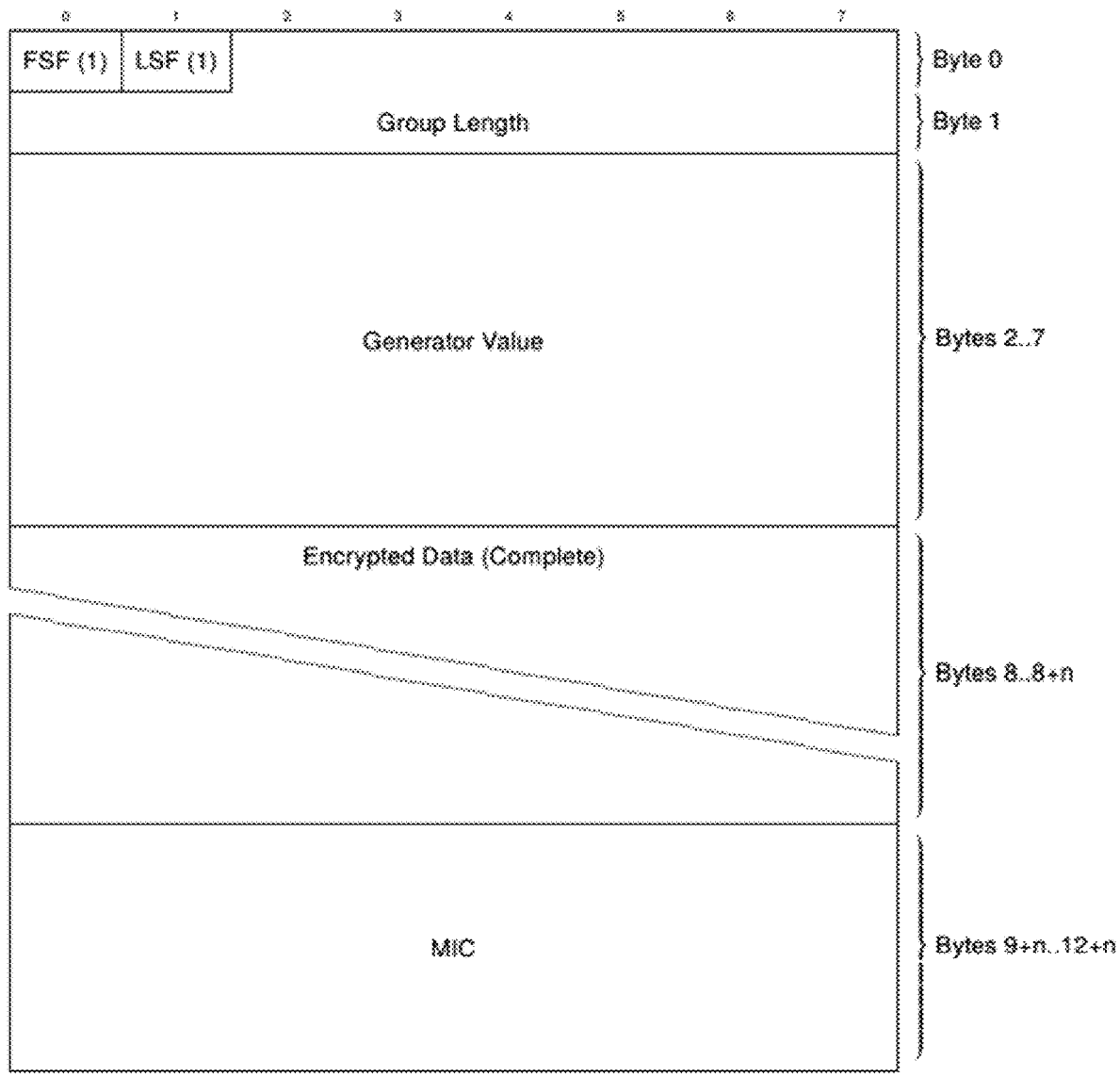
FIGS. 10A, 10B, 10C, and 10D illustrate example encrypted segments in accordance with various embodiments.
Figure 10B:
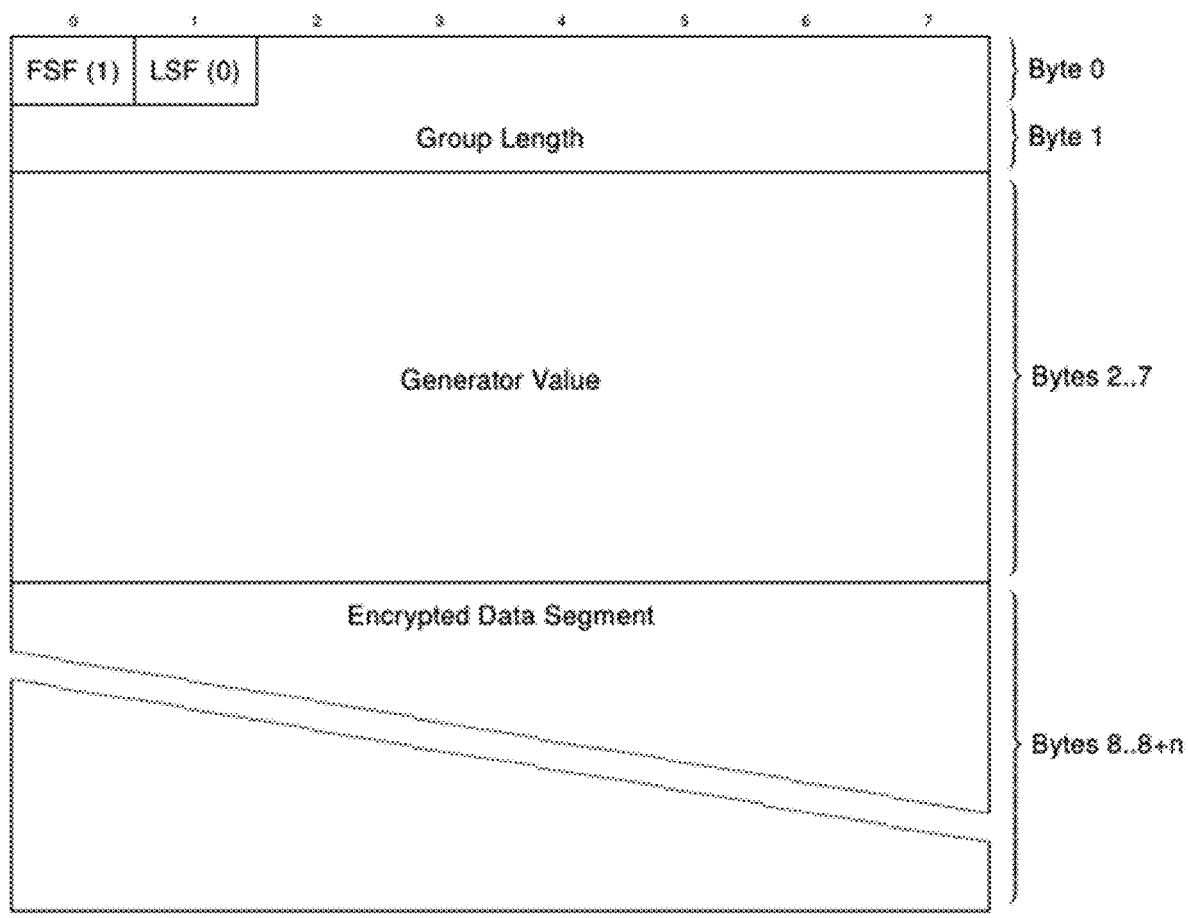
Figure 10C:
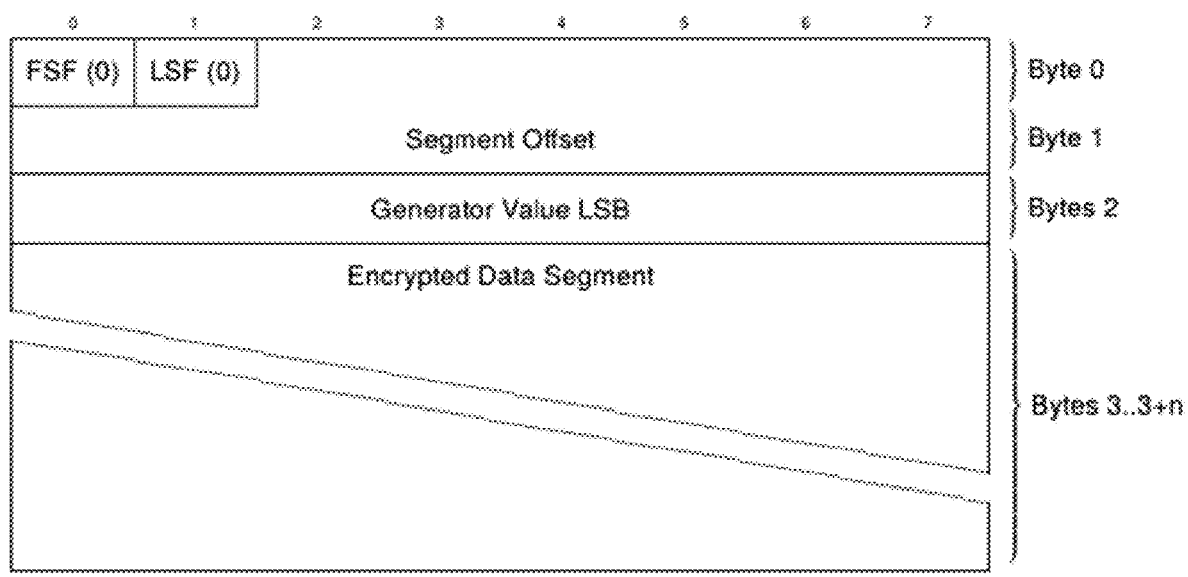
Figure 10D:
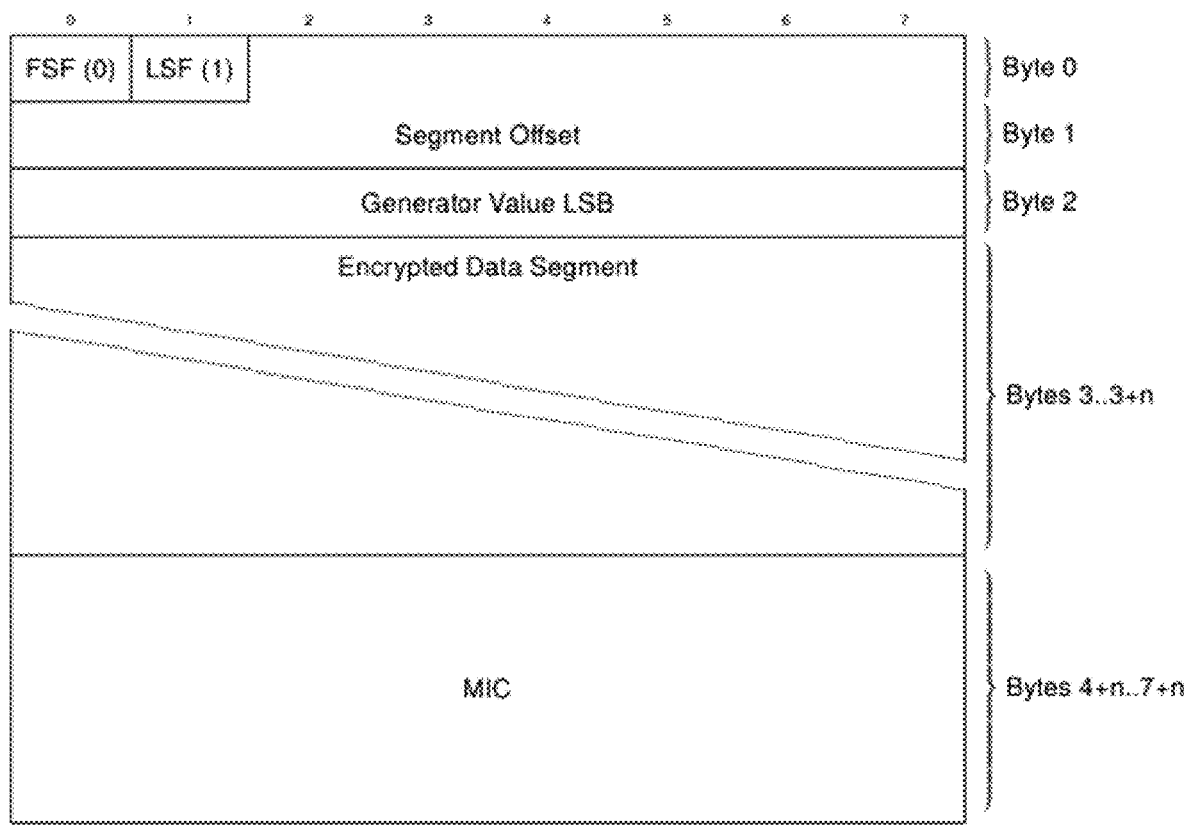

FIGS. 10A, 10B, 10C, and 10D illustrate example encrypted segments in accordance with various embodiments. With reference to FIGS. 1A-10D, the encrypted segments of FIGS. 10A, 10B, 10C, and/or 10D may be generated according to one or more operations of methods 600 (FIG. 6) and/or 700 (FIG. 7) and/or as described with reference to FIG. 9. As an example, FIG. 10A illustrates a complete encrypted segment that may be both the first and last segment, for example when a single segment is all that may be required to transport a DE set. FIG. 10B illustrates an example of a first encrypted segment when more than one segment is required to transport a DE set. FIG. 10C illustrates an example of a middle encrypted segment when more than two segments are required to transport a DE set. FIG. 10D illustrates an example of a last encrypted segment when more two or more segments are required to transport a DE set.

Figure 11:
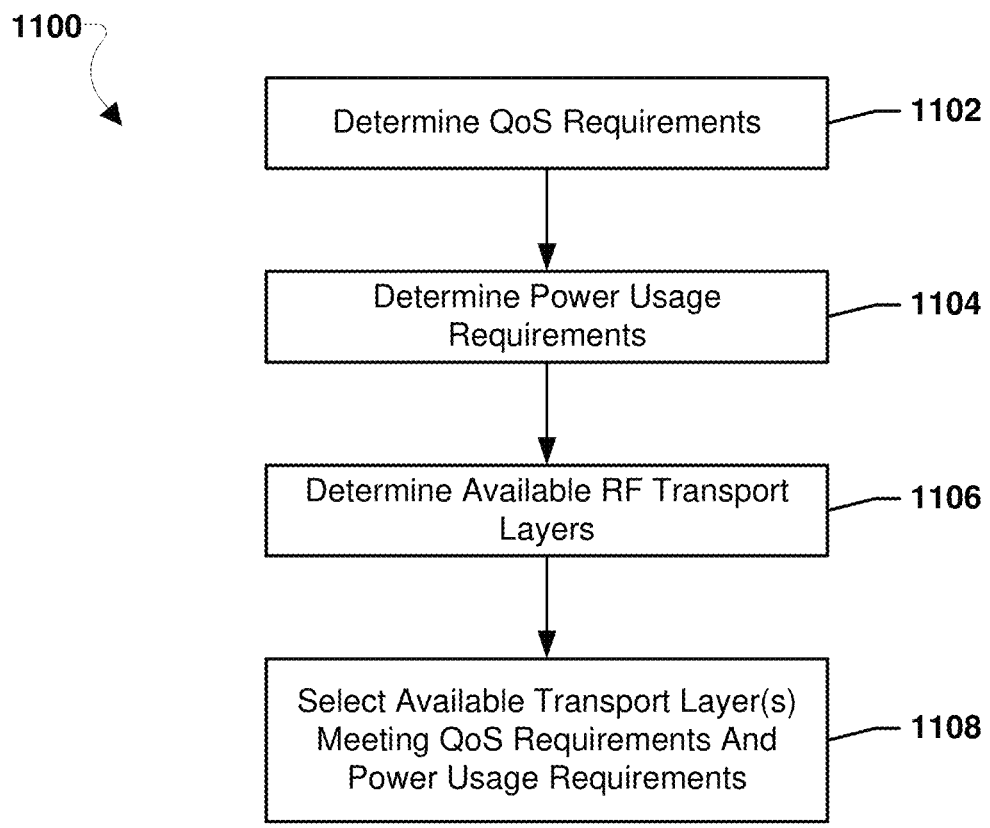
FIG. 11 is a process flow diagram illustrating a method for selecting available radio frequency (RF) transport layers in accordance with various embodiments.

FIG. 11 illustrates a method 1100 for selecting available RF transport layers in accordance with various embodiments. With reference to FIGS. 1A-11, the method 1100 may be performed by a processor (e.g., 210, 212, 214, 216, 218, 252, 260) of a device (e.g., the device 120a-120h, 200, 401, 402, 403, 404, 405). As examples, the operations of method 1100 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-11, means for performing each of the operations of method 1100 may be one or more processors of a device (e.g., the device 120a-120h, 200, 401, 402, 403, 404, 405), such as one or more of the processors 210, 212, 214, 216, 218, 252, 260 executing a context broadcast networking instance (e.g., 300, 350, 373, etc.) and/or portions of a context broadcast networking instance (e.g., a context and aware manager (e.g., 308, 358), a context and aware engine (e.g., 312, 362), and/or a context broadcast networking core (e.g., 304)). In some embodiments, the operations of method 1100 may be performed as part of the operations of method 600 (FIG. 6). As an example, the operations of method 1100 may be performed as part of the operations to messages to transport layers for broadcast transmission in block 610.

In block 1102, the processor may perform operations to determine QoS requirements. QoS requirements may include latency requirements, signal strength requirements, frequency requirements, etc., for broadcasting data elements to other devices. QoS requirements may be set in various manners, including by the application or service triggering a data element broadcast, by user settings on a device, by a context and aware manager (e.g., 308, 358), etc. QoS requirements may ensure that a minimum QoS level is used for transport of data elements. Means for performing the operations of block 1102 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In block 1104, the processor may perform operations to determine power usage requirements. Power usage requirements may include maximum power constraints, battery usage levels, battery charge thresholds, etc. Power usage requirements may be set in various manners, including by the application or service triggering a data element broadcast, by user settings on a device, by a context and aware manager (e.g., 308, 358), etc. Power usage requirements may ensure minimum power is used for transport of data elements. Power requirements may vary, or be ignored, when a device is in a charging state or wall power may be available. Means for performing the operations of block 1104 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In block 1106, the processor may perform operations to determine available RF transport layers. Available RF transport layers may be determined based on the RF radios available on a device and/or the state of the RF radios. For example, the processor may determine whether Bluetooth radios, Wi-Fi radios, Zigbee radios, CHIP radios, 5G radios, etc., are available on the device for sending data elements. Available RF transport layers may fluctuate based on various conditions, including user settings on a wireless device, other connected states of the radios on the device, channel conditions, etc. Means for performing the operations of block 1106 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In block 1108, the processor may select one or more available transport layers meeting the QoS requirements and power usage requirements. For example, the processor may apply rules based criteria to select one or more available RF transport layers that may provide a QoS level above a minimum QoS requirement for the data element and that may not result in a maximum power usage being exceeded. Means for performing the operations of block 1108 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

Figure 12:
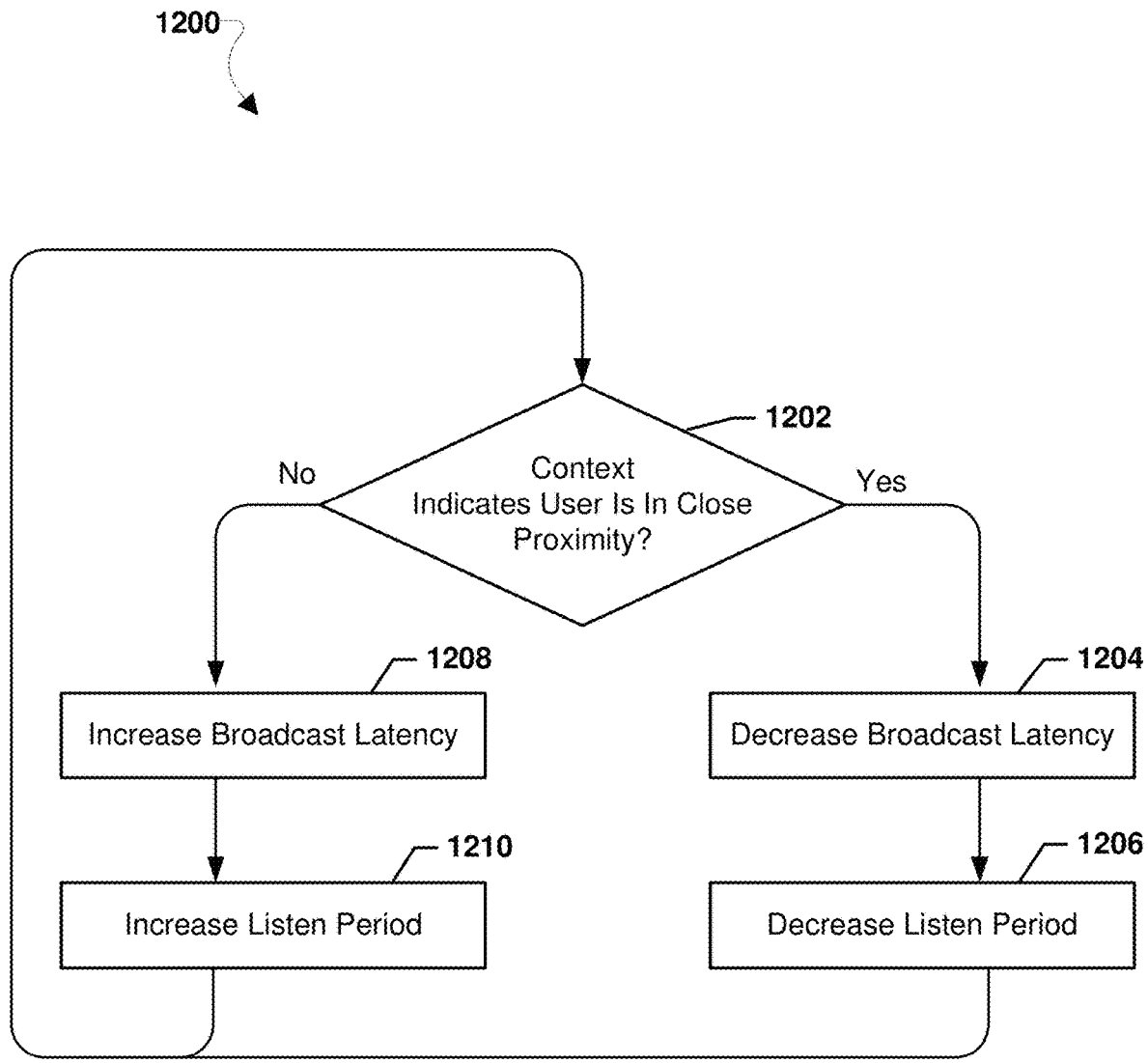
FIG. 12 is a process flow diagram illustrating a method for user proximate based radio resource management in accordance with various embodiments.

FIG. 12 illustrates a method 1200 for user proximate based radio resource management in accordance with various embodiments. With reference to FIGS. 1A-12, the method 1200 may be performed by a processor (e.g., 210, 212, 214, 216, 218, 252, 260) of a device (e.g., the device 120a-120h, 200, 401, 402, 403, 404, 405). As examples, the operations of method 1200 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-12, means for performing each of the operations of method 1200 may be one or more processors of a device (e.g., the device 120a-120h, 200, 401, 402, 403, 404, 405), such as one or more of the processors 210, 212, 214, 216, 218, 252, 260 executing a context broadcast networking instance (e.g., 300, 350, 373, etc.) and/or portions of a context broadcast networking instance (e.g., a context and aware manager (e.g., 308, 358), a context and aware engine (e.g., 312, 362), and/or a context broadcast networking core (e.g., 304)). In some embodiments, the operations of method 1200 may be performed in conjunction with the operations of methods 600 (FIG. 6), 700 (FIG. 7), and/or 1100 (FIG. 11).

In determination block 1202, the processor may perform operations including determining whether context indicates a user is within a proximity threshold. Users and the devices the users are interacting with may come in and out of a context broadcast network as the user moves about. For example, as a user transits through a house the user may move into radio range with an installed appliance, such as a smart TV, and out of range of another device, such as a tablet left on a countertop. Certain devices may better indicate the location of the user than other devices. For example, a smart watch being present may indicate a user is in an area, while the smart watch transiting out of radio coverage may indicate the user left the area. Each device may have a user proximity threshold set for the device that may trigger the device to act differently when the user is likely in close proximity or when then user is not in close proximity.

The close proximity may be indicated by context determined by the device itself, or by context report in data element sent by other wireless devices. For example, a device determining it is stationary and a user's smart watch and earpiece moved out of radio range may determine the context is that the user has left the device behind while the user has gone out of the home. Similarly, a device determining a user's smart phone and smart watch have both come into radio range may indicate the user is in close proximity. As further examples, close proximity may be determined with high confidence by devices with an "on body" sensor, such as a body temperature sensor, heart rate sensor, smart watch, etc., and/or by devices with a front facing camera using recognition (e.g., face recognition on a laptop, face recognition on a smartphone, iris recognition on smart glasses, etc.). Such "on body" sensors and/or recognition enabled devices may determine whether the user is actually attached to/wearing the device and/or within recognition range to indicate higher confidence in the device's location context in comparison to devices that may not be "on body" sensor and/or recognition enabled. Means for performing the operations of block 1202 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In response to determining the user is in close proximity (i.e., determination block 1202="Yes"), the processor may perform operations to decrease a broadcast latency in block 1204 and decrease a monitoring or listen period in block 1206. In this manner, when the user is in close proximity, the device may broadcast with a lower latency and monitor or listen for broadcast messages from other devices more frequently. Means for performing each of the operations of blocks 1204 and/or 1206 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In response to determining the user is not in close proximity (i.e., determination block 1202="No"), the processor may perform operations to increase a broadcast latency in block 1208 and increase a monitor or listen period in block 1210. In this manner, when the user is not in close proximity, the device may broadcast with a higher latency and monitor or listen for or otherwise be configured to receive broadcast messages from other devices less frequently. In this manner, the device may conserve power when the user is not in close proximity. Means for performing each of the operations of blocks 1208 and/or 1210 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

Figure 13A:
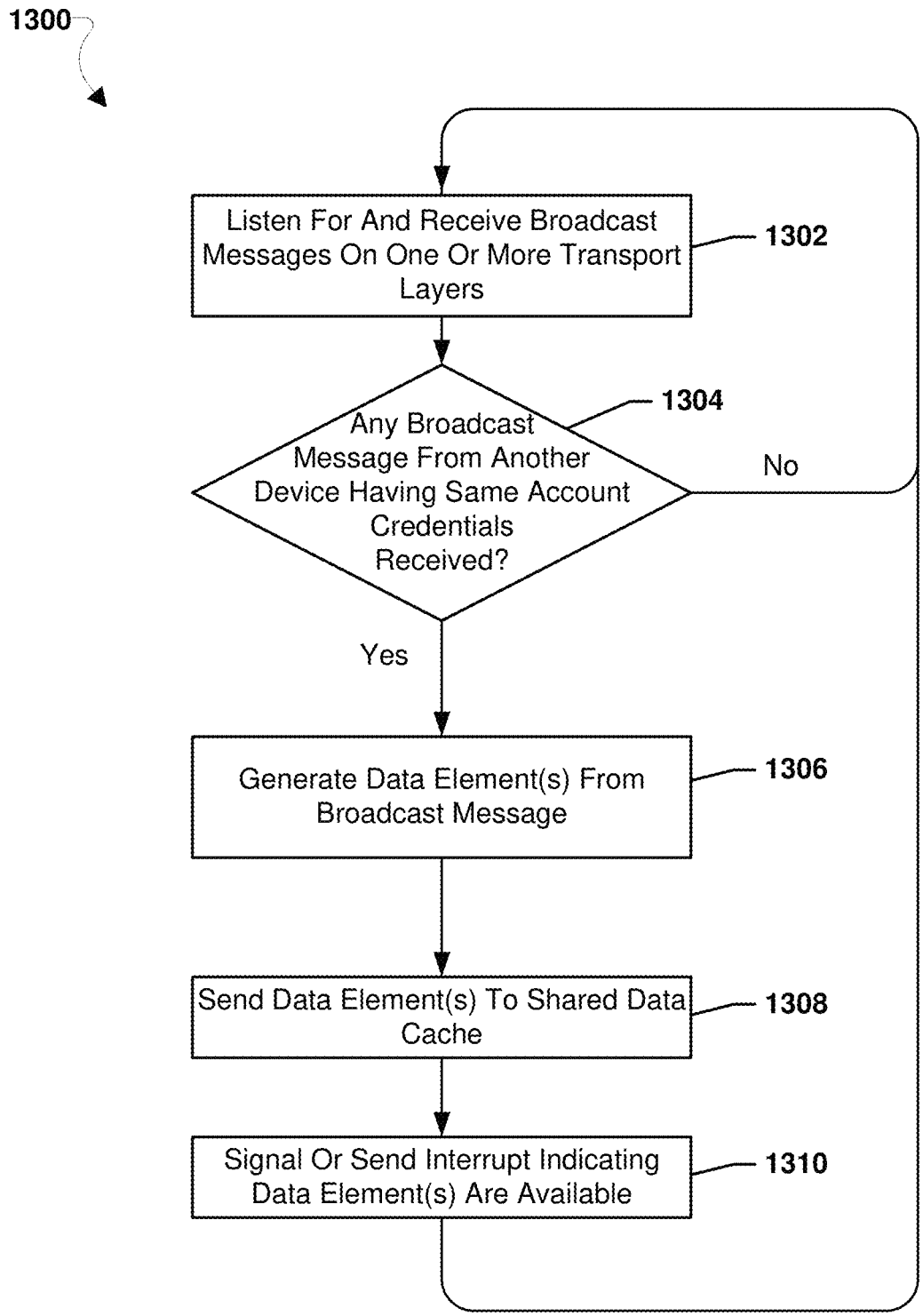
FIG. 13A is a process flow diagram illustrating a method for supporting context broadcast networking by a device in accordance with various embodiments.

FIG. 13A illustrates a method for supporting context broadcast networking in accordance with various embodiments. With reference to FIGS. 1A-13A, the method 1300 may be performed by a processor (e.g., 210, 212, 214, 216, 218, 252, 260) of a device (e.g., the device 120a-120h, 200, 401, 402, 403, 404, 405). As examples, the operations of method 1300 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-13A, means for performing each of the operations of method 1300 may be one or more processors of a device (e.g., the device 120a-120h, 200, 401, 402, 403, 404, 405), such as one or more of the processors 210, 212, 214, 216, 218, 252, 260 executing a context broadcast networking instance (e.g., 300, 350, 373, etc.) and/or portions of a context broadcast networking instance (e.g., a context and aware manager (e.g., 308, 358), a context and aware engine (e.g., 312, 362), and/or a context broadcast networking core (e.g., 304)). In some embodiments, the operations of method 1300 may be performed in conjunction with the operations of methods 600 (FIG. 6), 700 (FIG. 7), 1100 (FIG. 11), and/or 1200 (FIG. 12).

In block 1302, the processor may perform operations including monitoring or listening for and receiving broadcast messages on one or more transport layers. In some embodiments, the transport layers may be any transport layers associated with radios available on the device, such as one more of a BLE transport layer, a Zigbee transport layer, a CHIP transport layer, a Wi-Fi transport layer, a Bluetooth ACL transport layer, etc. The device may wake-up and monitor or listen for or otherwise be configured to receive broadcast messages at a selected periodicity. As discussed with reference to FIG. 12, the periodicity may increase or decrease in response to context indicting a user is in close proximity to the device. In some embodiments, the operations of block 1302 may be performed on a low power island (or low power core) (e.g., low power island 302).

In some embodiments, the operations of block 1302 may be performed on a low power island (or low power core) (e.g., low power island 302) in a first mode of operation, such as a low power mode of operation. As an example, when the low power island (or low power core) (e.g., low power island 302) includes more than a single core, the operations of block 1302 may be performed in a first mode of operation, such as a low power mode of operation, in which only a single core is active and used for processing associated with the operations of block 1302. Means for performing the operations of block 1302 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In determination block 1304, the processor may perform operations including determining whether any message from another device having the same account credentials is received. Devices having the same account credentials may be devices associate with the same user account. The devices associated with the same user account may share cryptographic keys such that the devices associated with the same user account may decrypt one another's broadcast messages while other devices may not decrypt the broadcast messages. A message being successfully decrypted by a device may indicate the message originated, and was received, from another device having the same account credentials. Means for performing the operations of block 1304 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1304 may be performed on a low power island (or low power core) (e.g., low power island 302). In some embodiments, the operations of block 1304 may be performed on a low power island (or low power core) (e.g., low power island 302) in a first mode of operation, such as a low power mode of operation. As an example, when the low power island (or low power core) (e.g., low power island 302) includes more than a single core, the operations of block 1304 may be performed in a first mode of operation, such as a low power mode of operation, in which only a single core is active and used for processing associated with the operations of block 1304. As another example, when the low power island (or low power core) (e.g., low power island 302) includes more than a single core, the operations of blocks 1302 and 1304 may be performed in a first mode of operation, such as a low power mode of operation, in which only a single core is active and used for processing associated with the operations of blocks 1302 and 1304.

In response to determining that no broadcast message from another device having the same account credentials is received (i.e., determination block 1304="No"), the processor may continue to monitor or listen for and receive broadcast messages on one or more transport layers in block 1302 as described. In this manner, the processor may monitor or listen for or otherwise be configured to receive messages from other devices having the same account credentials. In some embodiments, the device may ignore broadcast messages determined not to be received from another device having the same account credentials as the device.

In response to determining that a broadcast message from another device having the same account credentials is received (i.e., determination block 1304="Yes"), the processor may generate one or more data elements from the broadcast message in block 1306. For example, the processor may decrypt the segments and reconstitute the data elements of the data set. Means for performing the operations of block 1306 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1306 may be performed on a low power island (or low power core) (e.g., low power island 302). In some embodiments, the operations of block 1306 may be performed on a low power island (or low power core) (e.g., low power island 302) in a second mode of operation, such as a high power mode of operation. In some embodiments, the determination that a broadcast message from another device having the same account credentials is received (i.e., determination block 1304="Yes"), may trigger a transition from a first mode of operation, such as a low power mode of operation, to a second mode of operation, such as a high power mode of operation, used for performing the operations of block 1306. The second mode of operation, such as the high power mode of operation, may be a different mode of operation than the first mode operation, such as a low power mode of operation, discussed with reference to blocks 1302 and 1304. The second mode of operation, such as the high power mode of operation, may require more power and/or consume more processing resources than the first mode of operation, such as the low power mode of operation.

As an example, when the low power island (or low power core) (e.g., low power island 302) includes more than a single core, the operations of block 1306 may be performed in the second mode of operation, such as the high power mode of operation, in which two or more cores are active and used for processing associated with the operations of block 1306. As another example, when the low power island (or low power core) (e.g., low power island 302) includes more than a single core, the operations of blocks 1302 and 1304 may be performed in the first mode of operation, such as the low power mode of operation, in which only a single core is active and used for processing associated with the operations of blocks 1302 and 1304, and the operations of block 1306 may be performed in the second mode of operation, such as the high power mode of operation, in which two or more cores are active and used for processing associated with the operations of block 1306.

In block 1308, the processor may send the data elements to the shared data cache (e.g., shared data element cache 306). In this manner, the data elements may be made available to other application and/or services of the device. Means for performing the operations of block 1308 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1308 may be performed on a low power island (or low power core) (e.g., low power island 302). In some embodiments, the operations of block 1308 may be performed on a low power island (or low power core) (e.g., low power island 302) in a second mode of operation, such as a high power mode of operation. As an example, when the low power island (or low power core) (e.g., low power island 302) includes more than a single core, the operations of block 1308 may be performed in the second mode of operation, such as the high power mode of operation, in which two or more cores are active and used for processing associated with the operations of block 1308. As another example, when the low power island (or low power core) (e.g., low power island 302) includes more than a single core, the operations of blocks 1302 and 1304 may be performed in the first mode of operation, such as the low power mode of operation, in which only a single core is active and used for processing associated with the operations of blocks 1302 and 1304, and the operations of blocks 1306 and 1308 may be performed in the second mode of operation, such as the high power mode of operation, in which two or more cores are active and used for processing associated with the operations of blocks 1306 and 1308.

In block 1310, the processor may signal or send an interrupt indicating the one or more data elements are available. The interrupt may be signaled or sent to one or more applications and/or services of the device to trigger the applications and/or services to retrieve and consume the data elements. Means for performing the operations of block 1310 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1310 may be performed on a low power island (or low power core) (e.g., low power island 302). In some embodiments, the operations of block 1310 may be performed on a low power island (or low power core) (e.g., low power island 302) in a second mode of operation, such as a high power mode of operation. As an example, when the low power island (or low power core) (e.g., low power island 302) includes more than a single core, the operations of block 1310 may be performed in the second mode of operation, such as the high power mode of operation, in which two or more cores are active and used for processing associated with the operations of block 1310. As another example, when the low power island (or low power core) (e.g., low power island 302) includes more than a single core, the operations of blocks 1302 and 1304 may be performed in the first mode of operation, such as the low power mode of operation, in which only a single core is active and used for processing associated with the operations of blocks 1302 and 1304 and the operations of blocks 1306, 1308, and 1310 may be performed in the second mode of operation, such as the high power mode of operation, in which two or more cores are active and used for processing associated with the operations of blocks 1306, 1308, and 1310.

Figure 13B:
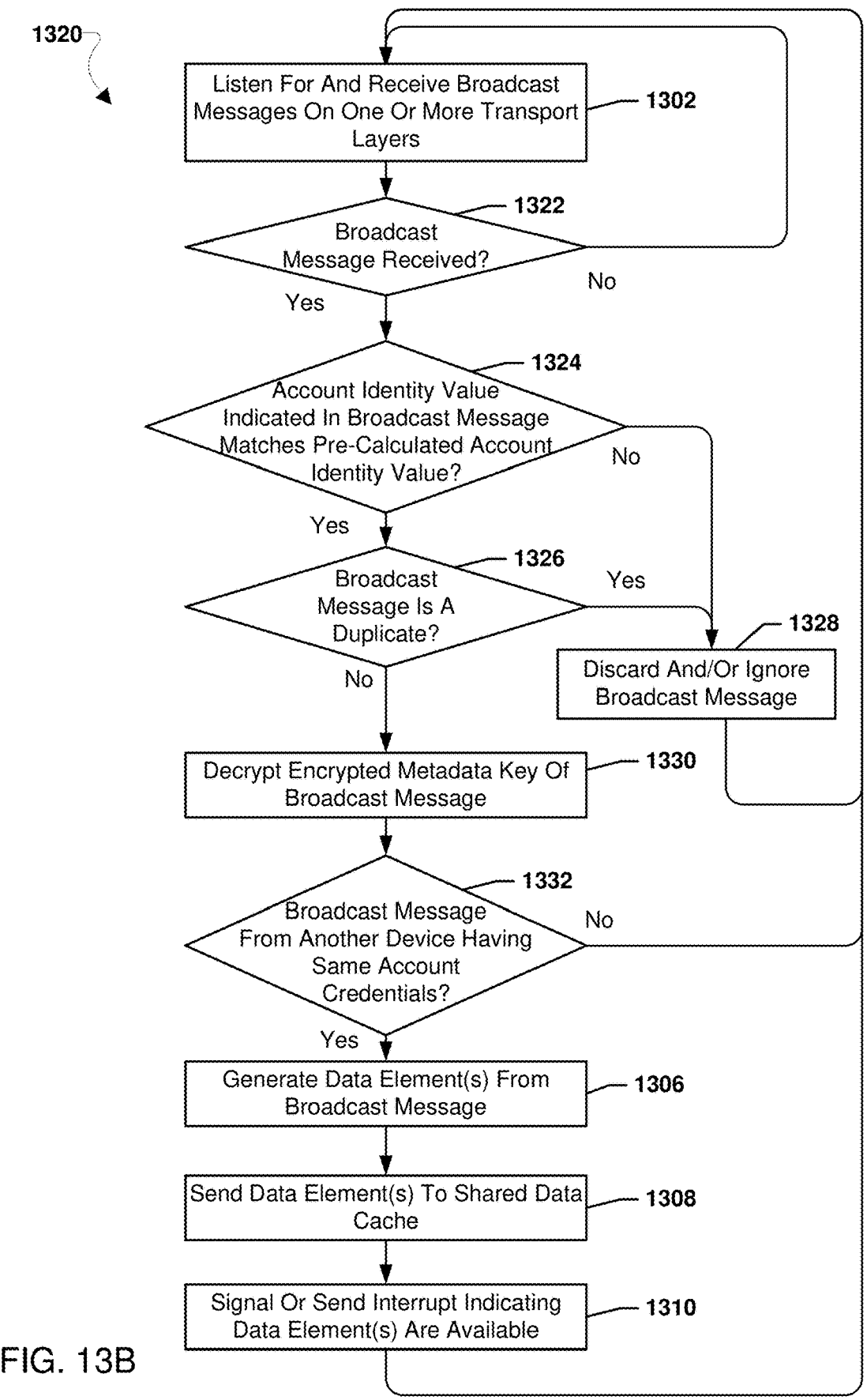
FIG. 13B is a process flow diagram illustrating a method for supporting context broadcast networking by a device in accordance with various embodiments.

FIG. 13B illustrates a method for supporting context broadcast networking in accordance with some embodiments. With reference to FIGS. 1A-13B, in some embodiments, the operations of the method 1320 may be performed in conjunction with the operations of methods 600 (FIG. 6), 700 (FIG. 7), 1100 (FIG. 11), and/or 1200 (FIG. 12). The method 1320 may be performed by a processor (e.g., 210, 212, 214, 216, 218, 252, 260) of a device (e.g., the device 120a-120h, 200, 401, 402, 403, 404, 405). As examples, the operations of the method 1320 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-13B, means for performing each of the operations of method 1320 may be one or more processors of a device (e.g., the device 120a-120h, 200, 401, 402, 403, 404, 405), such as one or more of the (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In block 1302, the processor may perform operations including monitoring or listening for and receiving broadcast messages on one or more transport layers as described with reference to like numbered block of the method 1300 (FIG. 13A).

In block 1322, the processor may perform operations including determining whether a broadcast message is received. In some embodiments, determining whether a broadcast message is received may include determining whether any transport layer associated with radios available on the device, such as one or more of a BLE transport layer, a Zigbee transport layer, a CHIP transport layer, a Wi-Fi transport layer, a Bluetooth ACL transport layer, etc., has received a broadcast message. Means for performing the operations of block 1322 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1322 may be performed on a low power island (or low power core) (e.g., low power island 302). In some embodiments, the operations of block 1322 may be performed on a low power island (or low power core) (e.g., low power island 302) in a first mode of operation, such as a low power mode of operation. As an example, when the low power island (or low power core) (e.g., low power island 302) includes more than a single core, the operations of block 1322 may be performed in a first mode of operation, such as a low power mode of operation, in which only a single core is active and used for processing associated with the operations of block 1322. As another example, when the low power island (or low power core) (e.g., low power island 302) includes more than a single core, the operations of blocks 1302 and 1322 may be performed in a first mode of operation, such as a low power mode of operation, in which only a single core is active and used for processing associated with the operations of blocks 1302 and 1322.

In response to determining that no broadcast message is received (i.e., determination block 1322="No"), the processor may continue to monitor or listen for and receive broadcast messages on one or more transport layers in block 1302 as described. In this manner, the processor may monitor or listen for or otherwise be configured to receive messages from other devices.

In response to determining that a broadcast message is received (i.e., determination block 1322="Yes"), the processor may determine whether an account identity value indicated in the broadcast message matches a pre-calculated account identity value in determination block 1324. In some embodiments, an account identity value may be calculated or otherwise determined from a hash of an end user private certificate field and a truncated time value. An account identity value may be pre-calculated by a device (e.g., the device 120a-120h, 200, 401, 402, 403, 404, 405) using the user account credentials. The pre-calculated account identity value may be referred to as a private AD value. The transmitting device may write the private AD value into a private message (e.g., into an AD element 828).

In some embodiments, in determination block 1324, a receiving device may compare the pre-calculated account identity value (the private AD value) stored at the receiving device with the private AD value indicated in the received broadcast message to determine whether the two private AD values match. A match between the stored private AD value and the private AD value indicated in the received broadcast message (e.g., a match between the account identity value indicated in the broadcast message and the pre-calculated account identity value stored at the receiving device) may indicate that the private message is from a device with the same user account credentials and is intended for the receiving device. A mis-match between the stored private AD value and the private AD value may indicate that the private message is not from a device with the same user account credentials (e.g., from a device with different user account credentials) and is not intended for the receiving device.

In some embodiments, comparing the pre-calculated account identity value (e.g., the private AD value) stored at the receiving device with the AD element 828 may involve a simple compare operation of the private AD value stored at the receiving device to the private AD value indicated in the received broadcast message that requires fewer processing resources and/or consume less power than operations to decrypt a portion of a message.

Means for performing the operations of block 1324 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1324 may be performed on a low power island (or low power core) (e.g., low power island 302). In some embodiments, the operations of block 1324 may be performed on a low power island (or low power core) (e.g., low power island 302) in a first mode of operation, such as a low power mode of operation. As an example, when the low power island (or low power core) (e.g., low power island 302) includes more than a single core, the operations of block 1324 may be performed in a first mode of operation, such as a low power mode of operation, in which only a single core is active and used for processing associated with the operations of block 1324. As another example, when the low power island (or low power core) (e.g., low power island 302) includes more than a single core, the operations of blocks 1302, 1322, and 1324 may be performed in a first mode of operation, such as a low power mode of operation, in which only a single core is active and used for processing associated with the operations of blocks 1302, 1322, and 1324.

In response to determining that an account identity value indicated in the broadcast message does not match a pre-calculated account identity value (i.e., determination block 1324="No"), the processor may discard and/or ignore the received broadcast message in block 1328. A received broadcast message with a private AD value that does not match the stored pre-calculated account identity value (e.g., the private AD value) that the receiving device calculated using the user account credentials may be ignored and/or dropped with further processing or decryption. For example, no processing may be expended on such non-matching private AD value messages to decrypt any further part of the received broadcast message. By not expended efforts on such non-matching private AD value messages processing resources and/or power may be conserved.

Means for performing the operations of block 1328 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1328 may be performed on a low power island (or low power core) (e.g., low power island 302). In some embodiments, the operations of block 1328 may be performed on a low power island (or low power core) (e.g., low power island 302) in a first mode of operation, such as a low power mode of operation. As an example, when the low power island (or low power core) (e.g., low power island 302) includes more than a single core, the operations of block 1328 may be performed in a first mode of operation, such as a low power mode of operation, in which only a single core is active and used for processing associated with the operations of block 1328. As another example, when the low power island (or low power core) (e.g., low power island 302) includes more than a single core, the operations of blocks 1302, 1322, 1324, and 1328 may be performed in a first mode of operation, such as a low power mode of operation, in which only a single core is active and used for processing associated with the operations of blocks 1302, 1322, 1324, and 1328.

In response to discarding and/or ignoring the broadcast message in block 1328, the processor may continue to monitor or listen for and receive broadcast messages on one or more transport layers in block 1302 as described. In this manner, the processor may continue to monitor or listen for or otherwise be configured to receive messages from other devices.

In response to determining that an account identity value indicated in the broadcast message matches a pre-calculated account identity value (i.e., determination block 1324="Yes"), the processor may determine whether the broadcast message is a duplicate in determination block 1326. In some embodiments, a processor may log unique elements of received broadcast messages intended for the device, such as a salt element (e.g., salt element 825, etc.) in a received broadcast message (e.g., message 814, 820, etc.). In some embodiments, the unique association of the salt element with the data (e.g., 823, etc.) and/or data element sets by a transmitting and/or sending device may enable the salt element to be used for duplicate detection and/or filtering at receiving devices. In such embodiments, the processor may determine whether the broadcast message is a duplicate in determination block 1326 by comparing a salt element in the message to a log of salt values of received messages. Identifying a match of the salt element in the received broadcast message to a salt value in the log of salt values of received messages may indicate that the received broadcast message is a duplicate message carrying already received data and/or data element sets. If the comparison yields no matches of the salt element in the received broadcast message to the log of salt values of received messages, this may indicate that the received broadcast message is a new message. Means for performing the operations of block 1326 may include one or more processors of a device (e.g., the device 120a-120h, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304)).

In some embodiments, the operations of block 1326 may be performed on a low power island (or low power core) (e.g., low power island 302). In some embodiments, the operations of block 1326 may be performed on a low power island (or low power core) (e.g., low power island 302) in a first mode of operation, such as a low power mode of operation. As an example, when the low power island (or low power core) (e.g., low power island 302) includes more than a single core, the operations of block 1326 may be performed in a first mode of operation, such as a low power mode of operation, in which only a single core is active and used for processing associated with the operations of block

1326. As another example, when the low power island (or low power core) (e.g., low power island 302) includes more than a single core, the operations of blocks 1302, 1322, 1324, 1326, and 1328 may be performed in a first mode of operation, such as a low power mode of operation, in which only a single core is active and used for processing associated with the operations of blocks 1302, 1322, 1324, 1326, and 1328.

In response to determining that the broadcast message is a duplicate (i.e., determination block 1326="Yes"), the processor may discard and/or ignore the received broadcast message in block 1328. Duplicate messages carrying already received data and/or data element sets (e.g., those messages with salt elements matching a salt value in the log of salt values of received messages) may be ignored and/or dropped with no further processing or decryption. For example, no processing may be expended on such duplicate messages. By not expended efforts on such duplicate messages to process the encrypted data, processing resources and/or power may be saved.

In response to discarding and/or ignoring the broadcast message in block 1328, the processor may continue to monitor or listen for and receive broadcast messages on one or more transport layers in block 1302. In this manner, the processor may continue to monitor or listen for and receive messages from other devices.

In response to determining that the broadcast message is not a duplicate (i.e., determination block 1326="No"), the processor may decrypt an encrypted metadata key of the broadcast message in block 1330. The encrypted metadata key may be a data element that may be encrypted by a device sending a message (e.g., message 814, 820, etc.) using the user account credentials. The encrypted metadata key may be decrypted with a key associated with the user account credentials, such as a private key associated with the user account credentials. The encrypted metadata key may be decrypted and the data within the encrypted metadata key may be used with a private certificate to decrypt data and/or data element sets of the received broadcast message. Successfully decrypting the encrypted metadata key may indicate that the received broadcast message originated, and was received, from another device having the same account credentials. Failure to decrypt the encrypted metadata key may indicate that the received broadcast message did not originate, and was not received, from another device having the same account credentials (e.g., the message was originated and/or received from a device from another account).

Means for performing the operations of block 1330 may include one or more processors of a device (e.g., the device 120*a*-120*h*, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304).

In some embodiments, the operations of block 1330 may be performed on a low power island (or low power core) (e.g., low power island 302). In some embodiments, the operations of block 1330 may be performed on a low power island (or low power core) (e.g., low power island 302) in a second mode of operation, such as a high power mode of operation. The determination that the broadcast message is not a duplicate (i.e., determination block 1326="No"), may trigger a transition from a first mode of operation, such as a low power mode of operation, to a second mode of operation, such as a high power mode of operation. The second mode of operation, such as the high power mode of operation, may be a different mode of operation than the first mode operation, such as a low power mode of operation, discussed with reference to blocks 1302, 1322, 1326, and 1328. The second mode of operation, such as the high power mode of operation, may require more power and/or consume more processing resources than the first mode of operation, such as the low power mode of operation. As an example, when the low power island (or low power core) (e.g., low power island 302) includes more than a single core, the operations of block 1330 may be performed in the second mode of operation, such as the high power mode of operation, in which two or more cores are active and used for processing associated with the operations of block 1330. Another example, when the low power island (or low power core) (e.g., low power island 302) includes more than a single core, the operations of blocks 1302, 1322, 1326, and 1328 may be performed in the first mode of operation, such as the low power mode of operation, in which only a single core is active and used for processing associated with the operations of blocks 1302, 1322, 1326, and 1328 and the operations of block 1330 may be performed in the second mode of operation, such as the high power mode of operation, in which two or more cores are active and used for processing associated with the operations of block 1330.

In determination block 1332, the processor may determine whether the broadcast message is from another device having the same account credentials. Devices having the same account credentials may be devices associate with the same user account. The devices associated with the same user account may share cryptographic keys such that the devices associated with the same user account may decrypt one another's broadcast messages while other devices may not decrypt the broadcast messages. In some embodiments, the successful or unsuccessful decrypting of an encrypted metadata key may indicate whether the broadcast message is from another device having the same account credentials. Successfully decrypting the encrypted metadata key may indicate the received broadcast message originated, and was received, from another device having the same account credentials. Failure to decrypt the encrypted metadata key may indicate the received broadcast message did not originate, and was not received, from another device having the same account credentials (e.g., the message was originated and/or received from a device from another account).

Means for performing the operations of block 1332 may include one or more processors of a device (e.g., the device 120*a*-120*h*, 200, 401, 402, 403, 404, 405), such as one or more of the processors (210, 212, 214, 216, 218, 252, 260) executing a context broadcast networking instance (e.g., 300, 350, 373, etc.) and/or portions of a context broadcast networking instance, such as a context and aware manager (e.g., 308, 358), a context and aware engine (e.g., 312, 362), and/or a context broadcast networking core (e.g., 304). In some embodiments, the operations of block 1332 may be performed on a low power island (or low power core) (e.g., low power island 302). In some embodiments, the operations of block 1332 may be performed on a low power island (or low power core) (e.g., low power island 302) in a second mode of operation, such as a high power mode of operation. As an example, when the low power island (or low power core) (e.g., low power island 302) includes more than a single core, the operations of block 1332 may be performed in the second mode of operation, such as the high power mode of operation, in which two or more cores are active and used for processing associated with the operations of block 1332. As another example, when the low power island (or low power core) (e.g., low power island 302) includes more than a single core, the operations of blocks 1302, 1322, 1326, and 1328 may be performed in the first mode of operation, such as the low power mode of operation, in which only a single core is active and used for processing associated with the operations of blocks 1302, 1322, 1326, and 1328 and the operations of blocks 1330 and 1332 may be performed in the second mode of operation, such as the high power mode of operation, in which two or more cores are active and used for processing associated with the operations of blocks 1330 and 1332.

In response to determining that the broadcast message is not from another device having the same account credentials (i.e., determination block 1332="No"), the processor may continue to monitor or listen for and receive broadcast messages on one or more transport layers in block 1302. In this manner, the processor may continue to monitor for listen for and receive messages from other devices having the same account credentials while ignoring broadcast messages determined not to be received from another device having the same account credentials as the device.

In response to determining that the received broadcast message is from another device having the same account credentials (i.e., determination block 1332="Yes"), the processor may perform operations in blocks 1306, 1308, and 1310 to generate one or more data elements from the broadcast message, send one or more data elements to a shared data cache, and signal or send an interrupt indicating the one or more data elements are available as described with reference to like numbered blocks of the method 1300 (FIG. 13A) as described. As described for the method 1300, in some embodiments, the operations of blocks 1306, 1308, and 1310 may be performed on a low power island (or low power core) (e.g., low power island 302). For example, the operations of blocks 1306, 1308, and 1310 may be performed on a low power island (or low power core) (e.g., low power island 302) in a second mode of operation, such as a high power mode of operation. As another example, when the low power island (or low power core) (e.g., low power island 302) includes more than a single core, the operations of blocks 1302, 1322, 1326, and 1328 may be performed in the first mode of operation, such as the low power mode of operation, in which only a single core is active and used for processing associated with the operations of blocks 1302, 1322, 1326, and 1328, and the operations of blocks 1306, 1308, 1310, 1330, and 1332 may be performed in the second mode of operation, such as the high power mode of operation, in which two or more cores are active and used for processing associated with the operations of blocks 1306, 1308, 1310, 1330, and 1332.

In some embodiments, security maybe anchored in three independent roots of trust and multiple derived keys. Accounts, cloud information, and over the air messages may be protected uniquely by encryption. A user account and the user's account credentials may be the central element used to anchor all the API accesses and inter-device communications. In some embodiments, inter-device communication protection may ensure the integrity and privacy of users and protect users from tracking.

In some embodiments, provisioning processes may enable the onboarding of devices to a user's account. Provisioning devices may require at least one hub device to be Internet connected. Devices associated with a user account that may be Internet connected may be referred to as hub wireless devices or hub devices herein, or sometimes referred to as FabriQ hubs or FabriQ hub devices for ease of reference. A hub wireless device may be configured to act as a proxy to provision devices that are not Internet connected. Devices associated with a user account that are not Internet connected may be referred to as accessory devices or accessory devices herein, or sometime referred to as FabriQ accessories or FabriQ accessory devices for ease of reference.

In some embodiments, a hub wireless device may have only one active user account per user profile. In some embodiments, a hub device may be required to provision an accessory device. In some embodiments, accessory devices may allow one user account association per pairing instance allowed by the accessory to enable pairings to devices provisioned with for example an account A, an account B, or no account or capability. In some embodiments, user accounts may be associated with an OAuth identity. In some embodiments, user accounts stored on a cloud server (e.g., server 198, 522) may store various types of data including user specific persistent storage of key material for subsequent provisioning, lists of registered devices, subsets of device data element caches, etc. In some embodiments, user account access may be granted through an application, an API created web interface, an operating system itself, etc.

Figure 14:
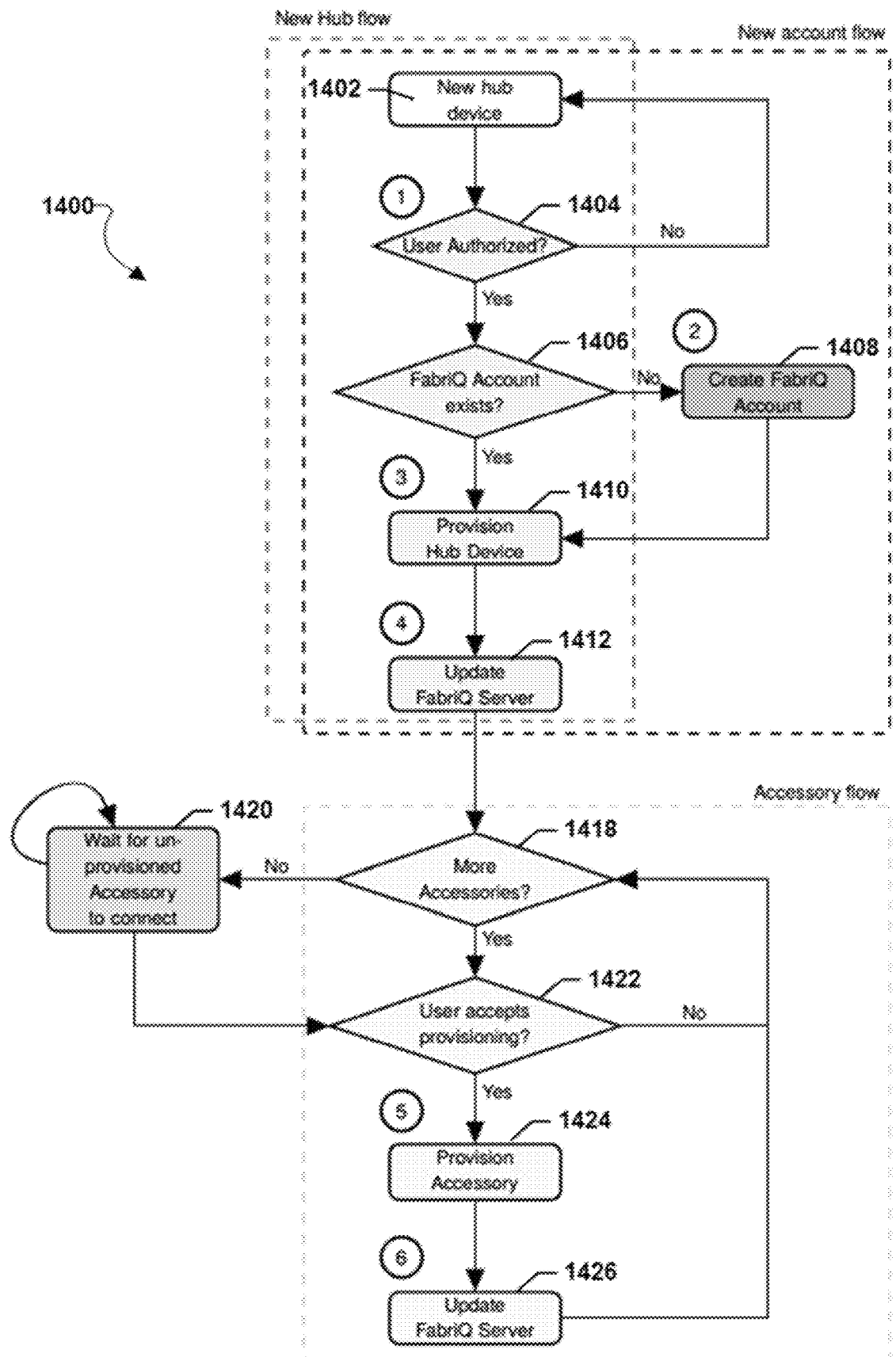
FIG. 14 is a process flow diagram illustrating a method for device provisioning in accordance with various embodiments.

FIG. 14 illustrates a method 1400 for device provisioning in accordance with various embodiments. With reference to FIGS. 1A-14, the operations of method 1400 may be performed by a processor of a cloud server (e.g., server 198, 522). With reference to FIGS. 1A-14, means for performing each of the operations of method 1400 may be one or more processors of a cloud server (e.g., server 198, 522). In some embodiments, the operations of method 1400 may be performed in conjunction with the operations of methods 600 (FIG. 6), 700 (FIG. 7), 1100 (FIG. 11), 1200 (FIG. 12), 1300 (FIG. 13A), and/or 1320 (FIG. 13B).

In block 1402, a processor may perform operations to receive a new hub device registration. Devices associated with a user account that may be Internet connected may be referred to as hub wireless devices or hub devices herein, or sometimes referred to as FabriQ hubs or FabriQ hub devices for ease of reference. The hub wireless device itself or a user device other than the hub wireless device may send a registration request to the server to register the new hub wireless device. The registration request may indicate the user account and/or user of the wireless hub device. The registration request may indicate the type and/or other information of the wireless hub device.

In determination block 1404, the processor may perform operations to determine whether the user is authorized to register a hub wireless device. The operations of block 1404 may include verifying the user authorization with an OAuth server.

In response to authorization failing (i.e., determination block 1404="No"), the processor may return to block 1402 to receive another new hub wireless device registration request.

In response to authorization being successful (i.e., determination block 1404="Yes"), the processor may determine whether the user has a context broadcast networking identity (e.g., a FabriQ identity) in determination block 1406. If a user has previously registered a device, a user may already have a registered identity or profile. If a user has not previously registered a device, a user identity or profile may be created.

In response to determining that no account exists (i.e., determination block 1406="No"), the processor may create an account for the user in block 1408. The user may be offered to accept terms of service as part of creating an account.

In response to creating an account in block 1408 or in response to determining that an account exists (i.e., determination block 1406="Yes"), the processor may provision the hub wireless device in block 1410. Provisioning the hub wireless device may include creation of cryptographic material and initial establishment of security keys for the user account, e.g., the shared account credentials. In some embodiments, the shared account credentials may be derived keys, such as keys derived based on OAuth server information and key material of a provisioning server. In some embodiments, the shared account credentials may be keys stored on the provisioning server.

In block 1412, the processor may update a context broadcast networking server (e.g., 198, 522). For example, device information for the hub wireless device may be uploaded and/or stored on the context broadcast networking server (e.g., 198, 522).

In block 1418, the processor may determine whether more accessory devices are to be provisioned. For example, additional accessory devices, such as additional devices without Internet connectivity, may be available for provisioning with shared account credentials.

In response to determining that no additional devices are to be provisioned (i.e., determination block 1418="No"), the processor may wait for un-provisioned accessory devices to connect in block 1420.

In response to determining that an additional device is to be provisioned (i.e., determination block 1418="Yes") or in response to a connection occurring in block 1420, the processor may determine whether the user accepts provisioning in determination block 1422. For example, the user may be given an option to deny or accept accessory device provisioning.

In response to determining that the user does not accept provisioning (i.e., determination block 1422="No"), the processor may determine whether more accessory devices are to be provisioned in determination block 1418.

In response to determining that the user does accept provisioning (i.e., determination block 1424="Yes"), the processor may provision the accessory device in block 1424. Provisioning the accessory device may include causing a hub wireless device to send the shared account credentials to the accessory device from the hub wireless device.

In block 1426, the processor may update a context broadcast networking server (e.g., 198, 522). For example, device information for the accessory device may be uploaded and/or stored on the context broadcast networking server (e.g., 198, 522).

Figure 15A:
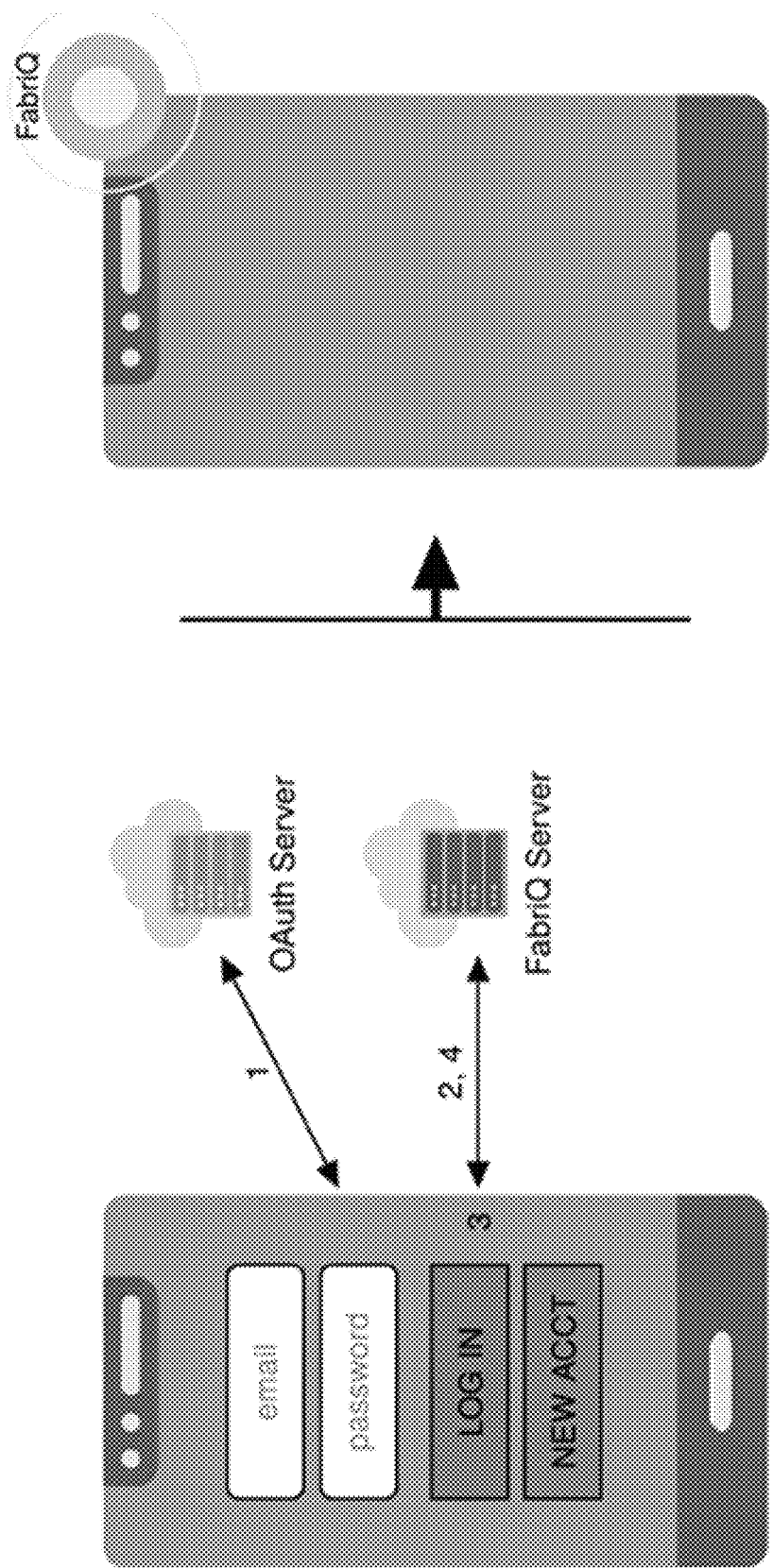
FIGS. 15A, 15B, and 15C illustrate example operations for device registration and provisioning in accordance with various embodiments.
Figure 15B:
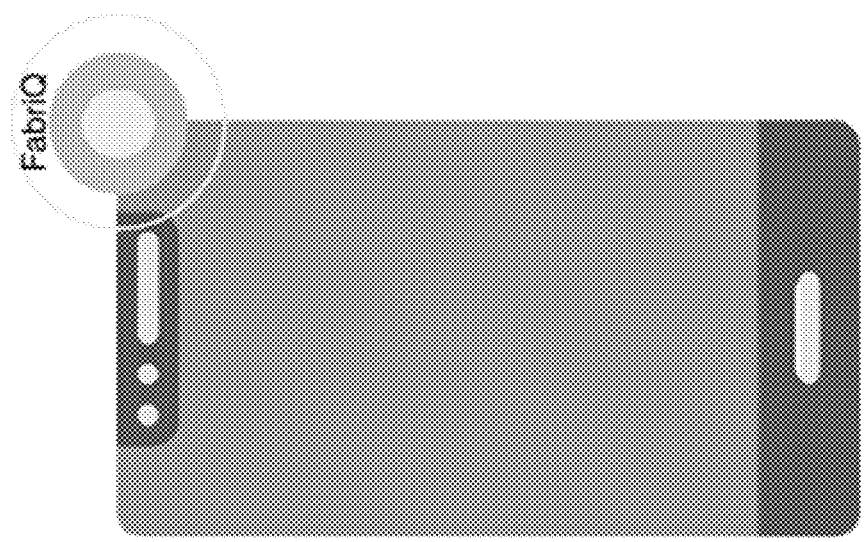
Figure 15B:
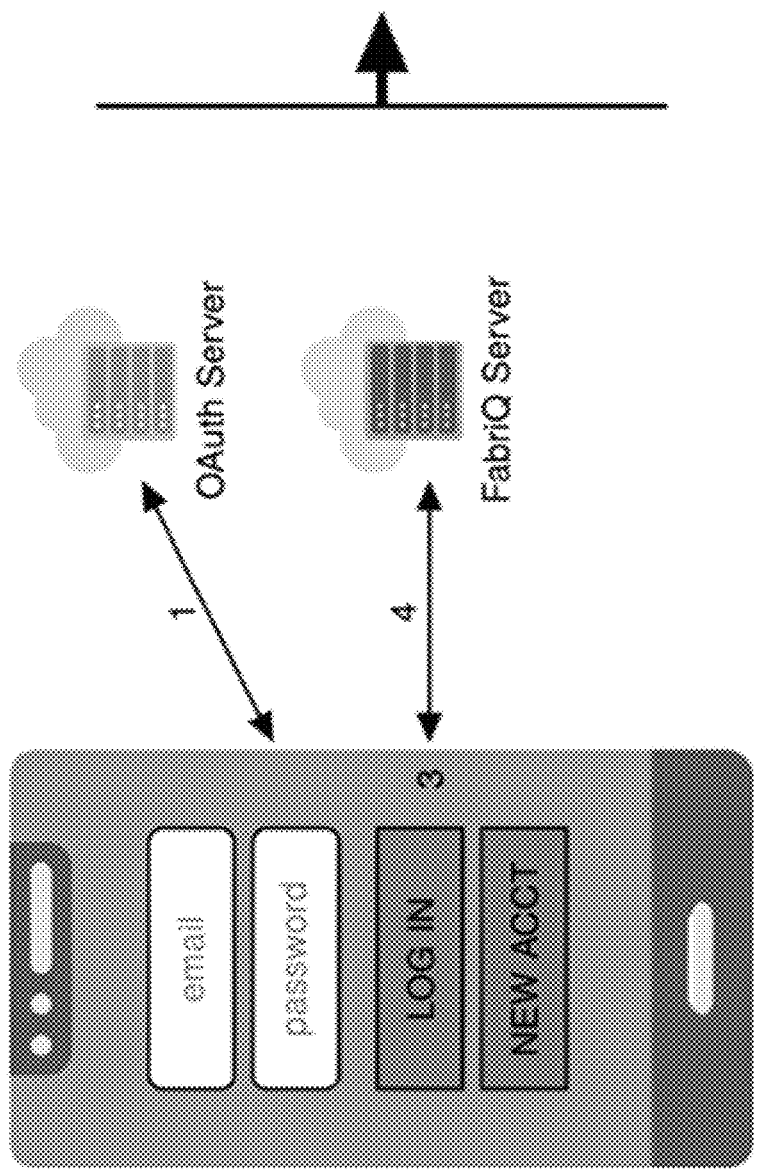
Figure 15C:
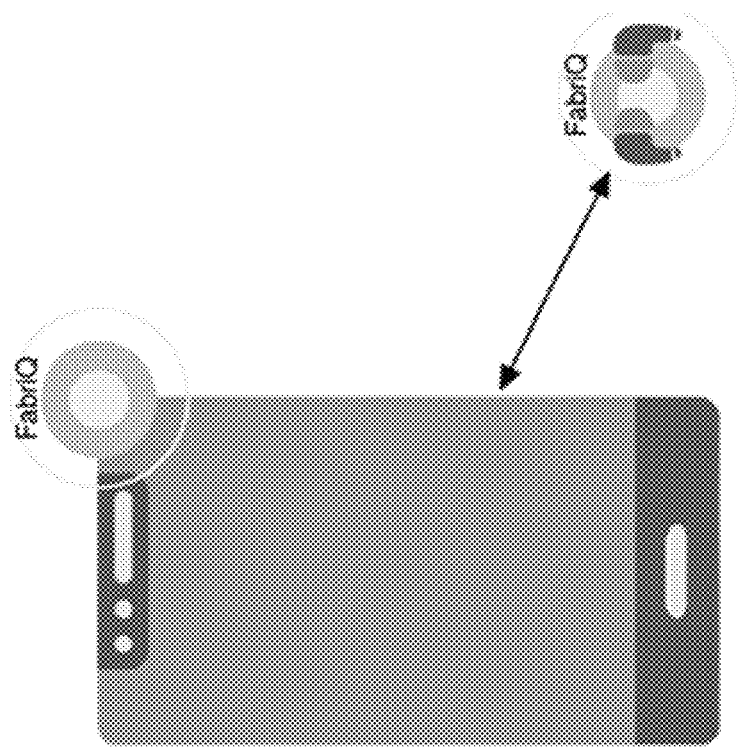
Figure 15C:
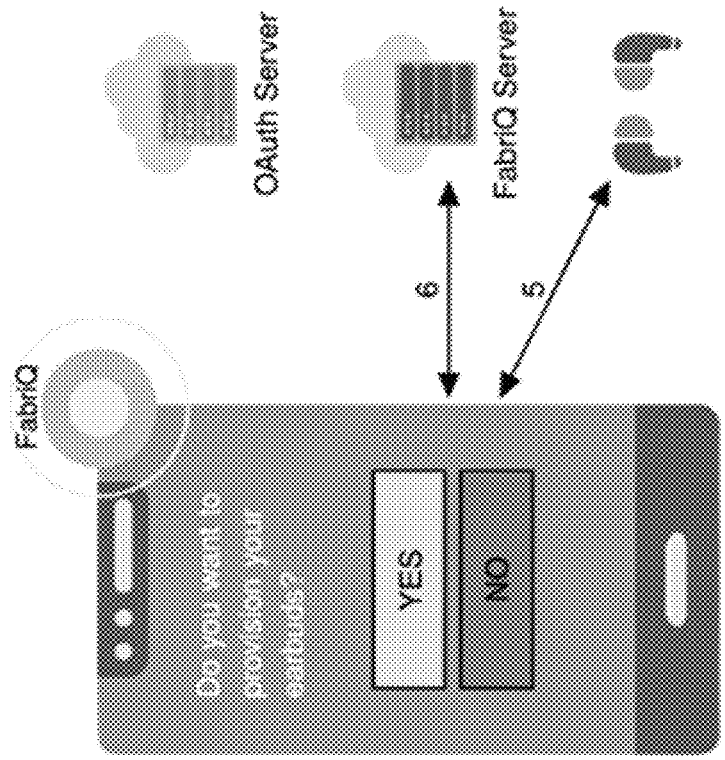

FIGS. 15A, 15B, and 15C illustrate example operations for device registration and provisioning in accordance with various embodiments. With reference to FIGS. 1A-15C, the registration and provisioning operations illustrated in FIGS. 15A, 15B, and 15C may be performed according to, and/or in conjunction with, one or more operations of methods 600 (FIG. 6), 700 (FIG. 7), 1100 (FIG. 11), 1200 (FIG. 12), 1300 (FIG. 13A), 1320 (FIG. 13B) and/or 1400 (FIG. 14). For example, the numbered connectors in FIGS. 15A, 15B, and 15C correspond to the single numeric numbers in FIG. 14 and may represent registration and provisioning operations performed according to, and/or in conjunction with, one or more operations of method 1400 (FIG. 14). FIG. 15A illustrates example operations for initial account creation and first hub wireless device registration. FIG. 15B illustrates example operations for subsequent hub wireless device provisioning. FIG. 15C illustrates example operations for accessory provisioning.

FIG. 15A illustrates that during a first step of the ODM/EOM setup experience after a user has either purchased a new device that is FabriQ enabled or they are enabling FabriQ for the first time, the user is offered the ability to enter FabriQ OAuth credentials. The authorization service may be provided by OAuth 2.0 as described in Request. For Comments (RFC) 6749 with a common authorization server or directly with FabriQ if that is part of the product offering. This initial step may be performed by the user in an app on a device supporting FabriQ and may require cloud access.

FIG. 15B illustrates that registering a subsequent hub wireless device to the same FabriQ account follows a subset of the steps used during the initial provisioning, except that the FabriQ server instance may be updated rather than a new identity being created.

FIG. 15C illustrates accessory devices, such as earbuds (also referred to as an earpiece), may have to be provisioned with FabriQ credentials by a device already registered with FabriQ. To be provisioned, the non-internet connected device (e.g., the earpiece) must first be paired with and connected to a FabriQ provisioned device. The triggers for provisioning a FabriQ accessory may include: 1) a new out of box experience; 2) a FabriQ accessory re-connects to FabriQ Hub after a FabriQ account has been provisioned on the FabriQ Hub; and/or 3) use of a second pairing slot to pair the FabriQ accessory with another FabriQ Hub device with its own FabriQ account. At the conclusion of the accessory device provisioning, the FabriQ server instance may be updated.

In some embodiments, a setup experience may be utilized to view a list of devices associated with the account. In some embodiments, a setup experience may be used to remove a lost or stolen or no longer necessary device from the account. In some embodiments, a setup experience may be used to close an account. In some embodiments, removing a device and/or closing an account may trigger a process in which a FabriQ Server may notify FabriQ Managers across all devices to retrieve the latest account key/credentials. This triggering may ensure that the remaining devices can move on/roll over to the latest credentials and the lost/stolen/or unnecessary device no longer has access the user/account broadcasts. In some embodiments, FabriQ managers on hub devices may ping the FabriQ servers to ensure their credentials are still valid upon startup, and may rely on the existing credentials for robustness, until the server communicates new credentials. In some embodiments, FabriQ managers on hub devices may provision the latest keys/credential information in connected accessory devices (for example in a manner similar to a setup experience) upon receiving new credentials for an account from the FabriQ servers. In some embodiments, upon an account deletion a FabriQ server may inform devices that the account is no longer valid triggering the deletion of credentials on the device and accessories that are paired with the device.

In traditional streaming and playback user experiences, a user may open an earbud (or earpiece) case and place the earbuds in their ears while in a room that contains a smart speaker. The earbuds may be configured by the OEM/ODM to attempt to connect to the last device to which the earbuds were paired, or to a series of last known devices. The user may pick up their smartphone and begin streaming music using a streaming music application. The user interacts with the streaming music application, the earbuds application, or a device operating system to force a connection between the smartphone and the earbuds. This example traditional experience requires the user to manage connections to the audio peripheral which may through the streaming music application, the earbuds application, or operating system settings. Such multiple different user interactions required by traditional systems may be undesirable.

Figure 16A:
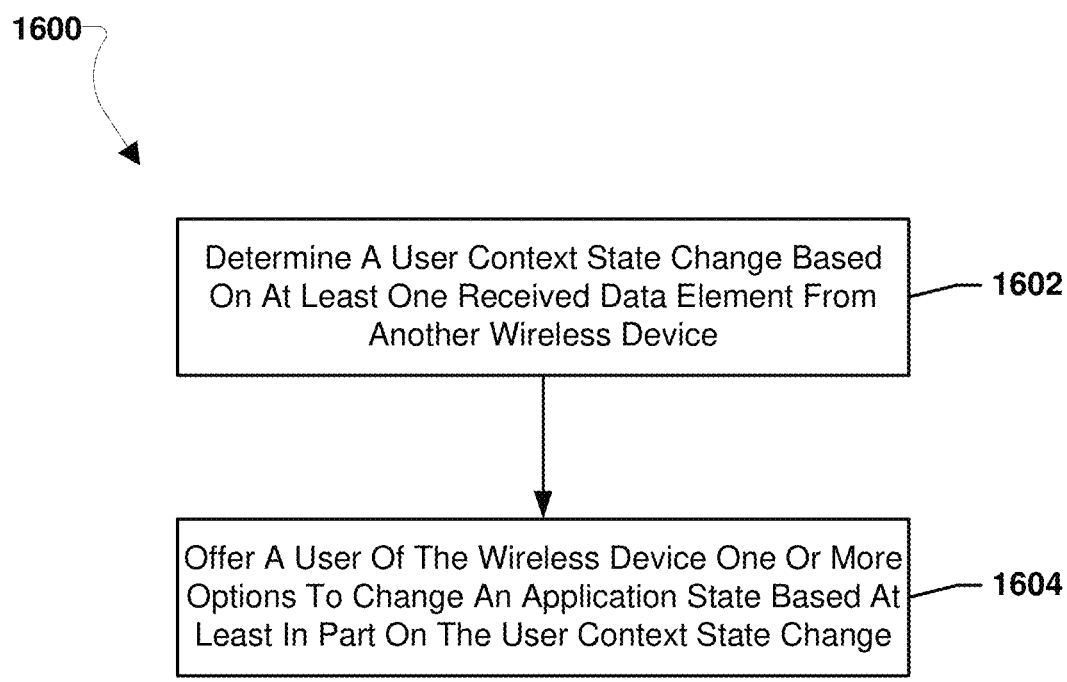
FIG. 16A is a process flow diagram illustrating a method for changing a device setting or application setting in accordance with various embodiments.

FIG. 16A is a process flow diagram illustrating a method for changing a device setting or application setting in accordance with various embodiments. FIGS. 1A-16A, the method 1600 may be performed by a processor (e.g., 210, 212, 214, 216, 218, 252, 260) of a device (e.g., the device 120a-120h, 200, 401, 402, 403, 404, 405). As examples, the operations of method 1600 may be performed by a context broadcast networking instance (e.g., 300, 350, 373, etc.) executing on a processor (e.g., 210, 212, 214, 216, 218, 252, 260) of a device (e.g., the device 120a-120h, 200, 401, 402, 403, 404, 405), such as by a context and aware manager (e.g., 308, 358), a context and aware engine (e.g., 312, 362), and/or a context broadcast networking core (e.g., 304). With reference to FIGS. 1A-16A, means for performing each of the operations of method 1600 may be one or more processors of a device (e.g., the device 120a-120h, 200, 401, 402, 403, 404, 405), such as one or more of the processors 210, 212, 214, 216, 218, 252, 260 executing a context broadcast networking instance (e.g., 300, 350, 373, etc.) and/or portions of a context broadcast networking instance (e.g., a context and aware manager (e.g., 308, 358), a context and aware engine (e.g., 312, 362), and/or a context broadcast networking core (e.g., 304)). In some embodiments, the operations of method 1600 may be performed in conjunction with the operations of methods 600 (FIG. 6), 700 (FIG. 7), 1100 (FIG. 11), 1200 (FIG. 12), 1300 (FIG. 13A), 1320 (FIG. 13B), and/or 1400 (FIG. 14).

In block 1602, the processor may determine a user context state change based on at least one received data element from another device. The one or more received data elements may have been received via broadcast transmissions from the other device. The one or more data elements may indicate context states of the other device. For example, the one or more data elements may indicate a power state, output state, usage state, etc., of the other device. The context state indicated by the one or more data elements alone, or in conjunction with context state information of the device itself may indicate a user context state has changed. For example, the earbuds being indicated in a user's ear and the user streaming music may indicate a user is most likely to want to listen to music using the earbuds. As another example, a data element from a watch indicating a user is walking and a phone context indicating the user placed the phone in a stationary position may indicate the user is moving away from the phone.

In block 1604, the processor may offer a user of the device one or more options to change an application state based at least in part on the user context state change. For example, the processor may offer menu of ranked options the user may pick from based on the user context state change. As an example, the menu may offer a listing a connections changes for an application in response to a user context change indicating available devices have changed due to device mobility. The user may then select an offered option to change an application state.

Figure 16B:
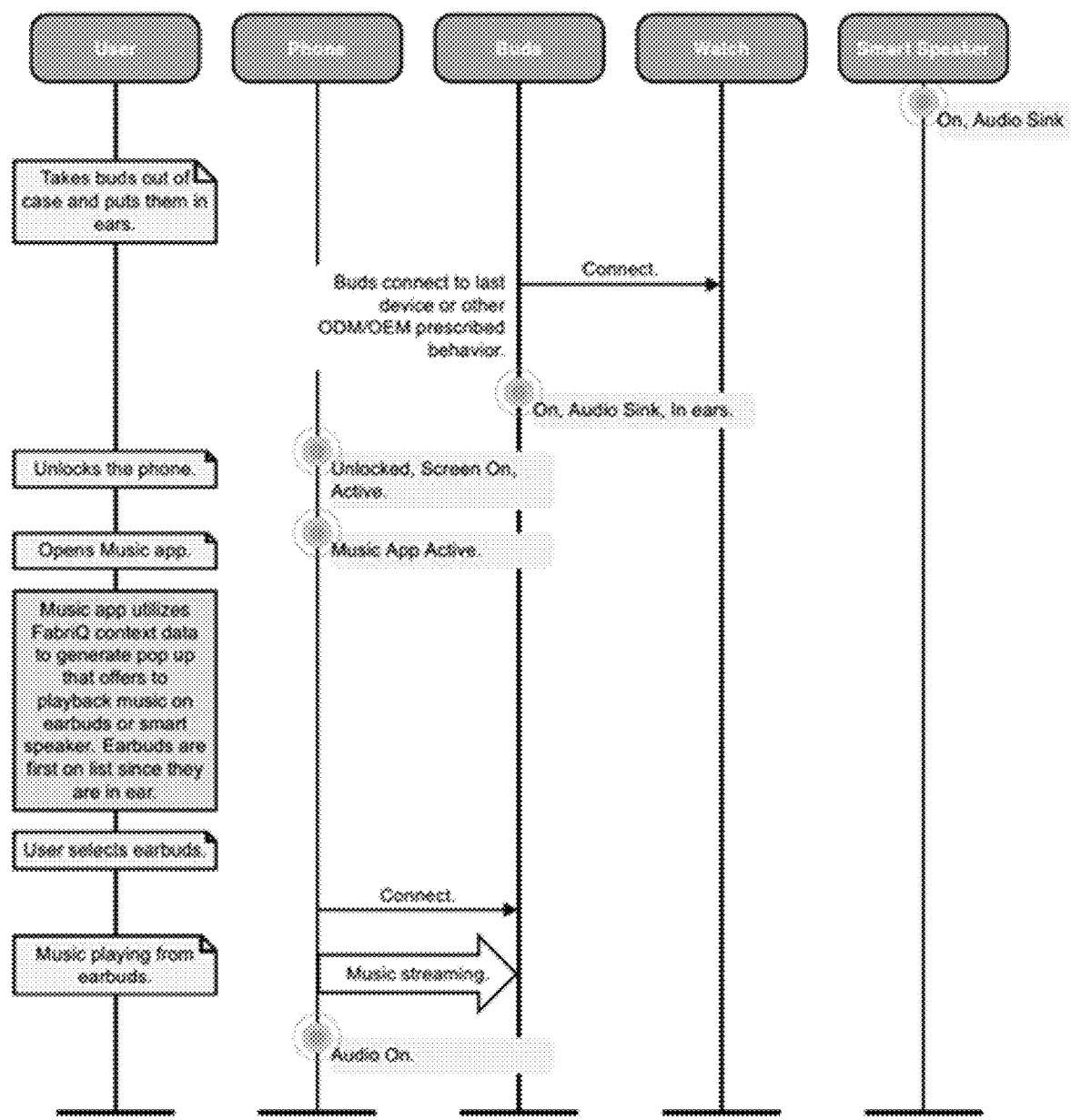
FIGS. 16B and 16C illustrate example interactions in a context broadcast network in accordance with various embodiments.
Figure 16C:
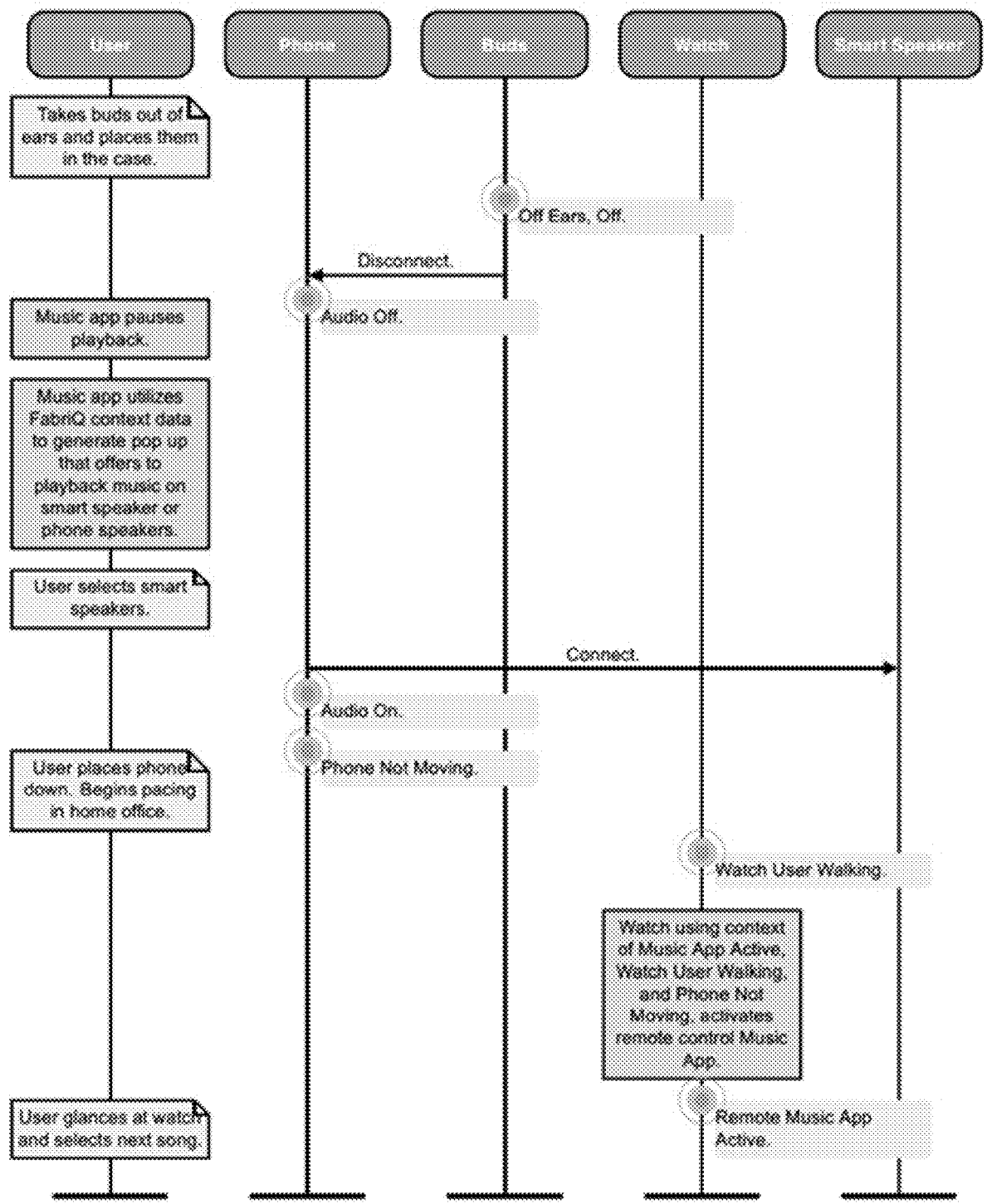

FIGS. 16B and 16C illustrate example interactions in a context broadcast network in accordance with various embodiments. FIGS. 16B and 16C illustrate example operations that may be performed according to, and/or in conjunction with, one or more operations of methods 600 (FIG. 6), 700 (FIG. 7), 1100 (FIG. 11), 1200 (FIG. 12), 1300 (FIG. 13A), 1320 (FIG. 13B), 1400 (FIG. 14), and/or 1600 (FIG. 16A). The operations illustrated in FIGS. 16B and/or 16C may provide an intuitive user experience that eliminates undesirable user interactions that are required in traditional systems.

FIG. 16B illustrates example operations of an enriched streaming playback experience according to various embodiments. As illustrated in FIG. 16B, initially a smart speaker may broadcast a message including one or more data elements indicating the smart speaker is powered on and audio sink enabled. The user may take their earbuds out of a case and put them in their ears. The earbuds may connect to the last device, such as the user's watch. The earbuds may broadcast a message including one or more data elements indicating the earbuds are powered on, are an audio sink for the watch, and in the user's ears. The user may unlock their phone. In response to being unlocked, the phone may broadcast a message including one or more data elements indicating the phone is unlocked, the screen is on, and the phone is active. The user may open a music streaming application. In response to the application opening, the phone may broadcast a message including one or more data elements indicating the music application is active. The music application may utilize the available context data to generate a pop up to the user that offers playback of music on the earbuds or smart speak based on broadcast messages indicating the smart speaker and earbuds are on and available for audio sink. The earbuds may be prioritized on the list as the earbuds are in the user's ears which may indicate a preference for the earbuds. The user may select earbuds, and the phone may connect to the earbuds. The music streaming application may stream music from the phone to the earbuds and the phone may broadcast a message including one or more data elements indicating the audio is being streamed.

FIG. 16C extends the example of FIG. 16B illustrating the impact of mobility of the user after playout starts on the earbuds. The music streaming application may use context information to create a pop-up option to transfer playback to the proximate smart speaker. Similarly, the watch may utilize context information that indicates the user has left the phone behind to activate the music remote application and bring the music remote application to the foreground. At some point after the operations illustrated in FIG. 16B, the user takes the earbuds out of their ears and places them in the charging case as illustrated in FIG. 16C. The earbuds may broadcast a message including one or more data elements indicating the earbuds are off ear and powering off. The earbuds may disconnect from the phone and the phone may broadcast a message including one or more data elements indicating the audio is off. The music streaming application may pause playback. The music application may utilize the available context data to generate a pop up to the user that offers playback of music on the smart speak or phone speakers based on broadcast messages indicating the smart speaker is on and available for audio sink and the presence of the phone's own speakers being available based on device context information. The user may select the smart speakers. The phone may connect to the smart speaker and the phone may broadcast a message including one or more data elements indicating audio is on. The smart speaker may start music playout. The user may place the phone down and start pacing the room. In response to being placed down, the phone may broadcast a message including one or more data elements indicating the phone is not moving. In response to the user walking, the watch may broadcast a message including one or more data elements indicating the user is walking. In response to the context indicated by broadcast messages and known to the watch, the watch may determine the music application is active, the user is walking, and the phone is not moving and activate a remote control music application. The watch may broadcast a message including one or more data elements indicating the remote music application is active. The user may interact with the watch to select a next song.

Figure 17A:
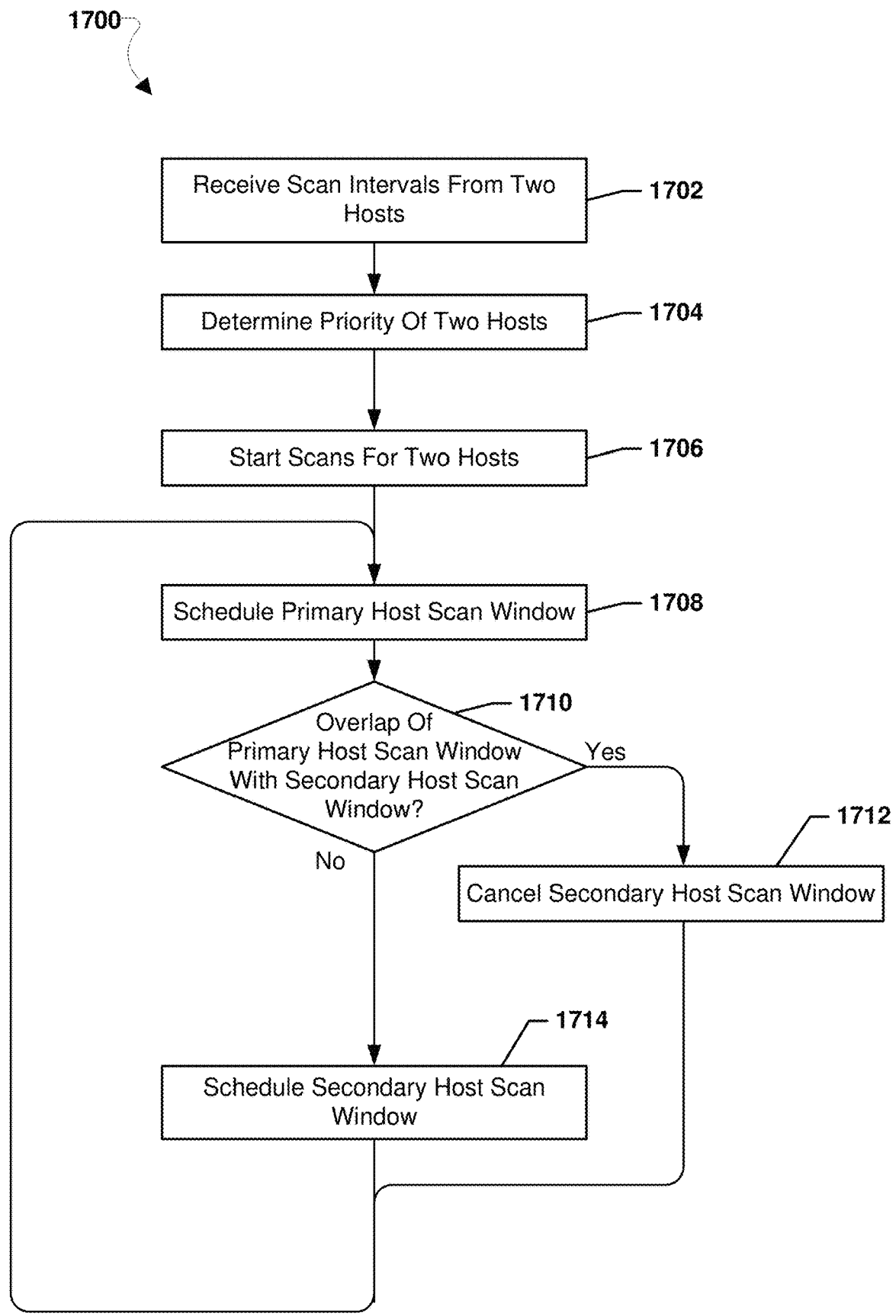
FIG. 17A is a process flow diagram illustrating a method for radio controller periodic scan scheduling in accordance with various embodiments.

FIG. 17A is a process flow diagram illustrating a method for radio controller periodic scan scheduling in accordance with some embodiments. With reference to FIGS. 1A-17A, the method 1700 may be performed by a processor (e.g., 210, 212, 214, 216, 218, 252, 260) of a device (e.g., the device 120a-120h, 200, 401, 402, 403, 404, 405). In some embodiments, the operations of method 1700 may be performed in conjunction with the operations of methods 600 (FIG. 6), 700 (FIG. 7), 1100 (FIG. 11), 1200 (FIG. 12), 1300 (FIG. 13A), 1320 (FIG. 13B), 1400 (FIG. 14), and/or 1600 (FIG. 16A). As examples, the operations of method 1700 may be performed by a radio controller (e.g., 355, etc.) executing on a processor (e.g., 210, 212, 214, 216, 218, 252, 260) of a device (e.g., the device 120a-120h, 200, 401, 402, 403, 404, 405). As examples, the operations of method 1700 may be performed by a radio controller (e.g., 355, etc.) configured to control various radio or protocol transports and RF chains of a device (e.g., the device 120a-120h, 200, 401, 402, 403, 404, 405), such as Bluetooth, mDNS, CHIP, etc. Means for performing each of the operations of the method 1700 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In block 1702, the processor may receive scan intervals from two hosts. The hosts may be various applications, services, components, cores, firmware, programmable hardware state machines, and/or any programmable entity that may interact with a radio controller (e.g., 355, etc.) to request scanning scheduling by the radio controller. As examples, the two hosts may be an application 322 and the context broadcast networking core 304, the two hosts may be the OS component 320 and the context broadcast networking core 304, the two hosts may be the OS services 318 and the context broadcast networking core 304, the two hosts may be the HLOS 357 and the context broadcast networking core 304, etc. The scan intervals may define scan window lengths and scan periods for each of the respective hosts. The scan intervals may enable the radio controller (e.g., 355, etc.) to schedule scan windows for the hosts. Means for performing the operations of block 1702 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In block 1704, the processor may determine the priority or priorities of the two hosts. In some embodiments, certain hosts may have a higher priority than other hosts. For example, hosts associated with an HLOS (e.g., HLOS 357, etc.) may have primary priority and be given higher priority for scheduling than a host associated with a low power island (or low power core) (e.g., low power island 302), such as a context broadcast networking core (e.g., context broadcasting networking core 304, etc.). The host with the higher priority may be considered a primary host and the host with the lower priority may be considered a secondary host. Means for performing the operations of block 1704 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In block 1706, the processor may start scans for the two hosts. For example, the radio controller (e.g., 355, etc.) may begin to schedule RF resources for the two hosts according to the scan window lengths and scan periods indicated in the received scan intervals. Means for performing the operations of block 1706 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In block 1708, the processor may schedule a primary host scan window. For example, the radio controller (e.g., 355, etc.) may schedule RF resources for the primary host according to the scan window length and scan period indicated in the received scan interval for the primary host. Means for performing the operations of block 1708 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In determination block 1710, the processor may determine whether there is overlap between the primary host scan window and a secondary host scan window. Overlap may occur when a secondary host scan window would be scheduled while a primary host scan window is active. Means for performing the operations of block 1710 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In response to determining that there is an overlap of the primary host scan window with the secondary host scan window (i.e., determination block 1710="Yes"), the processor may cancel the secondary host scan window in block 1712. Canceling the secondary host scan window may prevent radio resources from being expended on the secondary host scan window. Thus, a secondary host scan window will not occur when there is an overlap of the primary host scan window with the secondary host scan window. Means for performing the operations of block 1712 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

In response to determining that there is no overlap of the primary host scan window with the secondary host scan window (i.e., determination block 1710="No"), the processor may schedule the secondary host scan window in block 1714. For example, the radio controller (e.g., 355, etc.) may schedule RF resources for the secondary host according to the scan window length and scan period indicated in the received scan interval for the secondary host. Means for performing the operations of block 1708 may include one or more processors of a device (e.g., the device 120a-120h, 200, 401, 402, 403, 404, 405), such as one or more of the processors 210, 212, 214, 216, 218, 252, 260 executing a radio controller (e.g., 355, etc.).

Figure 17B:
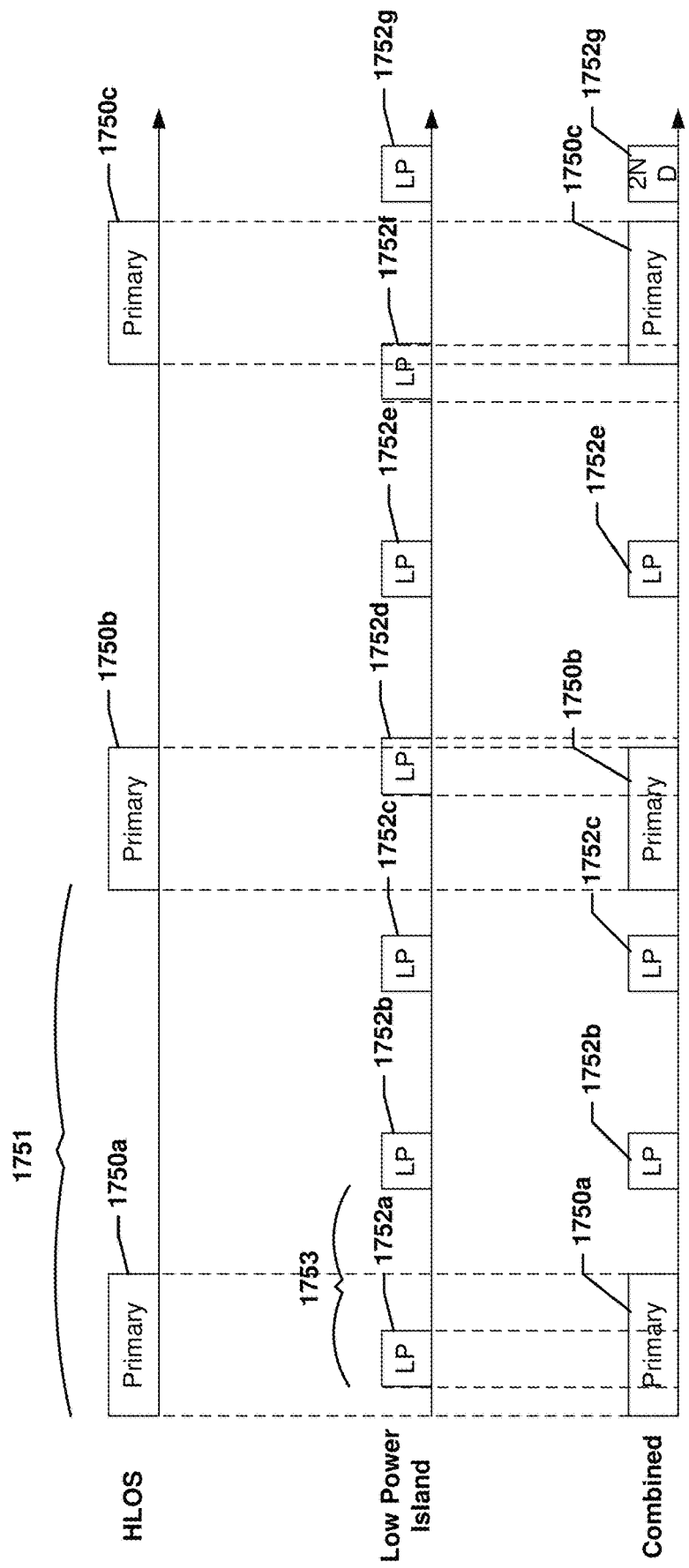
FIG. 17B illustrates an example of periodic scan scheduling in accordance with various embodiments.

FIG. 17B illustrates an example of periodic scan scheduling in accordance with various embodiments. With reference to FIGS. 1A-17B, the scan scheduling illustrated in FIG. 17B is a non-limiting example of scan scheduling performed according to the operations of the method 1700 (FIG. 17A).

FIG. 17B illustrates scan windows 1750a-1750c associated with a HLOS (e.g., HLOS 357, etc.) with a scan period 1751 and scan windows 1752a-1752g associated with a low power island (or low power core) (e.g., low power island 302) with a scan period 1753. A radio controller (e.g., 355, etc.) scheduling periodic scans for the HLOS and low power island may be configured to prioritize the scan windows 1750a-1750c over the scan windows 1752a-1752g. As such, the scan windows 1750a-1750c may be primary scan windows and the scan windows 1752a-1752g may be secondary scan windows. When a primary scan window for the HLOS overlaps with a secondary scan window for the low power island, the radio controller (e.g., 355, etc.) may cancel the secondary scan window. As illustrated in the combined scan schedule in FIG. 17B, secondary scan windows 1752a, 1752d, and 1752f, may be cancelled as those secondary scan windows 1752a, 1752d, and 1752f overlaps with primary scan windows 1750a, 1750b, and 1750c, respectively.

Figure 18:
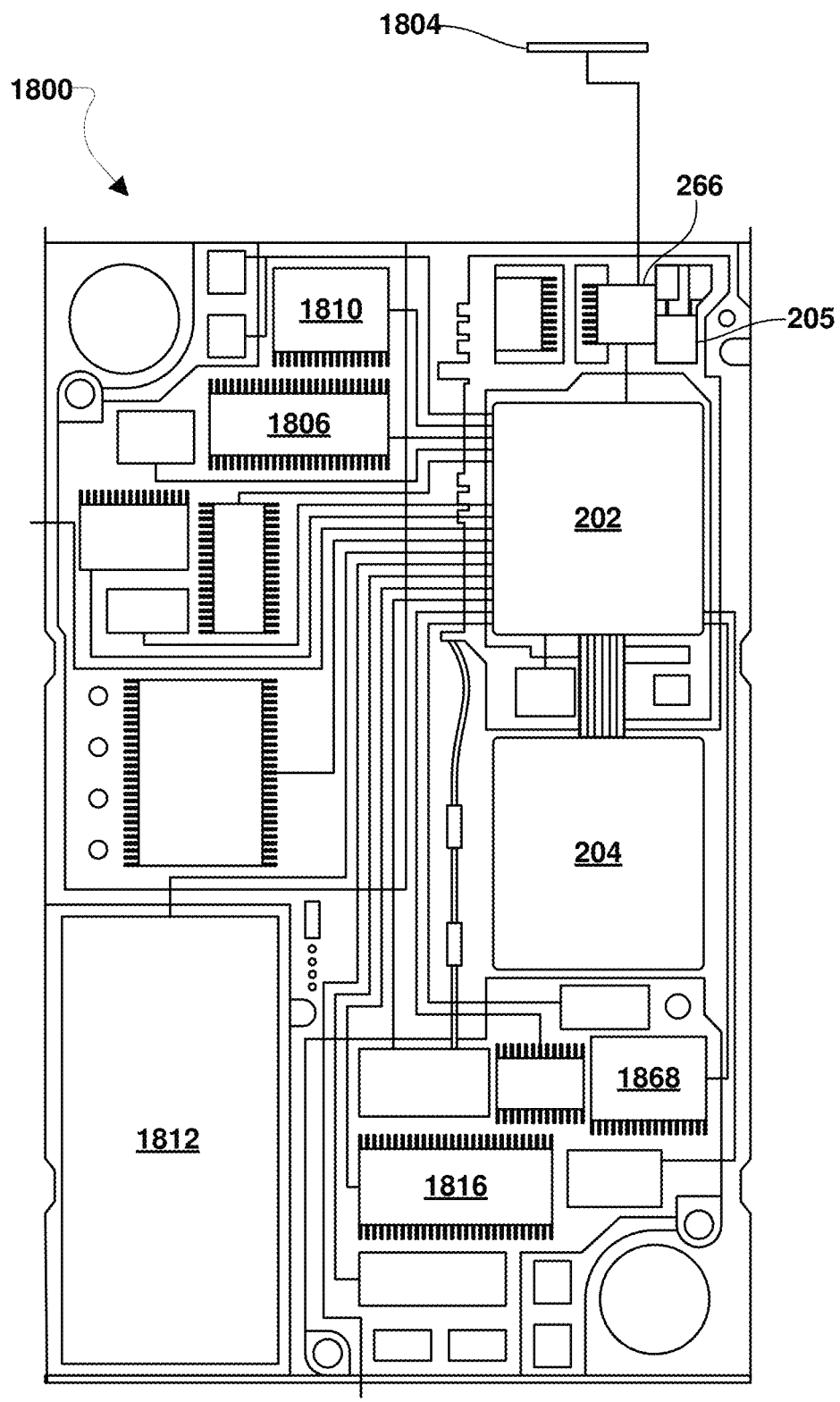
FIG. 18 is a component block diagram of an IoT device suitable for use with various embodiments.

Various embodiments (including, but not limited to, embodiments discussed above with reference to FIGS. 1A-17B) may be implemented on a variety of IoT devices, an example in the form of a circuit board for use in a device is illustrated in FIG. 18. With reference to FIGS. 1A-18, an IoT device 1800 (e.g., 120a-h, 200, 401, 402, 403, 404, 405) may include a first SOC 202 (e.g., a SOC-CPU) coupled to a second SOC 204 (e.g., a 5G capable SOC) and a temperature sensor 205. The first and second SOCs 202, 204 may be coupled to internal memory 1806. Additionally, the IoT device 1800 may include or be coupled to an antenna 1804 for sending and receiving wireless signals from a wireless transceiver 266 or within the second SOC 204. The IoT device 1800 may include a SIM 1868. The antenna 1804 and wireless transceiver 266, SIM 1868, and/or second SOC 204 may support communications using various RATs, including NB-IoT, CIoT, GSM, and/or VoLTE, 5G, WiMAX, CDMA-2000, LTE, EGPRS, etc.

An IoT device 1800 may also include a sound encoding/decoding (CODEC) circuit 1810, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 266 and CODEC 1810 may include a digital signal processor (DSP) circuit (not shown separately).

Some IoT devices may include an internal power source, such as a battery 1812 configured to power the SOCs and transceiver(s). Such IoT devices may include power management components 1816 to manage charging of the battery 1812.

Figure 19:
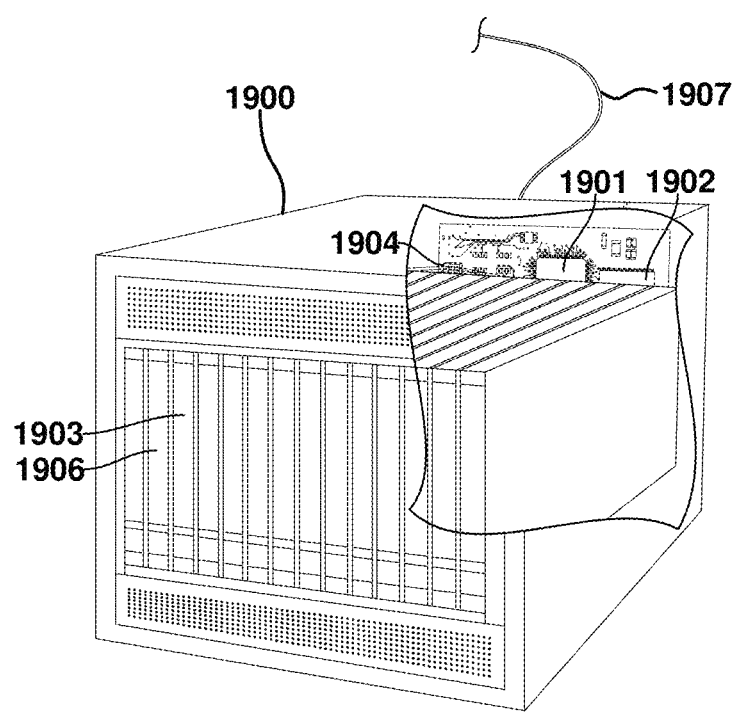
FIG. 19 is a component diagram of an example server suitable for use implementing various embodiments.

The various embodiments (including, but not limited to, embodiments discussed above with reference to FIGS. 1A-17B) may also be implemented on any of a variety of commercially available server devices, such as the server 1900 (e.g., server 198, 199, 521, 522) illustrated in FIG. 19. With reference to FIGS. 1A-19, such a server 1900 typically includes a processor 1901 coupled to volatile memory 1902 and a large capacity nonvolatile memory, such as a disk drive 1903. The server 1900 may also include a floppy disc drive, compact disc (CD) or digital versatile disc (DVD) drive 1906 coupled to the processor 1901. The server 1900 may also include one or more network transceivers 1904, such as a network access port, coupled to the processor 1901 for establishing network interface connections with a communication network 1907, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

Figure 20:
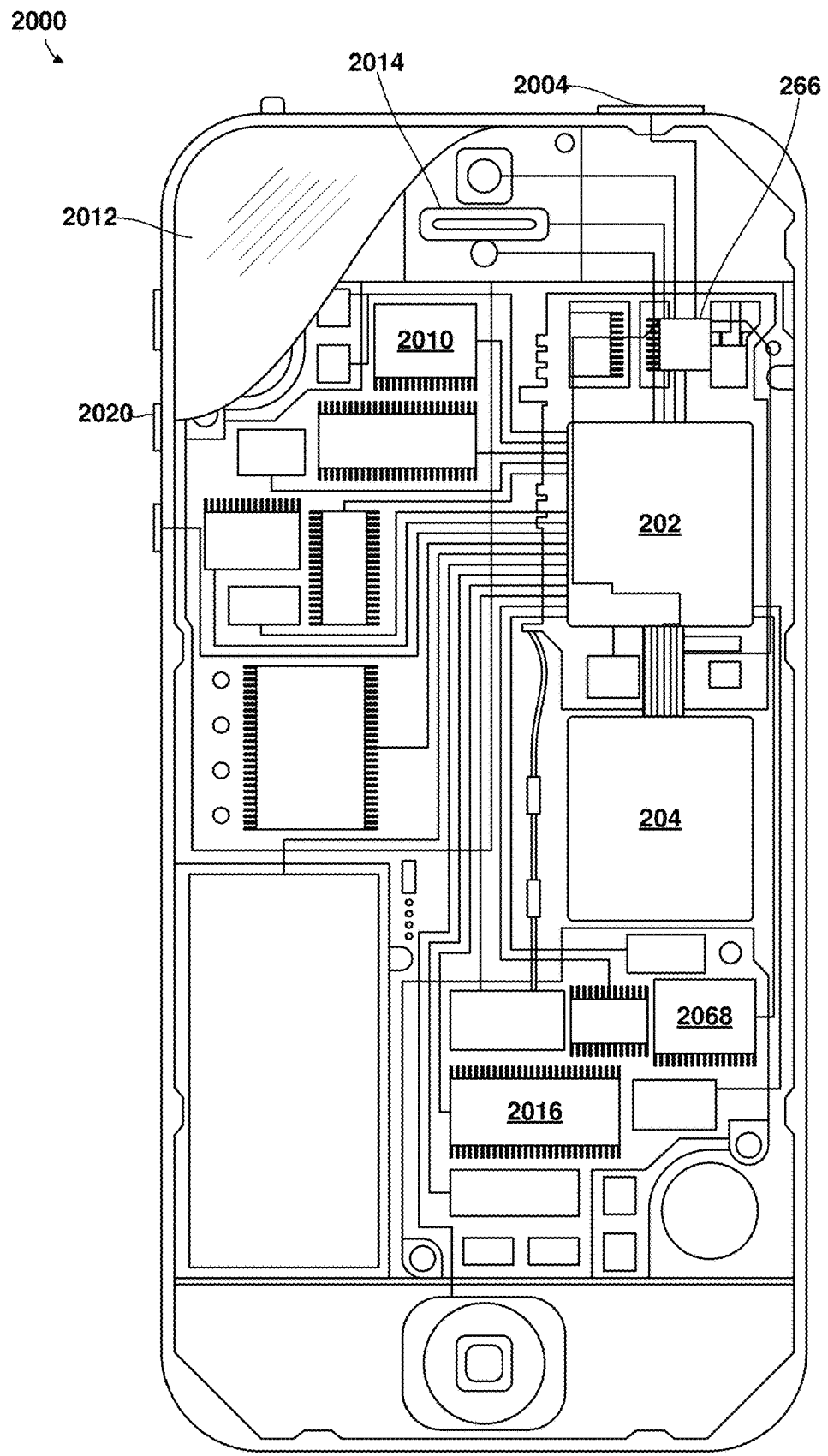
FIG. 20 is a component block diagram of a device suitable for implementing various embodiments.

FIG. 20 is a component block diagram of a device 2000 suitable for use with various embodiments. With reference to FIGS. 1A-20, various embodiments may be implemented on a variety of device 2000 (e.g., the device 120a-120h, 200, 401, 402, 403, 404, 405), an example of which is illustrated in FIG. 20 in the form of a smartphone. The device 2000 may include a first SOC 202 (e.g., a SOC-CPU) coupled to a second SOC 204 (e.g., a 5G capable SOC). The first and second SOCs 202, 204 may be coupled to internal memory, 2016, a display 2012, and to a speaker 2014. Additionally, the device 2000 may include an antenna 2004 for sending and receiving electromagnetic radiation that may be connected to a wireless transceiver 266 coupled to one or more processors in the first and/or second SOCs 202, 204. The device 2000 may include a SIM 2068. The antenna 2004 and wireless transceiver 266, SIM 2068, and/or second SOC 204 may support communications using various RATs, including NB-IoT, CIoT, GSM, and/or VoLTE, 5G, WiMAX, CDMA-2000, LTE, EGPRS, etc. The device 2000 may also include menu selection buttons or rocker switches 2020 for receiving user inputs.

The device 2000 also includes a sound encoding/decoding (CODEC) circuit 2010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 2010 may include a digital signal processor (DSP) circuit (not shown separately).

Figure 21:
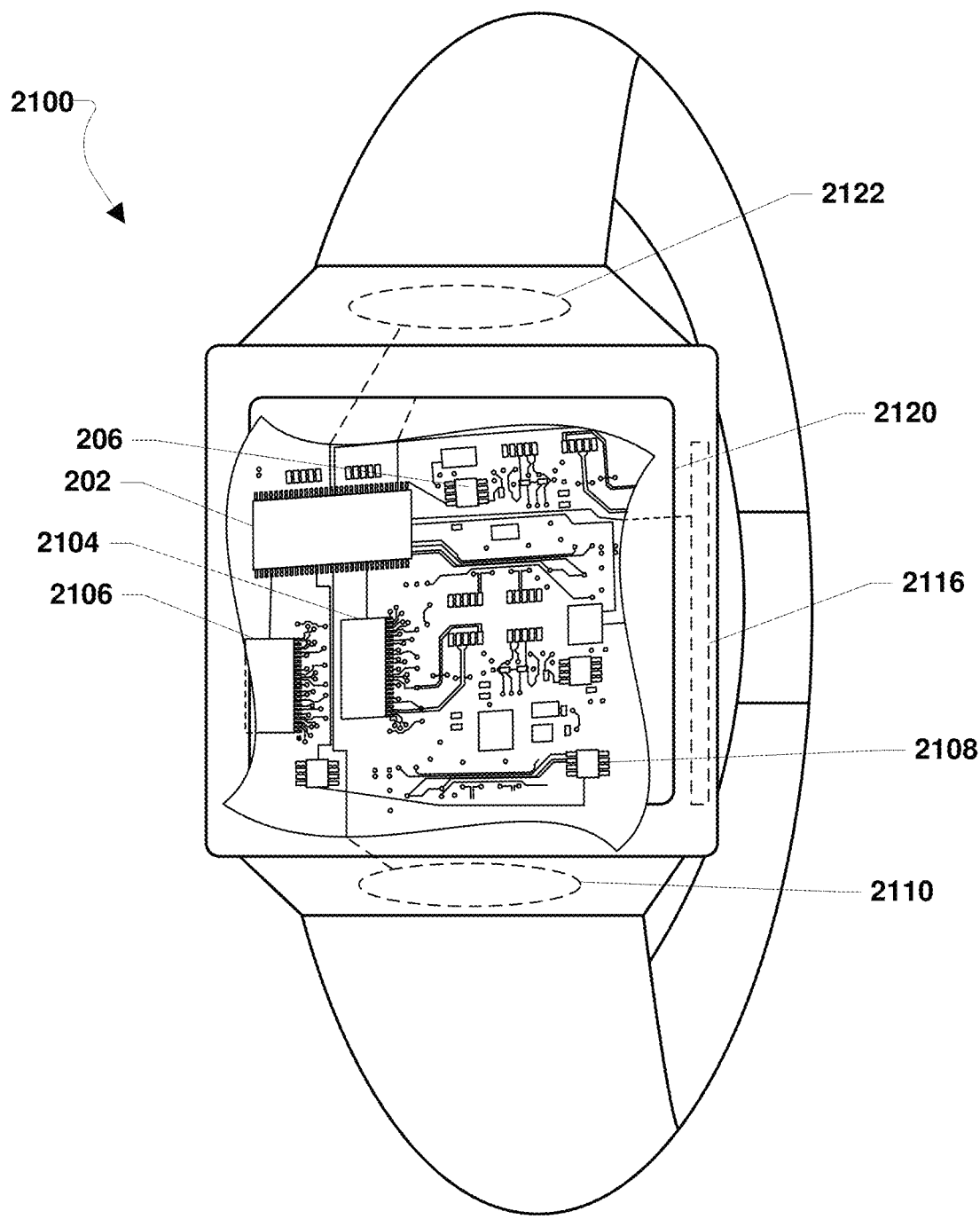
FIG. 21 is a component diagram of an example computing device suitable for use with the various embodiments.

FIG. 21 is a component block diagram of a device 2100 suitable for use with various embodiments. With reference to FIGS. 1A-21, various embodiments may be implemented on a variety of device 2100 (e.g., the device 120a-120h, 200, 401, 402, 403, 404, 405), an example of which is illustrated in FIG. 21 as a wearable computing device in the form of a smart watch 2100. A smart watch 2100 may include SoC 200, which as described with reference to FIG. 2 may include a first SOC (e.g., a SOC-CPU) coupled to a second SOC (e.g., a 5G capable SOC). The first and second SOCs 202, 204 may be coupled to internal memories 2104 and 2106. Internal memories 2104 and 2106 may be volatile or non-volatile memories, and may also be secure and/or encrypted memories, or unsecure and/or unencrypted memories, or any combination thereof. The first and second SOCs 202, 204 may also be coupled to a touchscreen display 2120, such as a resistive-sensing touchscreen, capacitive-sensing touchscreen infrared sensing touchscreen, or the like. Additionally, the smart watch 2100 may have one or more antenna 2108 for sending and receiving electromagnetic radiation that may be connected to a wireless transceiver 266 coupled to one or more processors in the first and/or second SOCs 202, 204. The antenna 2108 and wireless transceiver 266, and/or second SOC 204 may support communications using various RATs, such as one or more Bluetooth®, Peanut, Wi-Fi, ANT+, Zigbee, CHIP, etc. The smart watch 2100 may also include physical virtual buttons 2122 and 2110 for receiving user inputs as well as a slide sensor 2116 for receiving user inputs.

Figure 22:
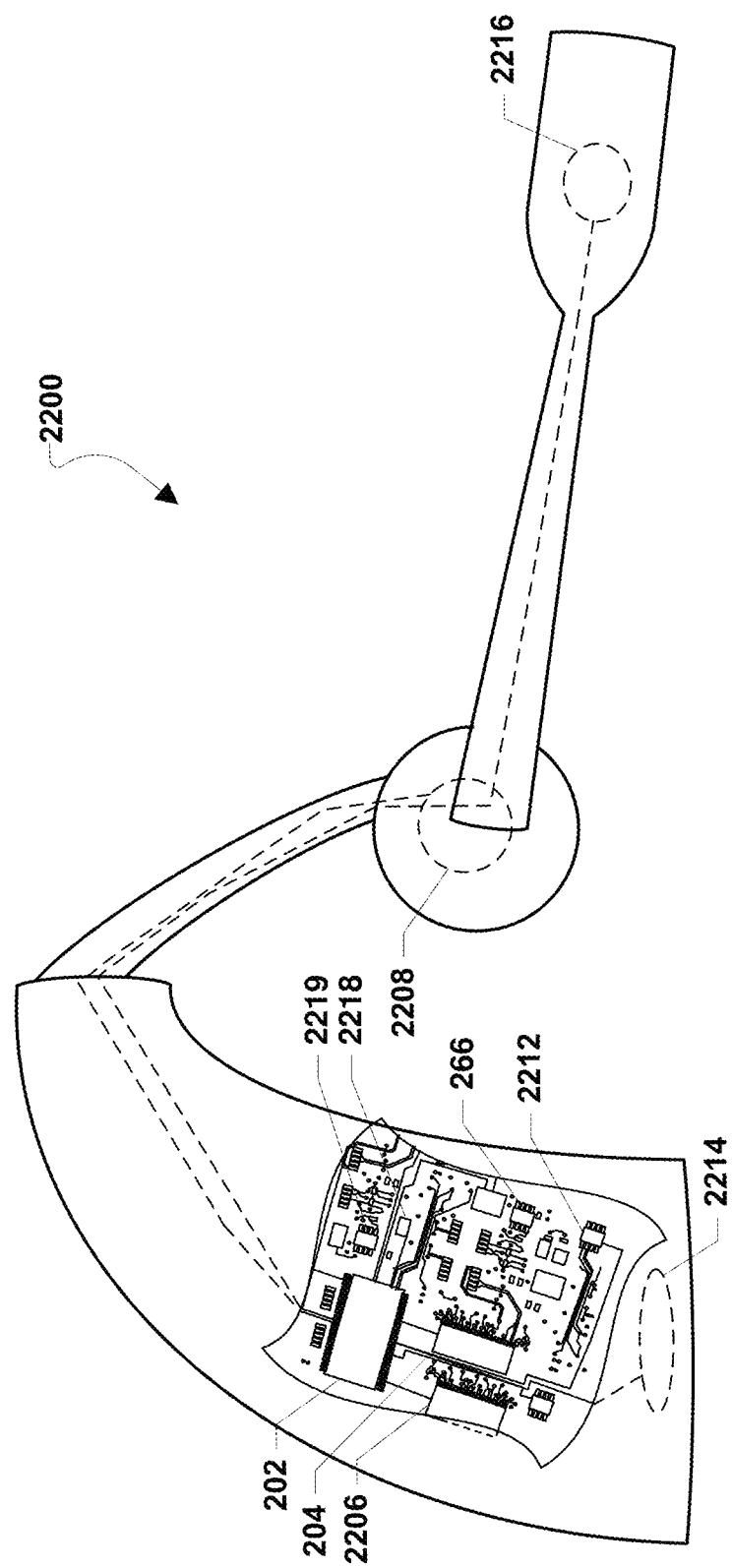
FIG. 22 is a component diagram of a wireless earpiece device suitable for use with the various embodiments.

FIG. 22 is a component block diagram of a device 2200 suitable for use with various embodiments. With reference to FIGS. 1A-22, various embodiments may be implemented on a variety of device 2200 (e.g., the device 120a-120h, 200, 401, 402, 403, 404, 405), an example of which is illustrated in FIG. 22 as a wearable computing device in the form of a wireless earpiece 1200. A wireless earpiece 1200 may include a first SOC 202 (e.g., a SOC-CPU) coupled to a second SOC 204 (e.g., a 5G capable SOC). The first and/or second SOCs 202, 204 may be coupled to internal memory 2206. Internal memory 2206 may be volatile or non-volatile memory, and may also be secure and/or encrypted memory, or unsecure and/or unencrypted memory, or any combination thereof. The wireless earpiece 2200 may include a physical button 2214 for receiving user inputs. Additionally, the wireless earpiece 2200 may have one or more antenna 2212 for sending and receiving electromagnetic radiation that may be connected to a wireless transceiver 266 coupled to one or more processors in the first and/or second SOCs 202, 204. The antenna 2212 and wireless transceiver 266, and/or first and/or second SOCs 202, 204 may support communications using various RATs, such as Bluetooth RATs, Wi-Fi RATs, etc. The wireless earpiece 2200 may include a speaker 2208 coupled to the first and/or second SOCs 202, 204 and configured to generate an audio output. The wireless earpiece 2200 may also include a microphone 2216 coupled to the first and/or second SOCs 202, 204 to receive an audio input. The wireless earpiece 2200 may also include various environment sensors or a sensor pack that may include sensors, such as an accelerometer 2218, and a gyroscope 2219 coupled to the first and/or second SOCs 202, 204.

Figure 23:
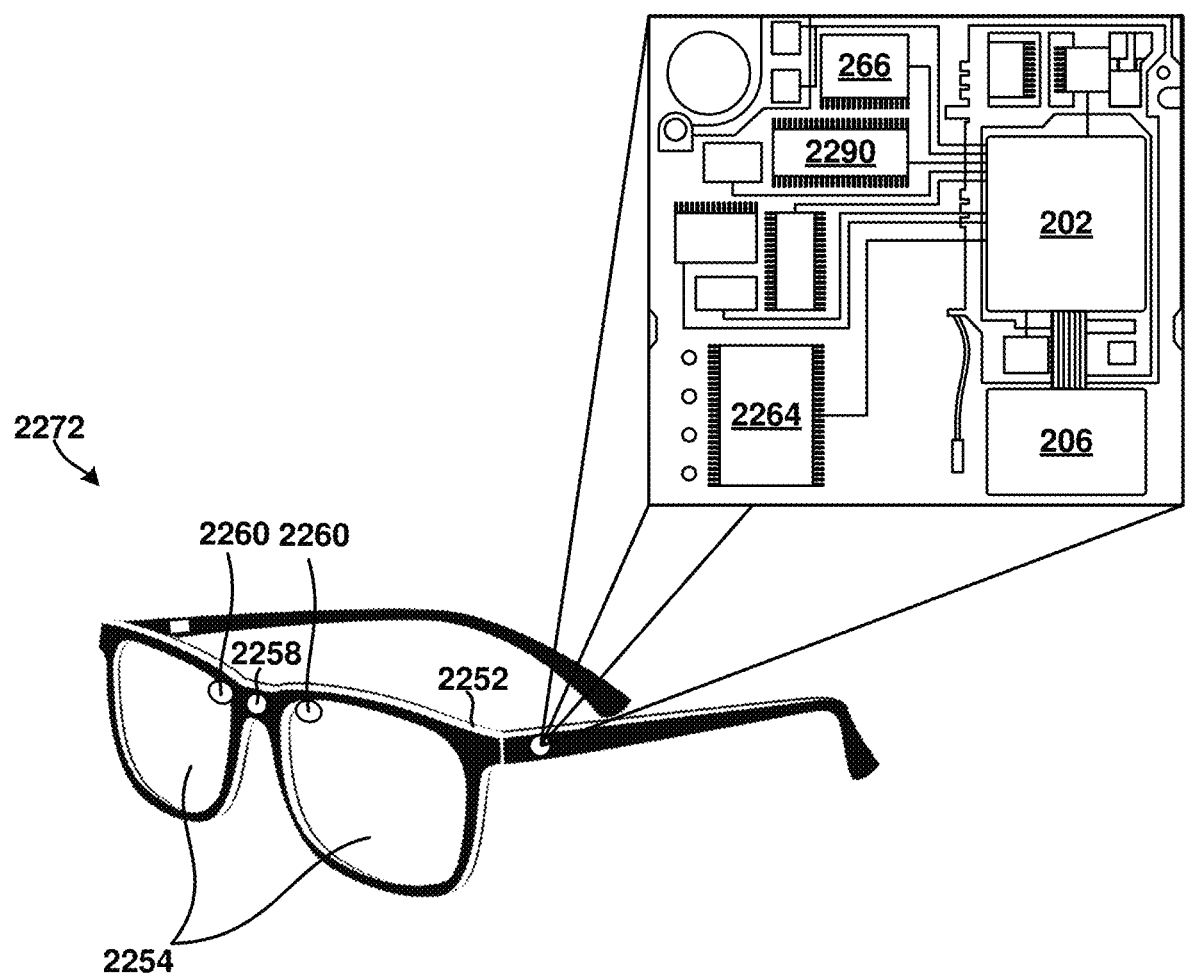
FIG. 23 is an illustration of a head-mounted device (e.g., an extended reality (XR) headset) suitable for implementing various embodiments.

FIG. 23 illustrates a head-mounted device 2272 that may be configured in accordance with various embodiments. With reference to FIGS. 1A-23, various embodiments may be implemented on a variety of devices 2272 (e.g., the device 120a-120h, 200, 401, 402, 403, 404, 405), an example of which is illustrated in FIG. 22 as a wearable computing device in the form of a head-mounted device 2272, such as an XR headset. The example head-mounted device 2272 includes a frame 2252, two optical lenses 2254, and a first SOC 202 (e.g., a SOC-CPU) coupled to a second SOC 204 (e.g., a 5G capable SOC) that is communicatively coupled to outward facing world-view image sensors/cameras 2258, inward facing gaze-view sensors/cameras 2260, and a memory 2264. Additionally, the head-mounted device 2272 may have one or more antenna 2290 for sending and receiving electromagnetic radiation that may be connected to a wireless transceiver 266 coupled to one or more processors in the first and/or second SOCs 202, 204. The antenna 2290 and wireless transceiver 266, and/or first and/or second SOCs 202, 204 may support communications using various RATs, such as Bluetooth RATs, Wi-Fi RATs, etc.

The processors of the IoT device 1800, server 1900, and devices 2000, 2100, 2200, 2272 may be any programmable microprocessor, microcomputer or multiple processor chip or chips that can be configured by software instructions (applications) to perform a variety of functions, including the functions of various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a device and the device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, 1100, 1200, 1300, 1320, 1400, 1600, and/or 1700 may be substituted for or combined with one or more operations of the methods 600, 700, 1100, 1200, 1300, 1320, 1400, 1600, and/or 1700.

Implementation examples are described in the following paragraphs. While some of the following implementation examples are described in terms of example methods, further example implementations may include: the example methods discussed in the following paragraphs implemented by wireless device including a processor configured to perform operations of the example methods; the example methods discussed in the following paragraphs implemented by a wireless device including means for performing functions of the example methods; and the example methods discussed in the following paragraphs implemented as a non-transitory processor-readable storage medium having stored thereon processor-executable instructions configured to cause a processor of a wireless device to perform the operations of the example methods.

Example 1. A method for supporting context broadcast networking by a device, including: generating one or more data elements based at least in part on a context state, setting, event, or capability; forming one or more messages including the generated data elements; and sending the one or more messages to one or more transport layers for broadcast transmission.

Example 2. The method of example 1, wherein the context state, setting, event, or capability is associated with one or more of the device, a user of the device, or an application running on the device.

Example 3. The method of any of examples 1-2, wherein the context state, setting, event, or capability is a direct context state, setting, event, or capability or an inferred context state, setting, event, and/or capability.

Example 4. The method of any of examples 1-3, wherein generating the one or more data elements based at least in part on the context state, setting, event, or capability includes: determining whether a data element is associated with a fully qualified name; and generating the data element using a short namespace format associated with the fully qualified name in response to determining that the data element is associated with the fully qualified name.

Example 5. The method of any of examples 1-4, wherein sending the one or more messages to one or more transport layers for broadcast transmission includes selecting one or more available transport layers meeting Quality of Service requirements and power usage requirements.

Example 6. The method of any of examples 1-5, wherein sending the one or more messages to one or more transport layers for broadcast transmission includes setting a broadcast interval and a repetition value for the one or more messages.

Example 7. The method of example 6, wherein the broadcast interval and the repetition value are adjusted based at least in part on a power state of the device.

Example 8. The method of any of examples 1-7, further including: determining whether a broadcast message is received from another device having a same account credentials as the device; generating one or more data elements from the broadcast message in response to determining that the broadcast message is received from another device having the same account credentials as the device; sending the one or more data elements to a shared data cache; and signaling or sending an interrupt indicating the one or more data elements are available.

Example 9. The method of example 8, further including: ignoring the broadcast message in response to determining that the broadcast message is not received from another device having the same account credentials as the device.

Example 10. The method of any of examples 8-9, further including: monitoring for the broadcast message on one or more transport layers at a selected periodicity.

Example 11. The method of example 10, further including: increasing the periodicity in response to a user being in close proximity; and decreasing the periodicity in response to a user not being in close proximity.

Example 12. The method of any of examples 1-11, further including: determining a user context state change based on at least one received data element from another device; and offering a user of the device one or more options to change an application state based at least in part on the user context state change.

Example 13. The method of any of examples 1-12, wherein: forming of the one or more messages including the generated data elements is performed on a low power island.

Example 14. The method of example 13, wherein determining whether a broadcast message is received from another device having a same account credentials as the device is performed on the low power island.

Example 15. A method for supporting context broadcast networking by a device, including: determining, on a low power island of the device interfacing with a radio controller of the device, whether a broadcast message received from the radio controller indicates an account identity value matching a pre-calculated account identity value; determining, on the low power island of the device, whether the broadcast message received from the radio controller is a duplicate message in response to determining that the broadcast message received from the radio controller indicates an account identity value matching a pre-calculated account identity value; decrypting, on the low power island of the device, at least a portion of the broadcast message received from the radio controller in response to determining that the broadcast message received from the radio controller is not a duplicate message; generating, on the low power island of the device, one or more data elements from the broadcast message received from the radio controller in response to decrypting the at least a portion of the broadcast message received the radio controller; sending the one or more data elements from the lower power island of the device to a shared data cache of the device; and signaling or sending, from the low power island of the device to another processor of the device, an interrupt indicating the one or more data elements are available in the shared data cache.

Example 16. The method of example 15, in which the low power island is configured such that: determining that the broadcast message received from the radio controller indicates an account identity value matching a pre-calculated account identity value and determining that the broadcast message received from the radio controller is not a duplicate message occur while the low power island is in a first mode of operation; decrypting at least a portion of the broadcast message received from the radio controller, generating one or more data elements from the broadcast message received from the radio controller, sending the one or more data elements from the lower power island of the device to the shared data cache of the device, and signaling or sending the interrupt indicating the one or more data elements are available in the shared data cache occur while the low power island is in a second mode of operation; and the first mode of operation is a lower power mode of operation than the second mode of operation.

Example 17. The method of any of either of examples 15 or 16, in which the account identity value indicated in the broadcast message received from the radio controller and the pre-calculated account identity value matching indicates that the device and a device sending the broadcast message received from the radio controller share a same account credential.

Example 18. The method of any of examples 15-17, in which determining whether the broadcast message received from the radio controller is a duplicate message comprises: comparing a salt value of the broadcast message received from the radio controller to a log of salt values; and determining that the broadcast message received from the radio controller is a duplicate message in response to a match between the salt value of the broadcast message received from the radio controller and a salt value in the log of salt values.

Example 19. The method of any of examples 15-18, further including ignoring the broadcast message received from the radio controller in response to: determining that the broadcast message received from the radio controller does not indicate an account identity value matching the pre-calculated account identity value; or determining that the broadcast message received from the radio controller is a duplicate message.

Example 20. The method of any of examples 15-19, further including: listening for broadcast messages received by the radio controller on a transport layer at a selected periodicity by the low power island of the device, in which the selected periodicity is a different periodicity than a listening periodicity of the other processor of the device for broadcast messages received by the radio controller on a transport layer.

Example 21. The method of example 20, further including: increasing the selected periodicity in response to a user being in close proximity; and decreasing the selected periodicity in response to a user not being in close proximity.

Example 22. The method of example 20, in which the transport layer is a Bluetooth transport layer.

Example 23. The method of any of examples 15-22, in which the one or more data elements indicate a context state, setting, event, or capability of another device.

Example 24. A method for radio controller periodic scan scheduling for a device, including: receiving at a radio controller of the device a first scan interval from a primary host of the device and a second scan interval from a secondary host of the device; and scheduling, by the radio controller, primary host scan windows based on the first scan interval from the primary host; determining, by the radio controller, any secondary host scan windows overlapping any of the scheduled primary host first scan windows based at least in part on the second scan interval from the secondary host; and cancelling any secondary host second scan windows determined to overlap any of the scheduled primary host first scan windows.

Example 25. The method of example 24, in which the primary host is associated with a high level operating system interfacing with the radio controller and the secondary host is associated with a low power island interfacing with the radio controller.

Example 26. The method of either of either of examples 24 or 25, in which the radio controller is a Bluetooth radio controller.

Example 27. The method of any of examples 24-26, in which the scan interval from the primary host of the device defines a first scan window length and the scan interval from the secondary host of the device defines a second scan window length that is different than the first scan window length.

Example 28. The method of example 27, in which the scan interval from the primary host of the device defines a first scan period and the scan interval from the secondary host of the device defines a second scan period that is different than the first scan period.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A device, comprising:
   a radio controller;
   a share data cache;
   a processor coupled to the shared data cache; and
   a low power island coupled to the shared data cache and interfaced with the radio controller, wherein the low power island is configured to:
   determine whether a broadcast message received from the radio controller indicates an account identity value matching a pre-calculated account identity value;
   determine whether the broadcast message received from the radio controller is a duplicate message in response to determining that the broadcast message received from the radio controller indicates an account identity value matching a pre-calculated account identity value;
   decrypt at least a portion of the broadcast message received from the radio controller in response to determining that the broadcast message received from the radio controller is not a duplicate message;
   generate one or more data elements from the broadcast message received from the radio controller in response to decrypting the at least a portion of the broadcast message received the radio controller;
   send the one or more data elements to the shared data cache; and
   signal an interrupt to the processor indicating that the one or more data elements are available in the shared data cache.

2. The device of claim 1, wherein the low power island is further configured such that:
   determining that the broadcast message received from the radio controller indicates an account identity value matching a pre-calculated account identity value and determining that the broadcast message received from the radio controller is not a duplicate message occur while the low power island is in a first mode of operation;
   decrypting at least a portion of the broadcast message received from the radio controller, generating one or more data elements from the broadcast message received from the radio controller, sending the one or more data elements from the lower power island of the device to the shared data cache of the device, and signaling or sending the interrupt indicating the one or more data elements are available in the shared data cache occur while the low power island is in a second mode of operation; and the first mode of operation is a lower power mode of operation than the second mode of operation.

3. The device of claim 1, wherein the account identity value indicated in the broadcast message received from the radio controller and the pre-calculated account identity value matching indicates that the device and a device sending the broadcast message received from the radio controller share a same account credential.

4. The device of claim 1, wherein the low power island is further configured to determine whether the broadcast message received from the radio controller is a duplicate message by:
   comparing a salt value of the broadcast message received from the radio controller to a log of salt values; and
   determining that the broadcast message received from the radio controller is a duplicate message in response to a match between the salt value of the broadcast message received from the radio controller and a salt value in the log of salt values.

5. The device of claim 1, wherein the low power island is further configured to:
   ignore the broadcast message received from the radio controller in response to:
   determine that the broadcast message received from the radio controller does not indicate an account identity value matching the pre-calculated account identity value; or
   determine that the broadcast message received from the radio controller is a duplicate message.

6. The device of claim 1, wherein the low power island is further configured to:
   monitor for broadcast messages received by the radio controller on a transport layer at a selected periodicity, wherein the selected periodicity is a different periodicity than a monitoring periodicity of another processor of the device for broadcast messages received by the radio controller on a transport layer.

7. The device of claim 6, wherein the low power island is further configured to:
   increase the selected periodicity in response to a user being in close proximity; and
   decrease the selected periodicity in response to a user not being in close proximity.

8. The device of claim 6, wherein the transport layer is a Bluetooth transport layer.

9. The device of claim 1, wherein the one or more data elements indicate a context state, setting, event, or capability of another device.

10. A method for supporting context broadcast networking by a device, comprising:
    determining, on a low power island of the device interfacing with a radio controller of the device, whether a broadcast message received from the radio controller indicates an account identity value matching a pre-calculated account identity value;
    determining, on the low power island of the device, whether the broadcast message received from the radio controller is a duplicate message in response to determining that the broadcast message received from the radio controller indicates an account identity value matching a pre-calculated account identity value;
    decrypting, on the low power island of the device, at least a portion of the broadcast message received from the radio controller in response to determining that the broadcast message received from the radio controller is not a duplicate message;

generating, on the low power island of the device, one or more data elements from the broadcast message received from the radio controller in response to decrypting the at least a portion of the broadcast message received the radio controller;

sending the one or more data elements from the lower power island of the device to a shared data cache of the device; and signaling or sending, from the low power island of the device to another processor of the device, an interrupt indicating the one or more data elements are available in the shared data cache.

11. The method of claim 10, wherein the low power island is configured such that:

determining that the broadcast message received from the radio controller indicates an account identity value matching a pre-calculated account identity value and determining that the broadcast message received from the radio controller is not a duplicate message occur while the low power island is in a first mode of operation;

decrypting at least a portion of the broadcast message received from the radio controller, generating one or more data elements from the broadcast message received from the radio controller, sending the one or more data elements from the lower power island of the device to the shared data cache of the device, and signaling or sending the interrupt indicating the one or more data elements are available in the shared data cache occur while the low power island is in a second mode of operation; and the first mode of operation is a lower power mode of operation than the second mode of operation.

12. The method of claim 10, wherein the account identity value indicated in the broadcast message received from the radio controller and the pre-calculated account identity value matching indicates that the device and a device sending the broadcast message received from the radio controller share a same account credential.

13. The method of claim 10, wherein determining whether the broadcast message received from the radio controller is a duplicate message comprises:

comparing a salt value of the broadcast message received from the radio controller to a log of salt values; and determining that the broadcast message received from the radio controller is a duplicate message in response to a match between the salt value of the broadcast message received from the radio controller and a salt value in the log of salt values.

14. The method of claim 10, further comprising:

ignoring the broadcast message received from the radio controller in response to:

determine that the broadcast message received from the radio controller does not indicate an account identity value matching the pre-calculated account identity value; or determine that the broadcast message received from the radio controller is a duplicate message.

15. The method of claim 10, further comprising:

monitoring for broadcast messages received by the radio controller on a transport layer at a selected periodicity by the low power island of the device, wherein the selected periodicity is a different periodicity than a monitoring periodicity of the other processor of the device for broadcast messages received by the radio controller on a transport layer.

16. The method of claim 15, further comprising:

increasing the selected periodicity in response to a user being in close proximity; and decreasing the selected periodicity in response to a user not being in close proximity.

17. The method of claim 15, wherein the transport layer is a Bluetooth transport layer.

18. The method of claim 10, wherein the one or more data elements indicate a context state, setting, event, or capability of another device.

* * * * *